United States Patent
Ohashi et al.

(10) Patent No.: US 7,371,055 B2
(45) Date of Patent: *May 13, 2008

(54) TANDEM PUMP UNIT

(75) Inventors: Ryota Ohashi, Hyogo (JP); Hironori Sumomozawa, Hyogo (JP)

(73) Assignee: Kanzaki Kokyukoki Mfg. Co., Ltd., Hyogo (JP)

(*) Notice: Subject to any disclaimer, the term of this patent is extended or adjusted under 35 U.S.C. 154(b) by 0 days.

This patent is subject to a terminal disclaimer.

(21) Appl. No.: 11/641,784

(22) Filed: Dec. 20, 2006

(65) Prior Publication Data

US 2007/0098570 A1 May 3, 2007

Related U.S. Application Data

(63) Continuation of application No. 10/799,737, filed on Mar. 15, 2004, now Pat. No. 7,185,577, which is a continuation of application No. 10/265,454, filed on Oct. 7, 2002, now Pat. No. 6,736,605, which is a continuation of application No. 09/690,819, filed on Oct. 18, 2000, now Pat. No. 6,487,856.

(30) Foreign Application Priority Data

| Oct. 18, 1999 | (JP) | ................................. 11-295992 |
| Oct. 18, 1999 | (JP) | ................................. 11-295994 |
| Oct. 18, 1999 | (JP) | ................................. 11-296003 |
| Nov. 22, 1999 | (JP) | ................................. 11-331315 |

(51) Int. Cl.
F04B 1/12 (2006.01)
F01B 3/00 (2006.01)
F16D 31/02 (2006.01)

(52) U.S. Cl. .................... 417/269; 60/484; 91/499; 91/502

(58) Field of Classification Search ............. 60/456, 60/464, 486, 484; 91/499, 502; 417/269
See application file for complete search history.

(56) References Cited

U.S. PATENT DOCUMENTS

| 3,469,381 | A | * | 9/1969 | Burrough et al. ............. 56/209 |
| 3,966,841 | A | | 6/1976 | Combs |
| 4,044,557 | A | | 8/1977 | Stoessel et al. |
| 4,920,733 | A | | 5/1990 | Berrios |
| 5,394,699 | A | | 3/1995 | Matsufuji |
| 5,540,563 | A | * | 7/1996 | Hansell ..................... 417/269 |
| 5,800,134 | A | | 9/1998 | Hasegawa et al. |
| 5,957,666 | A | * | 9/1999 | Lee ........................... 417/269 |
| 6,189,641 | B1 | | 2/2001 | Azuma |
| 6,332,393 | B1 | | 12/2001 | Trimble |
| 6,361,282 | B1 | * | 3/2002 | Wanschura ................ 417/206 |
| 6,487,856 | B1 | * | 12/2002 | Ohashi et al. ............... 60/464 |
| 6,494,686 | B1 | | 12/2002 | Ward |
| 6,736,605 | B2 | * | 5/2004 | Ohashi et al. ........... 417/222.1 |
| 7,185,577 | B2 | * | 3/2007 | Ohashi et al. ............... 91/499 |

* cited by examiner

*Primary Examiner*—Charles G Freay
(74) *Attorney, Agent, or Firm*—Sterne, Kessler, Goldstein & Fox P.L.L.C.

(57) ABSTRACT

The present invention provides a tandem pump unit that includes: a first hydraulic pump and a second hydraulic pump respectively having a first pump shaft and a second pump shaft respectively having adjacent ends connected together so that the first and second pump shafts are coaxially aligned and non-rotatably connected in tandem; a common housing for accommodating the first hydraulic pump and the second hydraulic pump; and a first center section and a second center section that respectively support the first and second hydraulic pumps.

9 Claims, 40 Drawing Sheets

F I G. 7
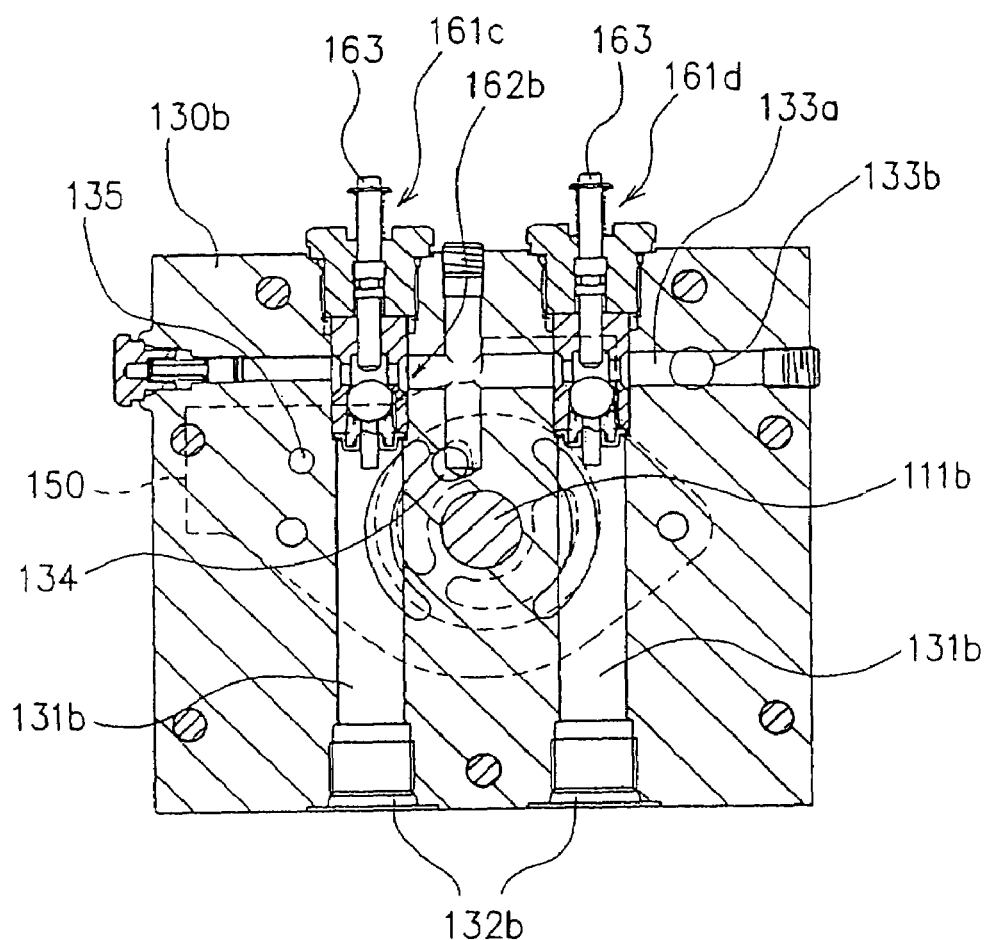

F I G . 14
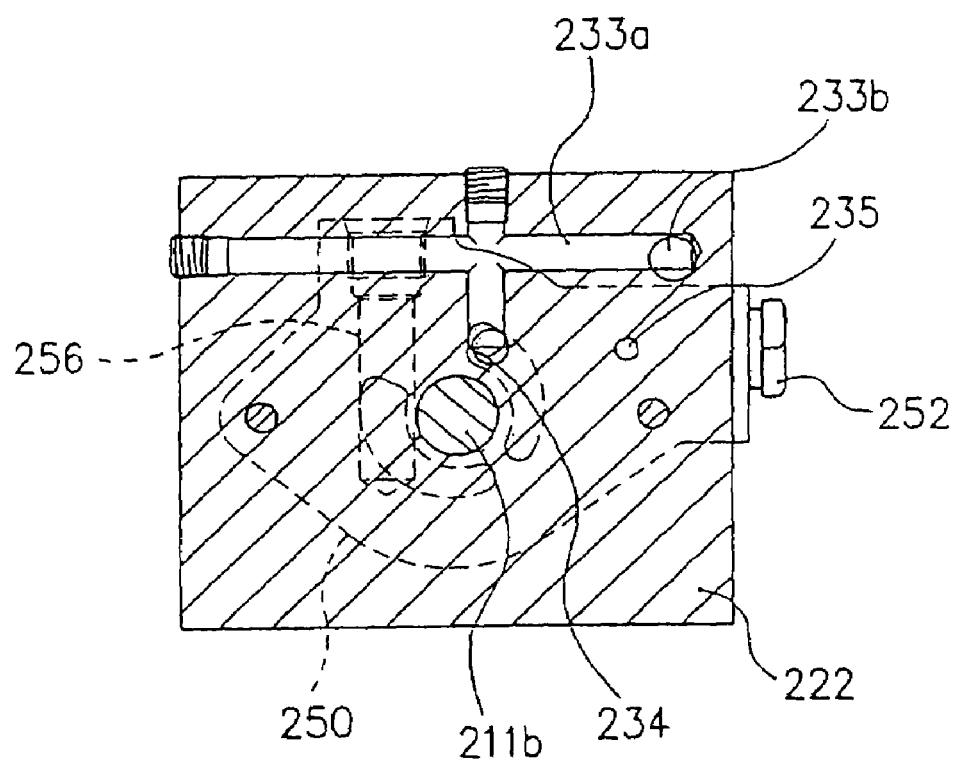

F I G . 21
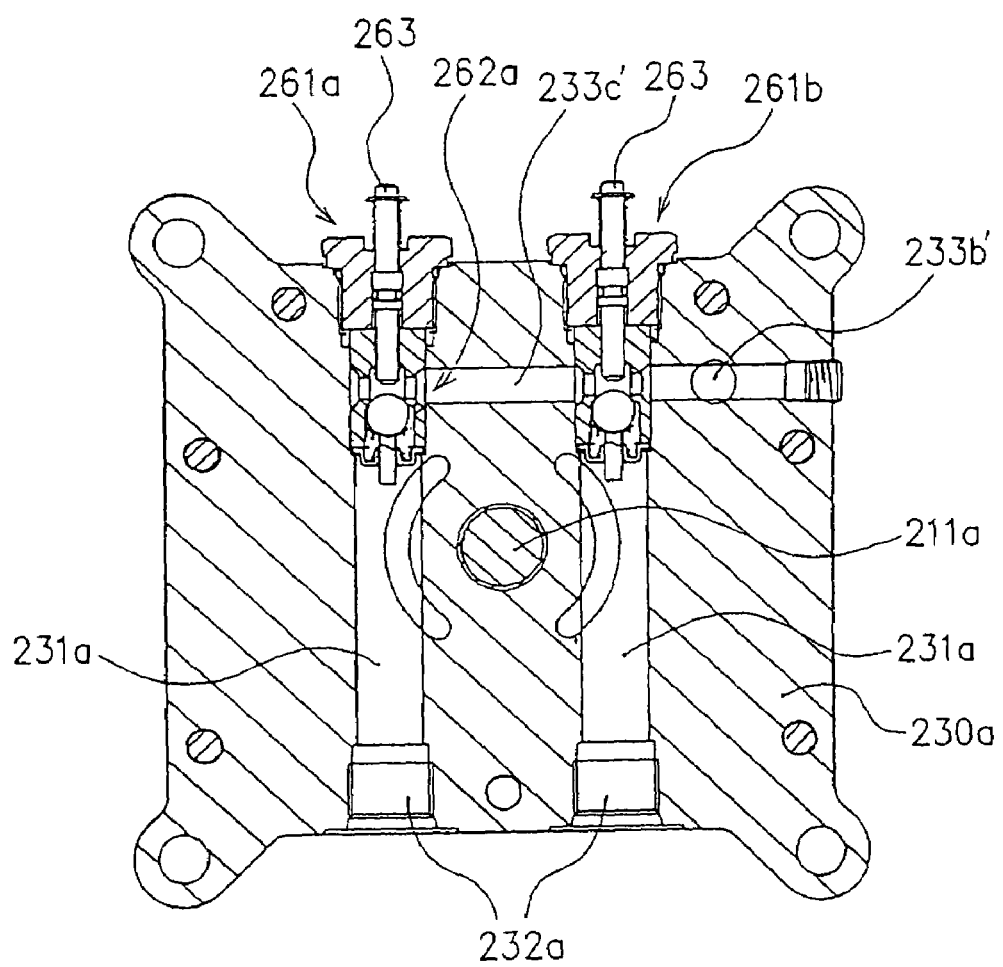

TANDEM PUMP UNIT

CROSS REFERENCE TO RELATED APPLICATIONS

This application is a continuation of U.S. application Ser. No. 10/799,737, filed Mar. 15, 2004 now U.S. Pat. No. 7,185,577, which is a continuation of U.S. application Ser. No. 10/265,454, filed Oct. 7, 2002, now U.S. Pat. No. 6,736,605, which is a continuation of U.S. application Ser. No. 09/690,819, filed Oct. 18, 2000, now U.S. Pat. No. 6,487,856, the entire disclosures of which are incorporated herein by reference.

BACKGROUND OF THE INVENTION

The present invention relates to a tandem pump unit used for various purposes.

More particularly, a first aspect of the present invention relates to a tandem pump unit with first and second hydraulic pumps, which respectively cooperate with first and second actuators driven through a hydraulic effect.

A hydraulic pump is used in various applications and in particular as the hydraulic pump adapted for operation in association with an actuator driven through the hydraulic effect. The description will hereinafter be made for the tandem pump unit by taking for example the case where it cooperates with first and second hydraulic motors serving as the actuators that respectively drive the right and left drive wheels.

For example, U.S. Pat. No. 4,920,733 discloses a vehicle including first and second hydraulic pumps respectively connected via first and second hydraulic lines to the first and second hydraulic motors for driving the right and left drive wheels. In this vehicle, the first and second hydraulic motors respectively have outputs variable in response to the adjustment of the input/output flow rates of the first and second hydraulic pumps, thereby controlling the rotational speed and rotational direction of the right and left drive wheels.

The vehicle disclosed in the above cited U.S. Pat. No. 4,920,733 has the first hydraulic pump and the second hydraulic pump separately arranged from one another, the former being operated in association with the first hydraulic motor, and the latter being operated in association with the second hydraulic motor. These separate hydraulic pumps pose various problems, such as troublesome mounting operation of the first and second hydraulic pump, troublesome conduit setting work between the pumps and the motors, and requiring separate housings which respectively accommodate the first and second hydraulic pumps.

The first aspect of the present invention has been therefor conceived in consideration of the prior arts. It is an object of the first aspect of the present invention to provide a tandem pump unit with first and second pumps connected to each other in series, while being connected to actuators via first and second hydraulic lines respectively, and is capable of lowering the manufacturing cost through the simplification of mounting operation and the reduction of the number of parts.

The second aspect of the present invention relates to a tandem pump unit with first and second hydraulic pumps, which respectively cooperate with first and second actuators driven through a hydraulic effect.

A hydraulic pump is used in various applications and in particular as the hydraulic pump adapted for operation in association with an actuator driven through the hydraulic effect. The description will hereinafter be made for the tandem pump unit by taking for example the case where it cooperate with first and second hydraulic motors serving as the actuators that respectively drive the right and left drive wheels.

For example, U.S. Pat. No. 4,920,733 discloses a vehicle including first and second hydraulic pumps respectively connected via first and second hydraulic lines to the first and second hydraulic motors for driving the right and left drive wheels. In this vehicle, the first and second hydraulic motors respectively have outputs variable in response to the adjustment of the input/output flow rates of the first and second hydraulic pumps, thereby controlling the rotational speed and rotational direction of the right and left drive wheels.

The vehicle disclosed in the above cited US patent has the first hydraulic pump and the second hydraulic pump separately arranged from one another, the former being operated in association with the first hydraulic motor, and the latter being operated in association with the second hydraulic motor. These separate hydraulic pumps invite a complicated structure of the feeding passage for charging working hydraulic fluid to the pair of the first and second hydraulic lines, and pose various other problems.

A third aspect of the present invention relates to a pump unit with first and second hydraulic pumps that are respectively connected via first and second hydraulic lines to first and second actuators driven through a hydraulic effect.

A hydraulic pump is used in various applications and in particular as the hydraulic pump adapted for operation in association with an actuator driven through the hydraulic effect. The description will hereinafter be made for the pump unit by taking for example the case where it includes the first and second hydraulic motors serving as the actuators that respectively drive the right and left drive wheels.

For example, U.S. Pat. No. 4,920,733 discloses a vehicle including first and second hydraulic pumps respectively connected via first and second hydraulic lines to the first and second hydraulic motors for driving the right and left drive wheels. In this vehicle, the first and second hydraulic motors respectively have outputs variable in response to the adjustment of the input/output flow rates of the first and second hydraulic pumps, thereby controlling the rotational speed and rotational direction of the right and left drive wheels.

The vehicle disclosed in the above cited US patent has the first hydraulic pump and the second hydraulic pump separately arranged from one another, the former being operated in association with the first hydraulic motor, and the latter being operated in association with the second hydraulic motor. Such a separate arrangement of the hydraulic pumps invites a complicated structure of a feeding passage for feeding working hydraulic fluid from a reservoir tank to the first hydraulic line and the second hydraulic line, and poses various other problems.

The third aspect of the present invention has been therefor conceived in consideration of the above prior art. It is an object of the third aspect of the present invention to provide a pump unit with the first and second hydraulic pumps that are respectively connected via the first and second hydraulic lines to the first and second actuators driven through the hydraulic effect, and that is capable of achieving a simplified structure of the feeding passage for feeding working hydraulic fluid to the hydraulic lines extending between the actuators and the hydraulic pumps.

A fourth aspect of the present invention relates to a pump unit with first and second hydraulic pumps that are respectively connected via first and second hydraulic lines to first and second actuators driven through a hydraulic effect.

A hydraulic pump is used in various applications and in particular as the hydraulic pump adapted for operation in association with an actuator driven through the hydraulic effect. The description will hereinafter be made for the pump unit by taking for example the case where it includes the first and second hydraulic motors serving as the actuators that respectively drive the right and left drive wheels.

For example, U.S. Pat. No. 4,920,733 discloses a vehicle including first and second hydraulic pumps respectively connected via first and second hydraulic lines to the first and second hydraulic motors for driving the right and left drive wheels. In this vehicle, the first and second hydraulic motors respectively have outputs variable in response to the adjustment of the input/output flow rates of the first and second hydraulic pumps, thereby controlling the rotational speed and rotational direction of the right and left drive wheels.

The vehicle disclosed in the above cited US patent has the first hydraulic pump and the second hydraulic pump separately arranged from one another, the former being operated in association with the first hydraulic motor, and the latter being operated in association with the second hydraulic motor. Such a separate arrangement of the hydraulic pumps invites a complicated structure of a feeding passage for feeding working hydraulic fluid for an HST (hydrostatic transmission) from a hydraulic fluid tank to the first hydraulic line and the second hydraulic line, and poses various other problems.

As a further disadvantage, the working hydraulic fluid between the hydraulic pumps and the actuators may increase in temperature due to the load from the outside. Such an increase in temperature of the working hydraulic fluid may invite various problems such as lowering of the volumetric efficiency, or lowering of the axle revolution speed if the hydraulic motors are used as the actuators for driving the drive wheels of the vehicle, deteriorating of the durability. However, the above-cited US patent does not teach any solutions to limit the temperature of the working hydraulic fluid of the HST.

The fourth aspect of the present invention has been therefor conceived in consideration of the above prior art. It is an object of the fourth aspect of the present invention to provide a pump unit with the first and second hydraulic pumps that are respectively connected via the first and second hydraulic lines to the first and second actuators driven through the hydraulic effect, and that is capable of effectively limiting the increase in temperature of the working hydraulic fluid to be replenished to the hydraulic lines between the actuators and the hydraulic pumps.

SUMMARY OF THE INVENTION

According to the first aspect of the present invention, there is provided a tandem pump unit that includes: a first hydraulic pump and a second hydraulic pump respectively having a first pump shaft and a second pump shaft respectively having adjacent ends connected together so that the first and second pump shafts are coaxially aligned and non-rotatably connected in tandem; a common housing for accommodating the first hydraulic pump and the second hydraulic pump; and a first center section and a second center section that respectively support the first and second hydraulic pumps.

The tandem pump unit of the above arrangement can reduce the number of the parts and hence the manufacturing cost, in comparison with a conventional tandem pump unit, which requires a separate housing for each pump unit. As an additional advantage, the tandem pump unit allows both the first and second hydraulic pumps to be mounted in position only by mounting the common housing with the first and second hydraulic pumps therein. Whereby, the efficiency in assembling operation can be enhanced.

Furthermore, the common housing has first and second openings respectively formed at opposed ends of the housing with respect to the pump shaft direction, and a bearing wall located midway between the first and second openings. The first and second openings allow the first and second hydraulic pumps to pass therethrough, and the bearing wall supports the connection portions of the first and second pump shafts. The first and second openings are adapted to be respectively sealed by the first and second center sections respectively supporting the first and second hydraulic pumps.

Therefore, the first and second hydraulic pumps can be respectively placed through the first and second openings into the housing with the first and second hydraulic pumps being respectively supported by the first and second center sections. Thus, the assembling efficiency of the tandem pump unit can be enhanced. In addition, either one or both of the pumps can easily be removed from the housing, while the housing is still mounted on an object such as a vehicle, thereby achieving an improved operation efficiency in maintenance work, or the like.

Furthermore, the tandem pump unit of the first aspect of this invention is designed so that the first and second center sections are disposed at the opposed ends of the housing with respect to the pump shaft direction in the housing excluding the portion between the first and second hydraulic pumps, thereby allowing for great flexibility in designing the adjacent ends of the first and second pump shafts to be connected together.

The tandem pump unit of the first aspect of this invention preferably includes a coupler for non-rotatably receiving the adjacent ends of the first and second pump shafts.

Preferably, the coupler is rotatably supported in a bearing hole formed in the bearing wall via a bearing member.

In the case where the first and second hydraulic pumps are axial piston pumps of a variable displacement type respectively having first and second angularly adjustable swash plates of cradle type, the bearing wall is preferably designed to have a side facing the first and second hydraulic pumps that forms guiding surfaces for slidingly guiding spherical convex surfaces formed in rear sides of the swash plates, which rear sides are opposed to surfaces facing the first and second hydraulic pumps.

According to the second aspect of the present invention, there is provided a tandem pump unit that includes the integral arrangement of a first hydraulic pump and a second hydraulic pump. The first hydraulic pump with a first pump shaft is adapted to be connected to a first actuator via a first pair of hydraulic lines. The second hydraulic pump with a second pump shaft is adapted to be connected to a second actuator via a second pair of hydraulic lines. The first pump shaft and the second pump shaft respectively have adjacent ends connected together so that the first and second pump shafts are coaxially aligned and non-rotatably connected in tandem. The tandem pump unit of the second aspect of the present invention further includes a charge line disposed within the tandem pump unit and having a first end communicating with either a reservoir or a hydraulic fluid feeding mechanism and a second end adapted to communicate with the first pair of hydraulic lines and the second pair of hydraulic lines, respectively.

The tandem pump unit of the above arrangement allows hydraulic fluid to be replenished into the first pair of hydraulic lines and the second pair of hydraulic lines, only by connecting a hydraulic fluid feeding mechanism such as a charge pump to the first opening of the charging line. Whereby, the piping structure for charging can be simplified, and the manufacturing cost can be lowered through the reduction of the number of parts and the improved efficiency in assembling operation. Also, the workability in maintenance can be improved.

As an additional advantage, the charge line disposed within the pump unit is unlikely to be damaged by the contact against external parts, thereby effectively preventing the leakage of the hydraulic fluid to the outsides from the charge line. This hydraulic fluid leakage preventive arrangement is advantageous particularly when the pump unit is used in vehicles for traveling on lawns or other grounds such as a riding mower, a walk behind mower, a commercial ride-on mid-mount-deck lawnmower, a tractor, or other device.

In one case, the tandem pump unit of the second aspect has preferably a common center section having oppositely facing sides with respect to the pump shaft direction, respectively supporting the first and second hydraulic pumps via the oppositely facing sides, and a first pump housing and a second pump housing for respectively accommodating the first hydraulic pump and the second hydraulic pump. The common center section forms a first pair of inlet/outlet ports and a second pair of inlet/outlet ports. The first pair of inlet/outlet ports respectively serve as connection ports for connection with the first pair of hydraulic lines and the second pair of inlet/outlet ports respectively serve as connection ports for connection with the second pair of hydraulic lines. The charge line has a first bore portion, a conduit and a second bore portion. The first bore portion is formed in a peripheral wall of either the first pump housing or the second pump housing with a first end opening to the outside of the either the first pump housing or the second pump housing so as to communicate with the either the reservoir or the hydraulic fluid feeding mechanism and a second end opening to the inside of the either the first pump housing or the second pump housing. The conduit is disposed within the either the first pump housing or the second pump housing with a first end connected to the second end of the first bore portion and a second end extending to the common center section. The second bore portion is formed in the common center section with a first end connected to the second end of the conduit and a second end communicating with the first pair of inlet/outlet ports and the second pair of inlet/outlet ports, respectively.

In another case, the tandem pump unit of the second aspect also includes a common center section having oppositely facing sides with respect to the pump shaft direction, respectively supporting the first and second hydraulic pumps via the oppositely facing sides, a first pump housing and a second pump housing for respectively accommodating the first hydraulic pump and the second hydraulic pump. The common center section forms a first pair of inlet/outlet ports and a second pair of inlet/outlet ports. The first pair of inlet/outlet ports respectively serve as connection ports for connection with the first pair of hydraulic lines, and the second pair of inlet/outlet ports respectively serve connection ports for connection with the second pair of hydraulic lines. The charge line has a third bore portion and a fourth bore portion. The third bore portion is formed in a peripheral wall of either the first pump housing or the second pump housing with a first end opening to the outside of the either the first pump housing or the second pump housing so as to communicate with the either the reservoir or the hydraulic fluid feeding mechanism and a second end extending to the common center section. The fourth bore portion is formed in the common center section with a first end connected to the second end of the third bore portion and a second end communicating with the first pair of inlet/outlet ports and the second pair of inlet/outlet ports, respectively.

Preferably, the common center section forms a hydraulic fluid communication hole for communication between the first and second pump housings.

In still another case, the tandem pump unit of the second aspect of the present invention also includes a common pump housing for accommodating the first and second hydraulic pumps, a first center section and a second center section for respectively supporting the first hydraulic pump and the second hydraulic pump. The common pump housing has a first opening and a second opening respectively formed at opposed ends of the pump housing with respect to the pump shaft direction. The first and second openings allow the first and second hydraulic pumps to pass therethrough. The first and second center sections are respectively connected to the common pump housing so as to seal the first and second openings in a liquid tight manner. The first and second center sections respectively form a first pair of inlet/outlet ports and a second pair of inlet/outlet ports serving as connection ports for connection respectively with the first pair of hydraulic lines and the second pair of hydraulic lines. The charge line has a first end opening to the outside of either the first center section or the second center section so as to communicate with the either the reservoir or the hydraulic fluid feeding mechanism, and a second end communicating with the first pair of inlet/outlet ports and the second pair of inlet/outlet ports, respectively.

Preferably, the common pump housing has a bearing wall located midway thereof with respect to the pump shaft direction to support the adjacent ends of the first and second pump shafts. The bearing wall divides the common pump housing into a first hydraulic pump accommodation chamber and a second hydraulic pump accommodation chamber for respectively accommodating the first hydraulic pump and the second hydraulic pump.

Preferably, the common pump housing is designed to allow hydraulic fluid to communicate between the first hydraulic pump accommodation chamber and the second hydraulic pump accommodation chamber.

According to the third aspect of the present invention, there is provided a tandem pump unit for operation in association with actuators. The tandem pump unit includes the integral arrangement of a first hydraulic pump and a second hydraulic pump. The first hydraulic pump with a first pump shaft is adapted to be connected to a first actuator via a first pair of hydraulic lines, and the second hydraulic pump with a second pump shaft is adapted to be connected to a second actuator via a second pair of hydraulic lines. The first and second pump shafts respectively have adjacent ends connected together so that the first and second pump shafts are coaxially aligned and non-rotatably connected in tandem. The tandem pump unit also includes a center section supporting the first hydraulic pump and the second hydraulic pump, a housing accommodating the first hydraulic pump and the second hydraulic pump, and a reservoir tank supportingly connected to the single unit for storing hydraulic fluid to be replenished to the first pair of hydraulic lines and the second pair of hydraulic lines. The first hydraulic pump, the second hydraulic pump, the center section and the housing are integrally connected together to constitute a single unit.

The pump unit of the above arrangement can improve an efficiency in mounting the first and second hydraulic pumps on an object such as a vehicle, and shorten the length of the piping for replenishing the hydraulic fluid from the reservoir tank to the first pair of hydraulic lines and the second pair of hydraulic lines, thereby lowering the manufacturing cost, and improving an efficiency in replenishing the hydraulic fluid through the decrease of the resistance force between the hydraulic fluid and the pipe wall, and producing other desirable effects Preferably, the single unit of the tandem pump unit of the third aspect of the present invention is designed so that the housing can serve as a hydraulic fluid tank, and the pump unit further includes a hydraulic fluid communication passage for providing a free fluid communication between the reservoir tank and the housing. With this arrangement, the number of the pipes required between the first and second hydraulic pumps, and the first and second actuators can be reduced to substantially four pipes only, specifically the first pair of hydraulic lines and the second pair of hydraulic lines. Thus, as compared with the conventional arrangements, the pump unit of this arrangement can achieve a lower manufacturing cost, an improved assembling efficiency and an excellent workability in maintenance. Since the housing itself also serves as a hydraulic fluid tank, the reservoir tank can compactly be made.

The tandem pump unit of the third aspect of the present invention preferably has the following arrangement. Specifically, the center section forms a first pair of hydraulic passages respectively having first ends communicating with the first hydraulic pump and second ends opening to the outside of the center section to form connection ports for connection with the first pair of hydraulic lines, a second pair of hydraulic passages respectively having first ends communicating with the second hydraulic pump and second ends opening to the outside of the center section to form connection ports for connection with the second pair of hydraulic lines, and a charging passage having a first end opening to the outside of the center section to form an inlet port for charging, serving as an inlet for the hydraulic fluid to be replenished and a second end communicating with the first pair of hydraulic passages and the second pair of hydraulic passages via check valves. The charging passage is connected to a pressure relief line communicating with the housing via a relief vale, and the inlet port for charging is connected to the reservoir tank via a hydraulic fluid replenishing passage.

The tandem pump unit of the third aspect of the present invention also preferably has the following arrangement. Specifically, the tandem pump unit includes a cooling fan provided near the single unit. The cooling fan is adapted to be driven in synchronism with the first and second hydraulic pumps. The reservoir tank is connected to the single unit in such a manner as to form a clearance therebetween, into which a cooling air stream is drawn from the cooling fan. The hydraulic fluid communication passage and the hydraulic fluid replenishing passage are disposed in such a manner to traverse the clearance. The thus arranged pump unit can limit the temperature increase of the hydraulic fluid stored in the reservoir tank and the housing, and also effectively limit the temperature increase of the hydraulic fluid flowing through the hydraulic fluid replenishing passage and the hydraulic fluid communication passage, thereby improving the transmission efficiency between the hydraulic pumps and the actuators.

According to the fourth aspect of the present invention, there is provided a tandem pump unit that includes: a first hydraulic pump and a second hydraulic pump respectively having a first pump shaft and a second pump shaft that are coaxially aligned and non-ratably connected in tandem; a center section supporting the first hydraulic pump and the second hydraulic pump; and a housing accommodating the first pump and the second hydraulic pump. The housing is adapted to be used as a hydraulic fluid tank. A hydraulic fluid circulation mechanism is also provided for taking the hydraulic fluid from the hydraulic tank, and again returning the same to the hydraulic tank. The hydraulic fluid circulation mechanism is designed to cool the hydraulic fluid while circulating the same.

The tandem pump unit of the above arrangement can effectively limit the increase in temperature of the hydraulic fluid stored within the hydraulic tank, thereby effectively preventing deterioration in working efficiency of a hydraulic actuation device.

Preferably, the circulation mechanism of the tandem pump unit of the fourth aspect of the present invention includes a circulation line, at least a portion of which serves as a conduit; the circulation line having a first end communicating with the inside of the hydraulic tank and a second end again communicating with the inside of the hydraulic tank. The conduit has at least a portion provided thereon with cooling fins.

Further, the pump unit of the fourth aspect of the present invention preferably has the following arrangement. The center section forms a first pair of hydraulic passages respectively having first ends communicating with the first hydraulic pump and second ends opening to the outside of the center section to form connection ports for connection with the first pair of hydraulic lines, a second pair of hydraulic passages respectively having first ends communicating with the second hydraulic pump and second ends opening to the outside of the center section to form connection ports for connection with the second pair of hydraulic lines, and a charging passage having a first end communicating with the hydraulic fluid tank to form an inlet port for charging, serving as an inlet for the hydraulic fluid to be replenished and a second end communicating with the first pair of hydraulic passages and the second pair of hydraulic passages via check valves. The tandem pump unit further includes: a charge pump for sucking the hydraulic fluid stored within the hydraulic fluid tank and then discharging the same into the inlet port for charging; and a pressure relief line having a first end connected to the charging passage via a relief valve and a second end forming a drain port through which the hydraulic fluid from the relief valve is drained. The second end of the pressure relief line is connected to the conduit, and the charge pump constitutes a part of the hydraulic fluid circulation mechanism.

Preferably, the pump unit of the fourth aspect of the present invention further includes a reservoir tank, in which the reservoir tank is in free fluid communication with the housing via a hydraulic fluid communication passage, and forms a hydraulic fluid tank in cooperation with the housing, and the inlet port for charging communicates with the reservoir tank via a hydraulic fluid replenishing passage.

Preferably the pump unit of the fourth aspect of the present invention further includes cooling fins provided on the hydraulic fluid replenishing passage and the hydraulic fluid communication passage.

Further, the pump unit of the fourth aspect of the present invention preferably has the following arrangement. Specifically, a cooling fan adapted to be driven in synchronism with the first and second hydraulic pumps is provided near the housing. The reservoir tank is connected to the housing in such a manner as to form a clearance therebetween, into which a cooling air stream from the cooling fan is drawn. The hydraulic fluid communication passage and the hydraulic fluid replenishing passage are disposed to transverse the clearance.

A cooling air duct is preferably provided in the pump unit of the fourth aspect of the present invention, so that a cooling air stream from the cooling fan is drawn into the clearance along the cooling air duct.

BRIEF DESCRIPTION OF THE DRAWINGS

The above, and other objects, features and advantages of the present invention will become apparent from the detailed description thereof in conjunction with the accompanying drawings wherein.

FIG. 7 is a cross section taken along lines VII-VII in FIG. 4.

FIG. 14 is a cross section taken along lines XIV-XIV in FIG. 13.

FIG. 21 is a cross section taken along lines XXI-XXI in FIG. 19.

DETAILED DESCRIPTION OF THE PREFERRED EMBODIMENT

First Embodiment

The first embodiment of the pump unit according to the first aspect of the present invention will be hereinafter described with reference to the accompanying drawings.

A pump unit 100 according to the first aspect of the present invention is designed to be operated in association with an actuator that is connected thereto via first and second pairs of hydraulic lines 184a and 184b and driven through an effect of pressurized hydraulic fluid in the pairs of hydraulic lines. This embodiment will be described by taking for example the case that hydraulic motors 182a and 182b each are used as the actuator.

Figure 1:
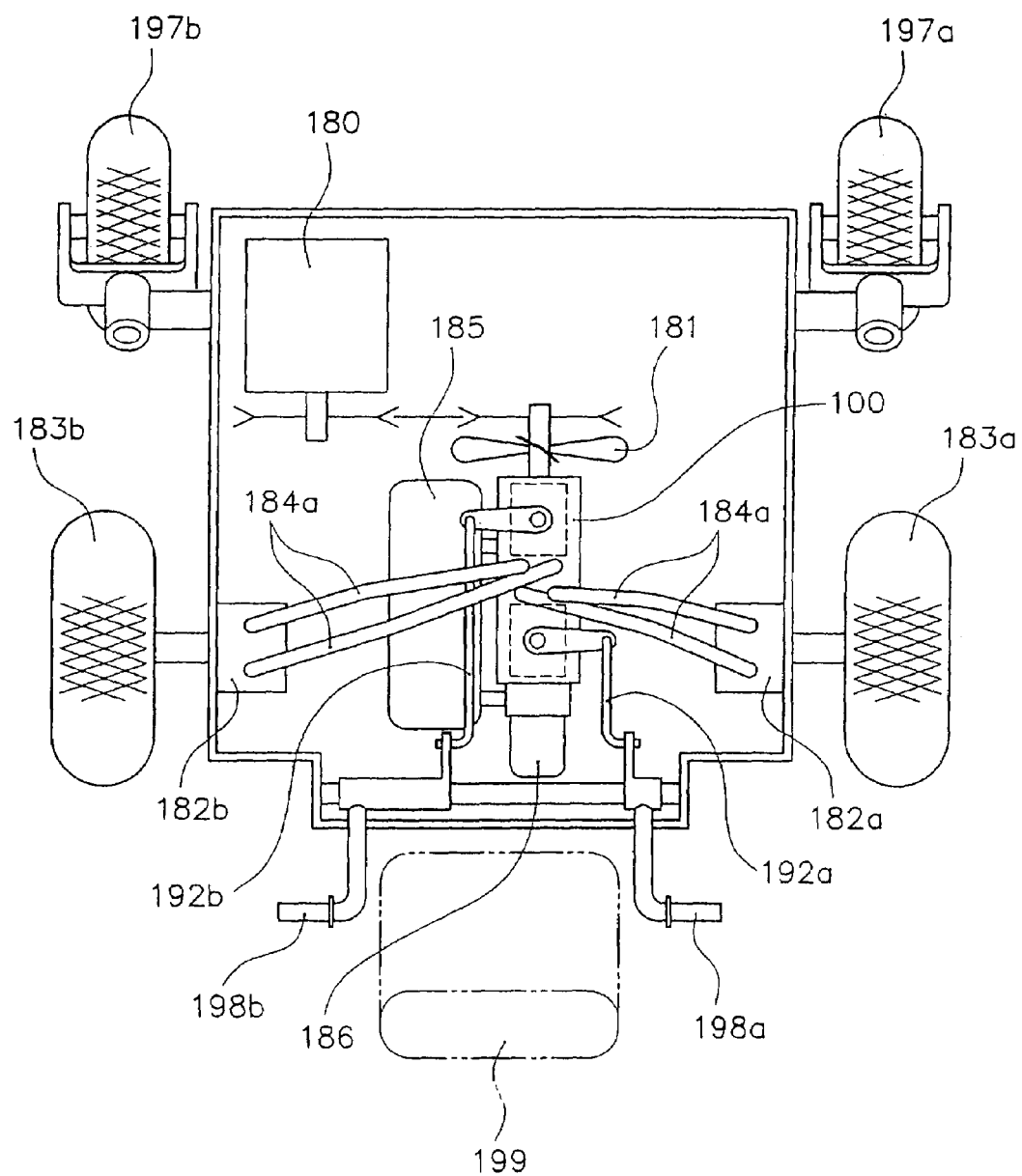
FIG. 1 is an expansion plan view of a vehicle to which a tandem pump unit according to first to fourth aspects of the present invention are applied.

FIG. 1 is an expansion plan view of a vehicle to which the pump unit 100 of this embodiment is applied. The reference codes 185, 197a and 197b, 199, 198a and 198b, and 192a and 192b in FIG. 1 respectively represent a reservoir tank, caster wheels, a driver seat, steering wheels, and a linkage mechanism connecting between the steering wheels and the hydraulic motors.

Figure 2:
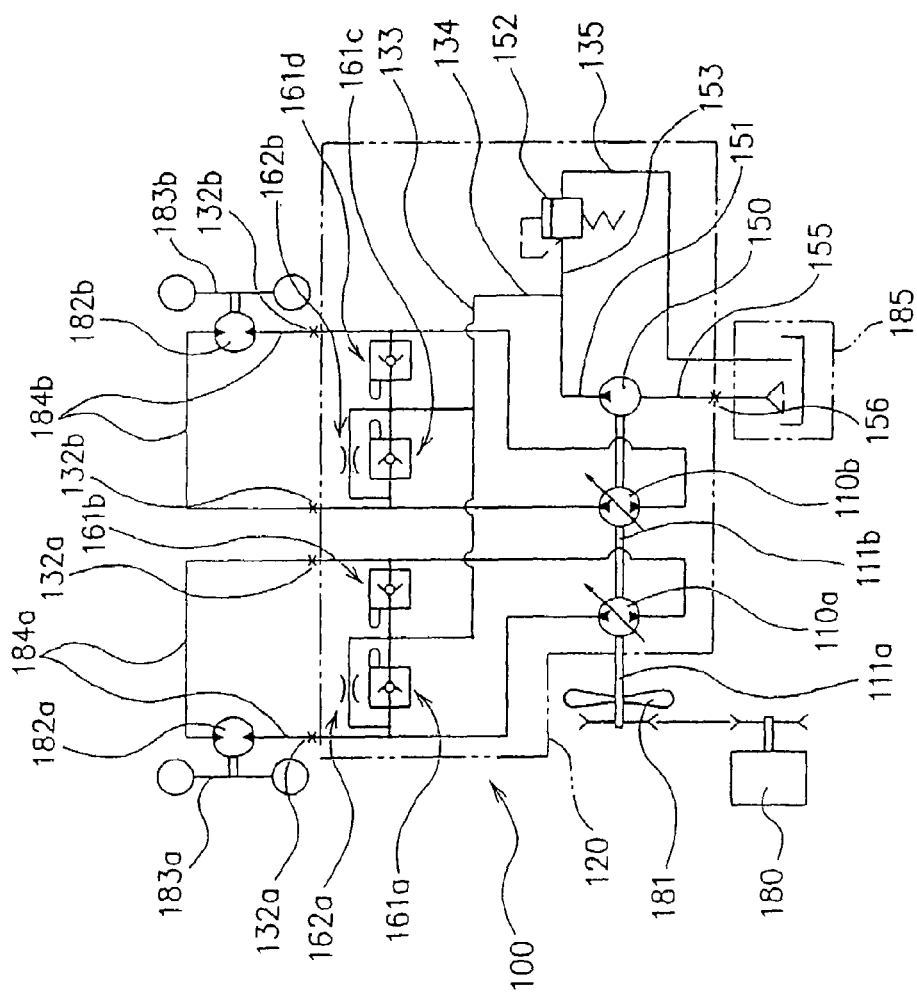
FIG. 2 is a hydraulic circuit diagram of the vehicle to which one embodiment of a tandem pump unit according to the first aspect of the present invention is applied.
Figure 3:
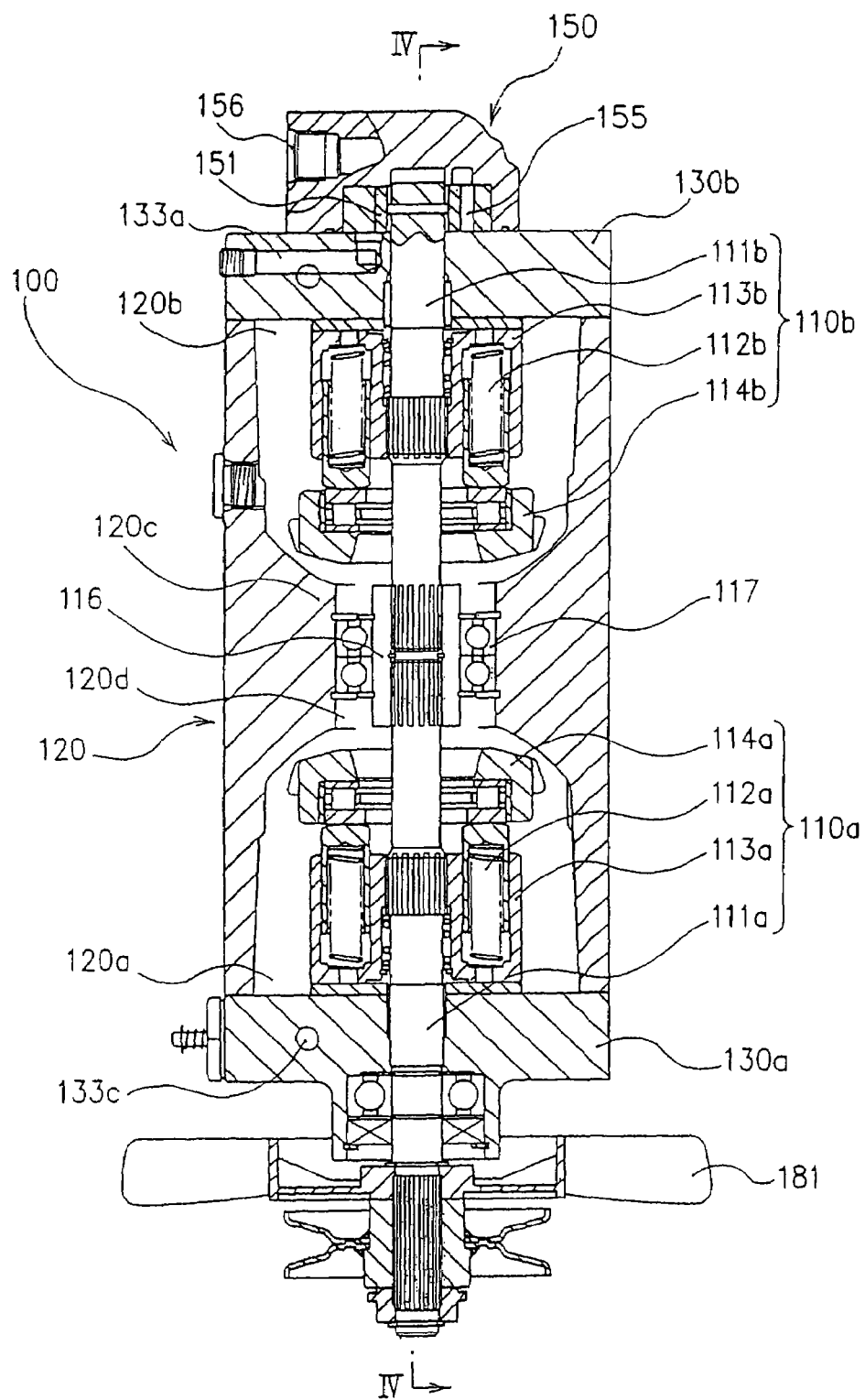
FIG. 3 is a longitudinal cross-sectional side view of the pump unit according to the embodiment of FIG. 2.
Figure 4:
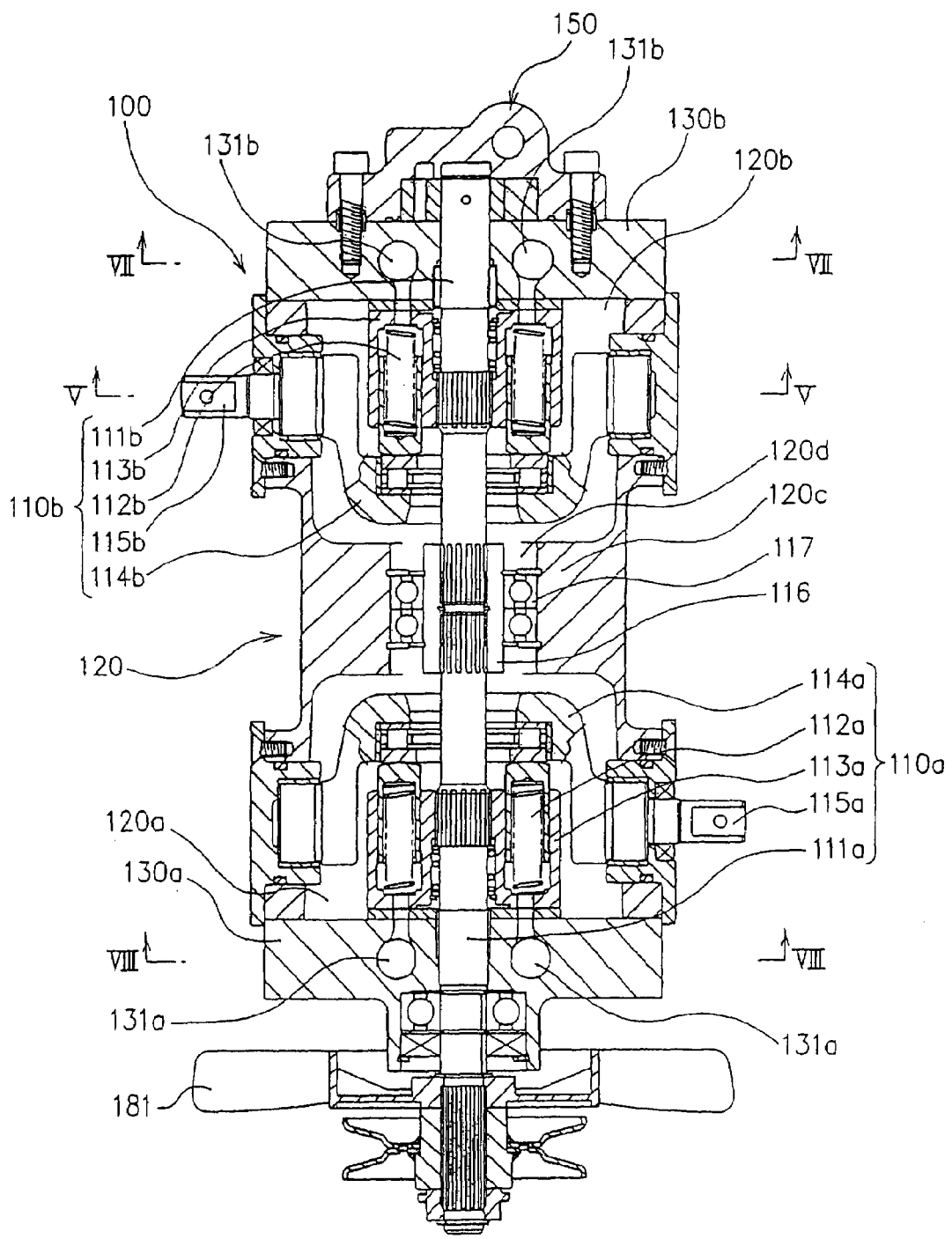
FIG. 4 is a cross section taken along lines IV-IV in FIG. 3.
Figure 5:
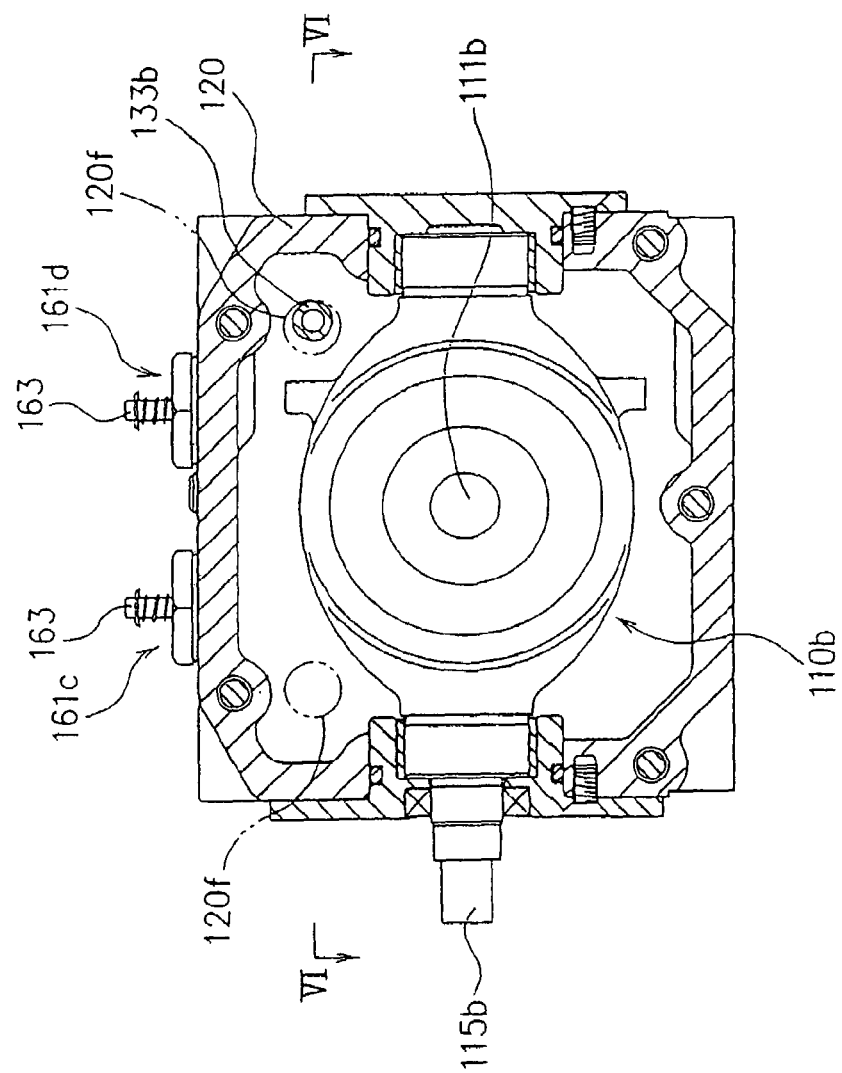
FIG. 5 is a cross section taken along lines V-V in FIG. 4.

FIG. 2 is a hydraulic circuit diagram of the vehicle to which the tandem pump unit 100 of this embodiment is applied. FIGS. 3 and 4 are respectively longitudinal cross-sectional front and side views of the tandem pump unit 100. FIG. 5 is a cross section taken along lines V-V in FIG. 4.

As illustrated in FIGS. 2-4, the pump unit 100 is adapted to be used in a vehicle having right and left drive wheels 183a and 183b to which first and second hydraulic motors 182a and 182b respectively connected. The pump unit 100 is of a tandem type which includes a first hydraulic pump 110a and a second hydraulic pump 110b respectively connected to the first and second hydraulic motors via a first pair of hydraulic lines 184a and a second pair of hydraulic lines 184b, a pump case 120 that accommodates the first and second hydraulic pumps 110a and 110b, and a first center section 130a and a second center section 130b respectively supporting the first and second hydraulic pumps 110a and 110b whose first pump shaft 111a and second pump shaft 111b are disposed in a tandem arrangement, that is, coaxially disposed as connected together in a non-rotatable manner relative to one another.

The connection form between the right and left drive wheels 183a and 183b, and the first and second hydraulic motors 182a and 182b meant in this embodiment includes the direct connection of the drive wheels respectively to those hydraulic motors, and also the operative connection of the drive wheels respectively to those drive wheels via a suitable power transmission mechanism.

In this embodiment, the pump unit 100 is of a vertical type that has the vertically extending first and second hydraulic pump shafts 111a and 111b. However, the first aspect of the present invention is not necessarily limited to this arrangement. Rather, it is a matter of course to employ the pump unit of a horizontal type that has the horizontally extending first and second hydraulic pump shafts 111a and 111b. The reference codes 180, 181 and 185 in FIG. 2 respectively represent a power source, a cooling fun and a reservoir tank.

As illustrated in FIGS. 3 and 4, the common pump case 120 of a box shape has a first opening 120a and a second opening 120b which are respectively formed in the opposed ends along the longitudinal direction thereof, and a bearing wall 120c which is disposed midway between the first and second openings 120a and 120b. The first and second openings 120a and 120b allow the first and second hydraulic pumps to pass therethrough into the common case 120.

The first and second center sections 30a and 30b are respectively connected to the common pump case 120 in such a manner as to respectively have the first and second openings 120a and 120b sealed. Specifically, the pump case 120 is designed to have a first pump unit accommodation chamber defined between the bearing wall 120c and the first center section 130a, and a second pump unit accommodation chamber defined between the bearing wall 120c and the second center section 130b, and also to serves as the reservoir tank 185.

FIG. 5 is a cross section taken along lines V-V in FIG. 4. As illustrated in FIGS. 3-5, in this embodiment, the first and second hydraulic pumps 110a and 110b are axial piston pumps of a variable displacement type. The pumps 110a and 110b respectively include the first hydraulic pump shaft 111a and the second hydraulic pump shaft 111b, both of which are coaxially disposed and non-rotatably connected to one another at the adjacent ends thereof, a first piston unit 112a and a second piston unit 112b that are reciprocatingly movable according to the rotation of the pump shafts, a first cylinder block 113a and a second cylinder block 113b that respectively and reciprocatingly support the piston units, a first angulary adjustable swash plate 114a and a second angulary adjustable swash plate 114b that regulate the stroke length of the piston units by varying their tilting angle to vary their input/output flow rates, and a first control shaft 115a and a second control shaft 115b that control their tilting angles of these swash plates.

In the above pump units, by operating the swash plates to respectively vary the input/output flow rate of the first and second pump units 110a and 110b, there occurs a pressure difference of hydraulic fluid between the first pair of hydraulic lines 184a, and/or between the second pair of hydraulic lines 184b. The pressure difference causes a motor shaft of the first hydraulic motor 182a and/or a motor shaft of the second hydraulic motor 182b to rotate at a speed proportional to the amount of the pressure difference, thereby driving the drive wheels 183a and 183b operatively connected to the motor shafts.

As described above, the first and second hydraulic pumps 110a and 110b according to this embodiment are of the variable displacement type, and the first and second hydraulic motors in association with the first and second hydraulic pumps 110a and 110b are of the fixed displacement type. However, the first aspect of the present invention is not necessarily limited to this arrangement. That is, it is possible to employ the hydraulic pumps of the fixed displacement type, and the hydraulic motors of the variable displacement type driven by the hydraulic pumps, or the hydraulic pumps and the hydraulic motors, both of which are of the variable displacement type.

In this embodiment, the first and second hydraulic pumps 110a and 10b are of the axial piston type. Alternatively, the pump unit may employ the hydraulic pumps of a radial piston type.

The first and second control shafts 115a and 115b respectively have inner ends that extend into the first and second pump accommodation chambers to be connected to the first and second swash plates 114a and 114b at the center points of the tilting areas thereof, and outer ends that protrude outwards from the common pump case 120 in the vehicle width direction orthogonal to the pump shafts 111a and 111b to allow these shafts 115a and 115b to extend away from one another. This arrangement is advantageous when the pump unit 100 is installed on the vehicle having push-pull control levers 198a and 198b as illustrated in FIG. 1; since the first and second control shafts 115a and 115b can have the rotational axes parallel to the pivotal axes of the control levers, thereby achieving the simplification of a link mechanism between these control shafts and the control levers.

Figure 6:
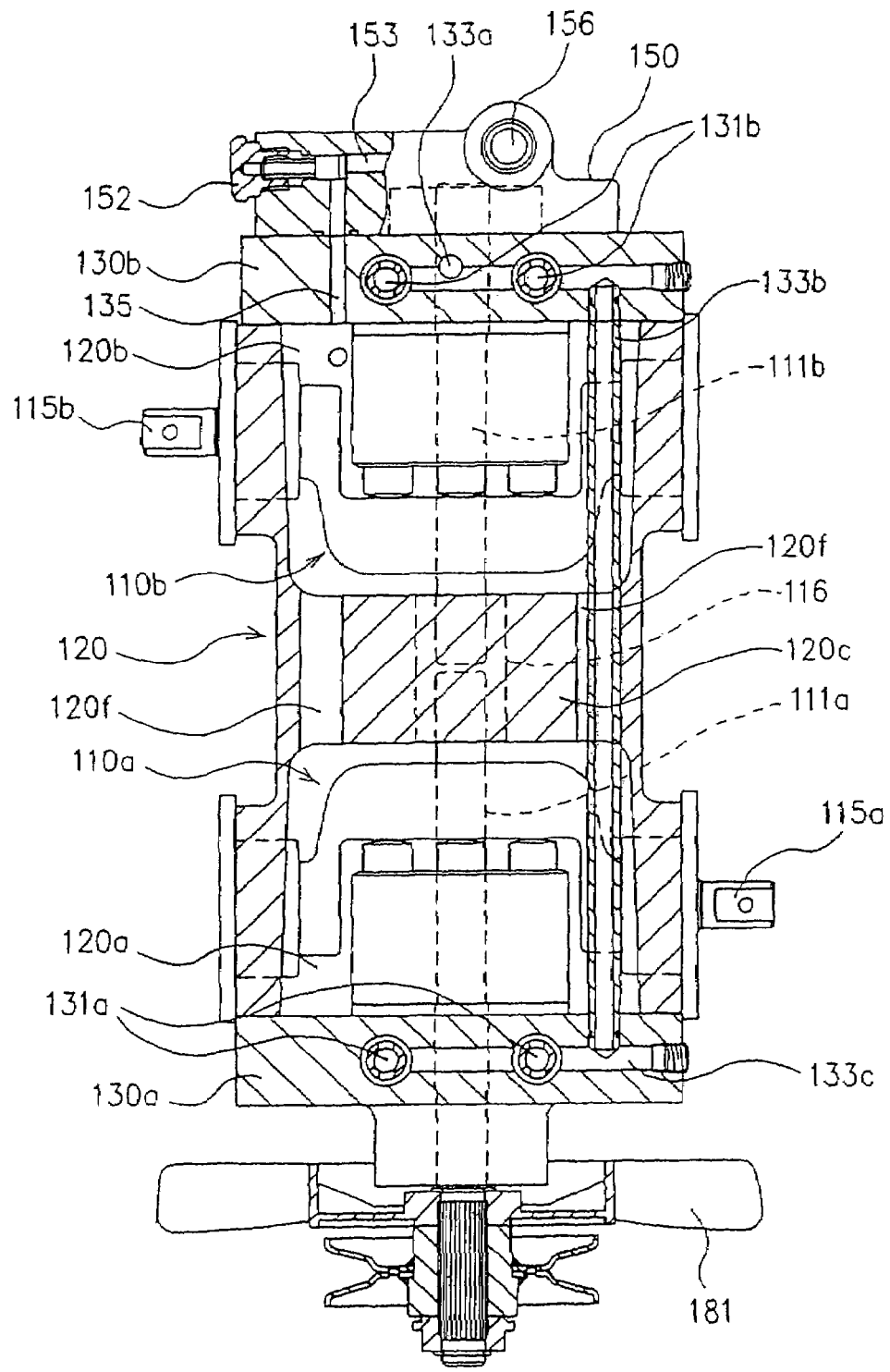
FIG. 6 is a cross section taken along lines VI-VI in FIG. 5.

FIG. 6 is a cross section taken along lines VI-VI in FIG. 5. As illustrated in FIGS. 3, 4 and 6, the first center section 130a has a first surface facing the common pump case 120 (or the upper surface in this embodiment) connected to the common pump case 120 so as to seal the first opening 120a of the common pump case 120 in a liquid tight manner, with the first hydraulic pump 110a supported on the first surface. The first pump shaft 111a of the first hydraulic pump 110a has the upstream end in the power transmitting direction (or the lower end in this embodiment) extending downwardly through the first center section 130a to form an extension. The extension is designed to receive the power for the pump unit 100 and the cooling fun 181 from the power source 180 through a suitable power transmission mechanism such as a belt type power transmission device.

On the other hand, as illustrated in FIGS. 3, 4 and 6, the second center section 130b has a first surface facing the common pump case 120 (or the lower surface in this embodiment) connected to the common pump case 120 so as to seal the second opening 120b of the common pump case 120 in a liquid tight manner, with the second hydraulic pump 110b supported on the first surface. The second pump shaft 111b of the second hydraulic pump 110b has the downstream end in the power transmitting direction (or the upper end in this embodiment) extending upwardly through the second center section 130b to form an extension through which a charge pump 150 described below is driven.

The first and second pump shafts 111a and 111b are non-rotatably connected relative to one another, by the connection between the downstream end portion of the first pump shaft in the power transmitting direction (or the upper end) and the upstream end portion of the second pump shaft in the power transmitting direction (or the lower end). The connection portions of the shafts 111a and 111b are supported in the bearing wall 120c of the common pump case 120. In this embodiment, the pump unit 100 is provided with a coupler 116 for receiving the connection portions of the first pump shaft 111a and the second pump shaft 111b, and coupling the same together. The coupler 116 is rotatably supported via a bearing member 117 in a bearing hole 120d formed in the bearing wall 120c. Whereby, the upper end portion of the first pump shaft and the lower end portion of the second pump shaft are non-rotatably connected relative to one another, and rotatably supported by the bearing wall 120c.

In this embodiment, as illustrated in FIGS. 3 and 4, two ball bearings are disposed parallel to one another to be used as the bearing member 117. Rather, it is a matter of course to employ just one ball bearing for supporting the coupler 116.

Figure 8:
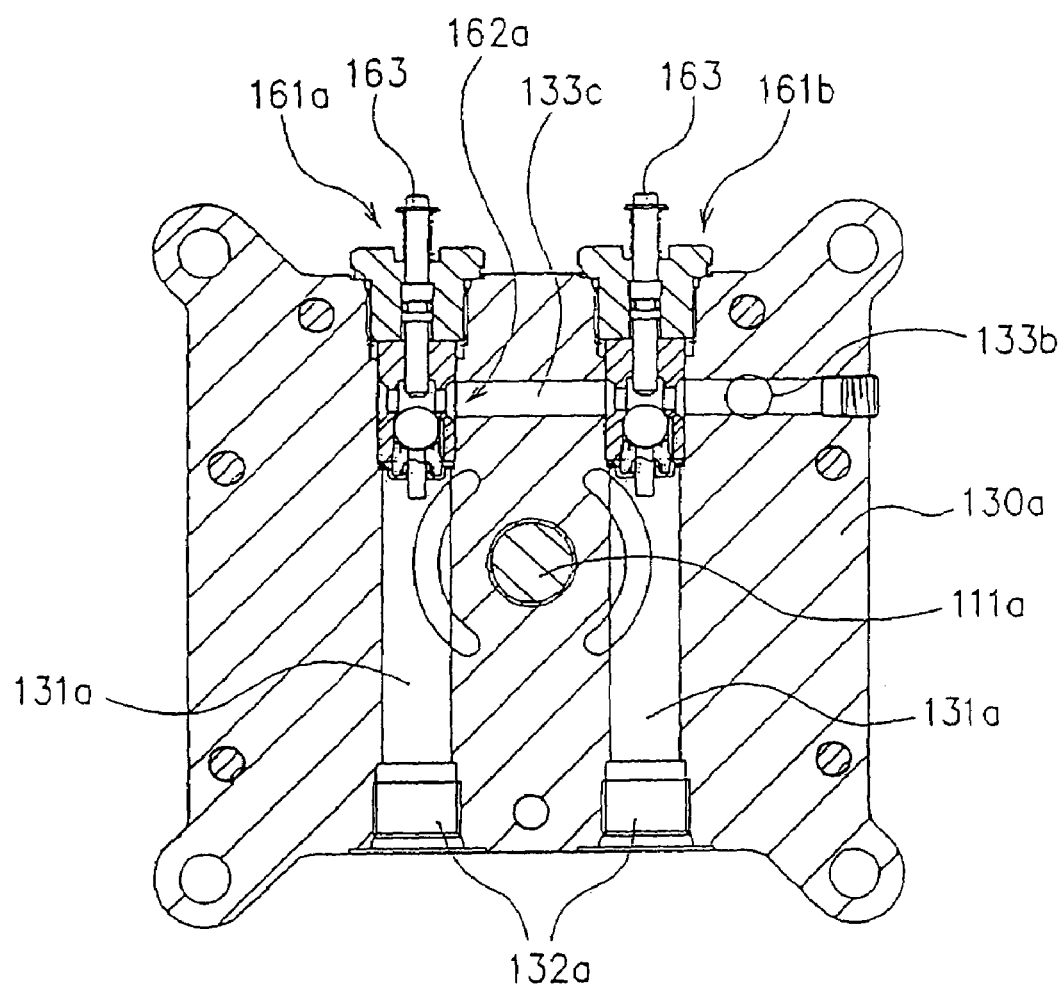
FIG. 8 is a cross section taken along lines VIII-VIII in FIG. 4.

FIGS. 7 and 8 are respectively cross sections taken along lines VII-VII and VIII-VIII in FIG. 4. As illustrated in FIGS. 2 and 8, the first center section 130a forms a first pair of hydraulic passages 131a for the first hydraulic pump 110a having first ends that respectively open to the inside of the common pump case 120 through one side of the first center section 130a in the pump shaft direction so as to communicate with inlet/outlet ports of the first hydraulic pump 110a, and second ends that respectively open to the outside of the common pump case 120 through the other side of the center section 130a so as to form a first pair of inlet/outlet ports 132a which serve as connection ports with the first pair of hydraulic lines 184a between the first hydraulic pump 110a and the first hydraulic motor 182a.

The first center section 130a has mounting bosses integrally formed therewith at four corners, for mounting the first center section on a chassis of the vehicle (see FIG. 8).

On the other hand, as illustrated in FIGS. 2 and 7, the second center section 130b forms a second pair of hydraulic passages 131b for the second hydraulic pump 110b having first ends that respectively open to the inside of the pump case 120 through one side of the second center section 130b in the pump shaft direction so as to communicate with inlet/outlet ports of the second hydraulic pump 110b, and second ends that respectively open to the outside of the common pump case 120 through the other side of the center section 130b so as to form a second pair of inlet/outlet ports 132b which serve as connection ports with the second pair of hydraulic lines 184b between the second hydraulic pump 110b and the second hydraulic motor 182b.

The second center section 130b also forms a first bore 133a having a first end that opens to the outsides of the second center section 130b through the upper surface thereof to form an inlet port for charging 134, and bifurcated second ends so as to communicate with the second pair of hydraulic passages 131b, while opening to the second hydraulic pump accommodation chamber through the lower surface of the second center section 130b. The inlet port for charging 134 communicates with an outlet port 151 of the charge pump 150 so as to receive pressurized hydraulic fluid directly from the charge pump 150.

As illustrated in FIG. 6, the one end of the bifurcated second ends of the first bore 133a, which opens to the second hydraulic pump accommodation chamber, is connected with a first end of a conduit portion 133b. The conduit 133b is disposed within the pump unit 100, as extending through the second hydraulic pump accommodation chamber, the bearing wall 122c and the first hydraulic pump accommodation chamber, and having the second end reaching the first center section 130a.

In this embodiment, the bearing wall 120c forms a hydraulic fluid communication hole 120f for communication between the first hydraulic pump accommodation chamber and the second hydraulic pump accommodation chamber. The hydraulic fluid communication hole 120f also allows the conduit 133b to pass therethrough. With this arrangement, the conduit 133b can extend through the bearing wall 120c (see FIGS. 5 and 6).

The first center section also forms a second bore 133c having one end that communicates with the second end of the conduit 133b, and bifurcated second ends that respectively communicate with the first pair of hydraulic passages 131a.

The thus arranged first bore 133a, conduit 133b and second bore 133c together form a common charge passage 133 for feeding pressurized hydraulic fluid from a suitable hydraulic fluid feeding mechanism such as the charge pump to the first pair of hydraulic lines 184a and the second pair of hydraulic lines 184b via the first pair of hydraulic passages 131a and the second pair of hydraulic passages 131b (see FIG. 2).

Instead of the conduit 133b, it is possible to employ a bore formed in a side wall of the common pump case 120, and the first and second center sections 130a and 130b.

The charge line 133 of this embodiment thus disposed within the pump unit 100 is advantageous in the fact that the pressurized hydraulic fluid can be replenished to the first and second pairs of hydraulic lines 184a and 184b via the first and second pair of inlet/outlet ports 132a and 132b only by feeding pressurized hydraulic fluid from a suitable hydraulic fluid feeding mechanism to the inlet port for charging 134. Whereby, the piping structure for charging can be simplified, and the manufacturing cost can be lowered through the reduction of the number of parts and the improved efficiency in assembling operation can be obtained.

As an additional advantage, the above arrangement where the charge line 133 is disposed within the pump unit 100 can make the charge line 133 unlikely to be damaged by the contact against external parts. Whereby, the leakage of the hydraulic fluid to the outsides from the charge line 133 can be effectively prevented. The hydraulic fluid leakage preventive arrangement is advantageous particularly, when the pump unit 100 is used in vehicles such as a lawnmower.

The outlet port 151 of the charge pump 150 is communicated with the inlet port for charging 134, and also a first end of a pressure relief line 152 that is provided with a relief valve 152 for regulating the hydraulic pressure of the charge line 133 (see FIGS. 2 and 6). The pressure relief line 153 has a downstream end or a second end that communicates with the inside of the common pump case 120, also serving as a reservoir tank 150, via a drain port 135 formed in the second center section 130b (see FIGS. 2 and 6). The reference codes 150 and 156 in FIG. 3 respectively represent an inlet port of the charge pump, and an inlet port which acts as a connection port with the reservoir tank 185 and communicates with the inlet port of the charge pump 185.

The second end of the first bore 133a constituting a part of the charge line 133 is, as illustrated in FIGS. 2, 6 and 7, respectively connected with each of the first pair of hydraulic passages 131b via check valves 161c and 161d.

Similarly, the bifurcated second ends of the second bore 133b constituting a part of the charge line 133 are, as illustrated in FIGS. 2, 6 and 8, respectively connected with each of the first pair of hydraulic passages 131a via check valves 161a and 161b.

These check valves 161a, 161b, 161c and 161d are designed to allow the flow of the pressurized hydraulic fluid from the charge passage 133 to the lower pressured line of the first pair of hydraulic lines 184a and the lower pressured line of the second pair of hydraulic lines 184b, while preventing the reverse flow.

Bypass lines 162a and 162b each having a throttle valve are preferably formed between the charge passage 133 and at least one of the first pair of hydraulic passages 131a, and between the charge passage 133 and at least one of the second pair of hydraulic passages 131b (see FIGS. 2, 7 and 8) The bypass lines 162a and 162b are designed to assure the neutralization of the hydraulic pumps 110a and 110b. Specifically, even if the swash plates 114a and 114b of the hydraulic pumps 110a and 110b tilt from the neutral positions by a small angle, there occurs the pressure difference between the first pair of hydraulic lines 184a, and/or between the second pair of hydraulic lines 184b. This pressure difference causes the rotation of the hydraulic motors 182a and 182b. That is, even a slight amount of the displacement between the actual neutral positions and the predetermined design positions of the swash plates 114a and 114b due to assembling error or the like causes an unintentional rotation of the hydraulic motors 182a and 182b. On the contrary, the bypass lines 162a and 162b, as described above, allow the pressurized hydraulic fluid of the small amount to leak therethrough from the first pair of hydraulic lines 184a or the second pair of hydraulic lines 184b. Thus, the swash plates can have the neutral positions of a broadened effective area by effectively limiting the pressure difference between the pair of first hydraulic lines 184a, and/or between the second pair of hydraulic lines 184b, thereby effectively avoiding the unintentional rotation of the hydraulic motors 182a and 182b, even for the swash plates 114a and 114b having the actual neutral position displaced from the design neutral position due to the assembling errors or the like.

In view of transmission efficiency between the hydraulic pumps 110a, 110b and the hydraulic motors 182a, 182b, the leakage of the pressurized hydraulic fluid from the first and second pairs of hydraulic lines 184a, 184b through the bypass lines 162a, 162b is not preferable. Therefore, the bypass lines 162a, 162b are preferably provided in portions from the first charge passage 133 to one of the first pair of hydraulic passages 133a, and to one of the second pair of hydraulic passages 133b, and more preferably to one of the first pair of hydraulic passages 133a which has a higher pressure during rearward movement of the vehicle. This is because the forward movement of the vehicle frequently occurs as compared with the rearward movement.

The check valves 161a, 161b, 161c and 161d are more preferably provided with release means 163 to forcibly bring the first pair of hydraulic passages 131a into communication with one another, and the second pair of hydraulic passages 131b into communication with one another, if an emergency arises, as illustrated in FIG. 7 and 8. The release means 163 are designed to easily move the vehicle, when the vehicle must forcibly be moved or the vehicle wheels must forcibly be rotated by man power or the like due to the disorder of the power source 180, the hydraulic pumps 110a, 110b or the like. Specifically, when the vehicle wheels connected to the hydraulic motors 182a and 182b are forcibly rotated with the first pair of hydraulic lines 184a and/or the second pair of hydraulic lines 184b lying in the closing state, there occurs the pressure difference between the first pair of hydraulic lines 184a, and/or between the second pair of hydraulic lines 184b. As a result, the vehicle is hardly moved, or the vehicle wheels are hardly rotated. On the contrary, the release means can easily achieve the communications between the first pair of hydraulic passages 131a, and between the second pair of hydraulic passages 131b by mechanically releasing all the check valves 161a to 161d. Whereby, the vehicle can easily be moved by man power or the like.

As illustrated in FIG. 5, all the release means 163 are preferably disposed in the same side of the center section 130, so that the link mechanism linking these release means 163 for operation of the same can have a simplified structure.

The pump unit 100 of this embodiment includes the charge pump 150, as a hydraulic fluid feeding mechanism for the first and second pair of hydraulic lines 184a and 184b, to forcibly feed the pressurized hydraulic fluid into the inlet port for charging 134. As an alternative to the arrangement using the charge pump, the pump unit 100 may have an arrangement where the inlet port 134 is connected to the hydraulic fluid tank, thereby allowing the hydraulic fluid to spontaneously flow into the inlet port 134 when the pressure in a lower pressure line of the first pair of hydraulic lines 184a and/or the pressure in a lower pressure line of the second pair of hydraulic lines 184b drops from a predetermined value.

As described above, the pump unit 100 of this embodiment is designed to have the first and second hydraulic pump 110a and 110b accommodated within the common pump case 120, thereby achieving a lower manufacturing cost through a relatively small number of parts in comparison with a prior pump unit which needs pump cases respectively used for the first hydraulic pump and the second hydraulic pump.

As an additional advantage, in the pump unit 100, both first and second hydraulic pumps 110a and 10b can be mounted on the vehicle only by mounting the unitary common pump case 120 with the first and second pumps 110a and 110b therein on the vehicle. Whereby the work efficiency in assembling the vehicle can be also enhanced.

As described above, in the pump unit 120, the common pump case 120 has the first and second openings 120a and 120b at the opposed ends thereof along the pump shaft direction, which openings 120a and 120b respectively allowing the first and second hydraulic pump 110a and 110b to pass therethrough into the pump case, and the bearing wall 120c which is disposed between the first and second openings to support the connection portion of the first and second pump shafts 111a and 111b. The pump case 120 also has the first and second openings 120a and 120b respectively sealed by the first and second center section 130a and 130b, with the first and second hydraulic pumps 110a and 110b respectively supported by the center sections 130a and 130b. Hence, the pump unit 100 allows the first and second hydraulic pumps 110a and 110b to be respectively placed into the common pump case 120 through the first and second openings 120a and 120b, after mounting the first and second hydraulic pumps I 10a and 110b respectively on the first and second center sections 130a and 130b. Whereby, the assembling efficiency of the pump unit can be enhanced. Furthermore, this arrangement allows either one or both of the hydraulic pumps 110a and 110b to be detached from the common pump case 120 with the housing being mounted of the vehicle, thereby achieving the improved operation efficiency in a maintenance, or the like.

Since the pump unit 100 is designed so that the first and second center section 130a and 130b are respectively disposed at the opposed ends of the pump case in the longitudinal direction thereof not to be located between the first and second hydraulic pumps 110a and 110b. This allows for great flexibility in designing connection portions of the first and second pump shaft 111a and 111b. Specifically, if the center section is disposed between the first and second hydraulic pumps, the first and second pump shafts must be connected together without interfering passages formed in the center section, resulting in a lowered flexibility in designing the connection portions and, in some cases, a large-sized pump unit. On the contrary, the pump unit 100 of this embodiment can effectively avoid these problems.

Figure 9:
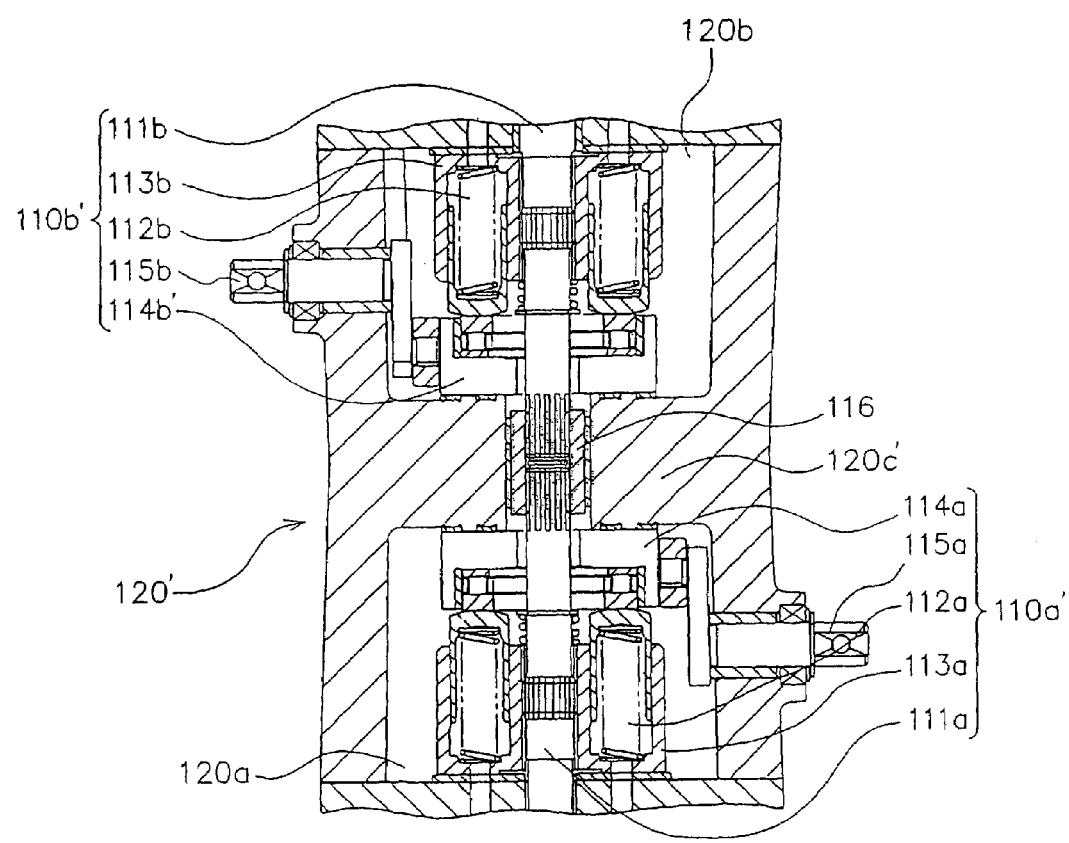
FIG. 9 is a longitudinal cross-sectional front view of a portion of the tandem pump unit according to another embodiment of the first aspect of the present invention.
Figure 10:
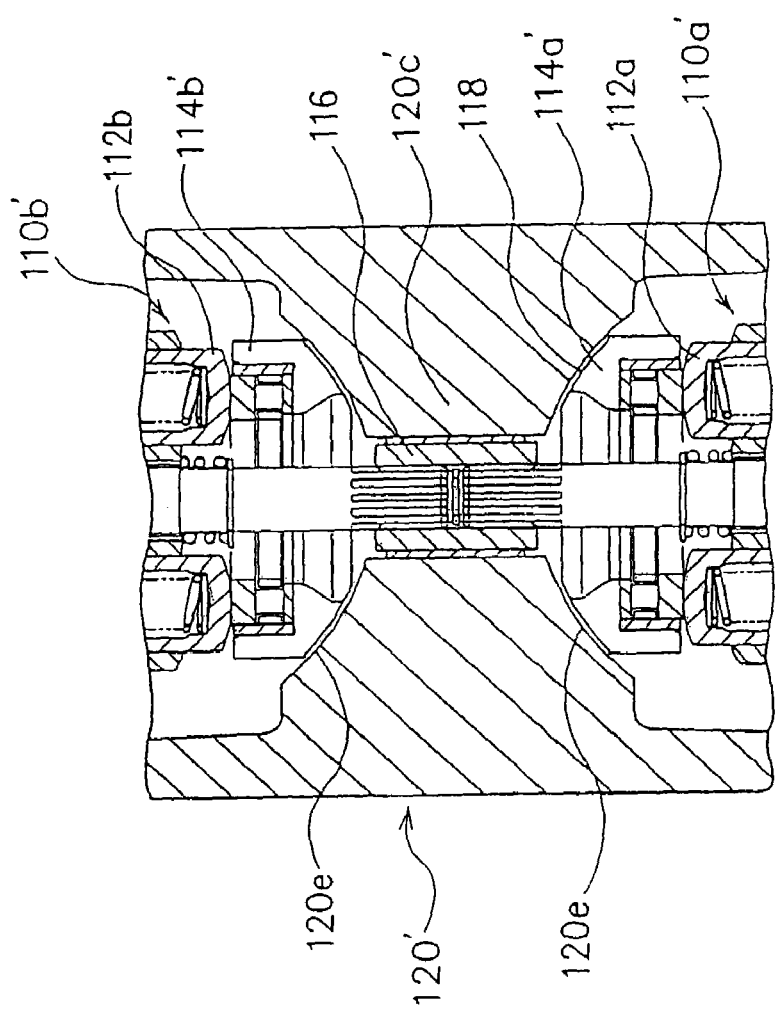
FIG. 10 is a longitudinal cross-sectional side view of a portion of the tandem pump unit according to the embodiment of FIG. 9

In this embodiment, the swash plates of the first and second hydraulic pumps 110a and 110b are of a trunnion type. However, it is of course to employ the swash plates of a cradle type. FIGS. 9 and 10 are respectively a longitudinal cross-sectional front view and a longitudinal cross-sectional side view of a modified pump unit according to the present invention, which includes hydraulic pumps having swash plates of a cradle type.

Figure 34:
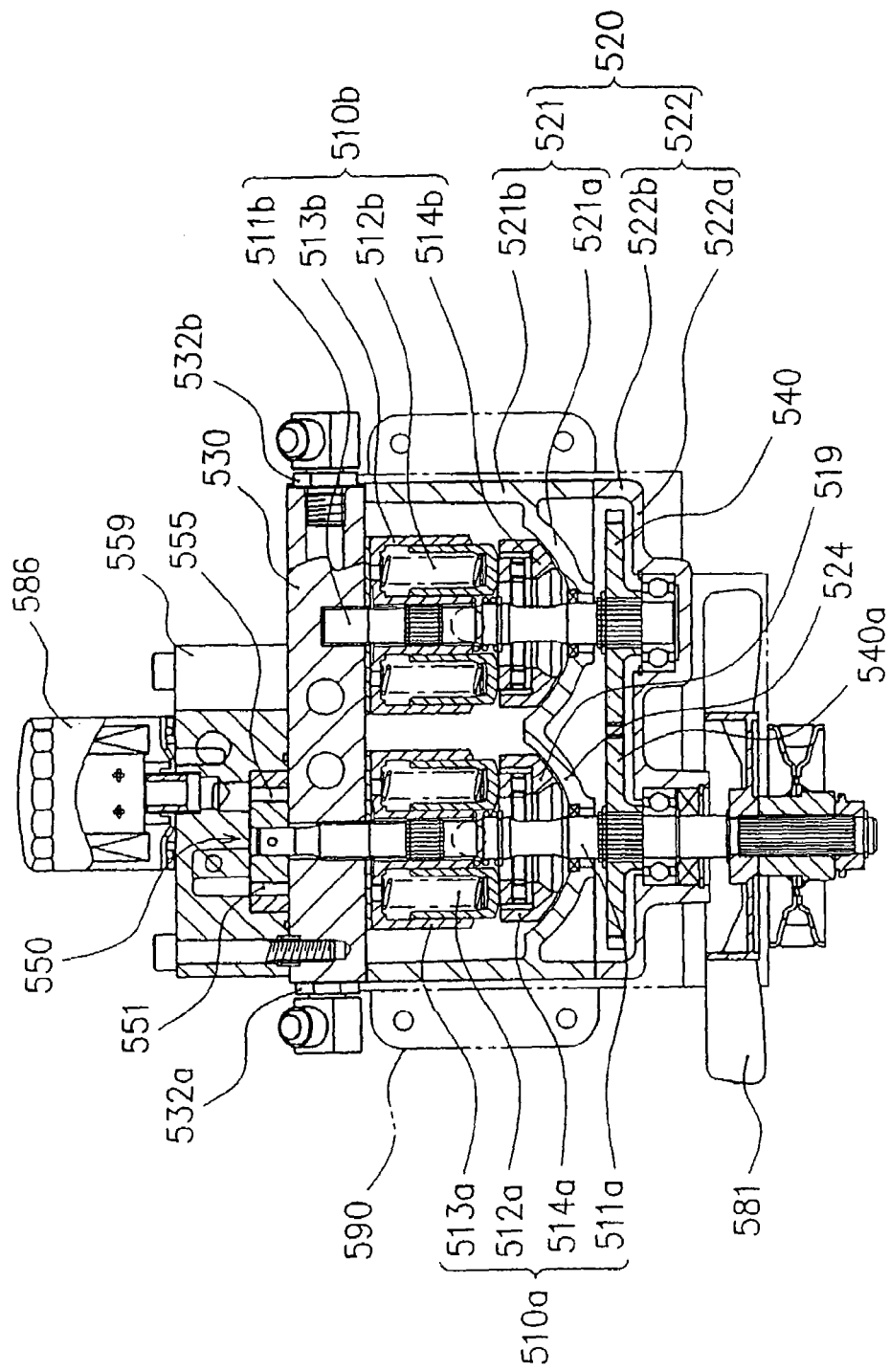
FIG. 34 is a cross section taken along lines XXXIV-XXXIV in FIG. 33.

When the hydraulic pumps have angularly adjustable swash plates 414a and 414b of a cradle type, as illustrated in FIG. 34, the bearing wall 120c' may preferably forms, on its side facing the hydraulic pumps 110a' and 10b', spherical concave surfaces 120e respectively adapted to spherical convex surfaces 118 formed in the rear sides of the swash plates which rear sides being opposite to the surfaces facing the piston units 112a and 112b. With this arrangement, the spherical concave surfaces 120e can slidingly guide the spherical convex surfaces 118 of the swash plates 114a and 114b, thereby securely resting the swash plates 114a and 114b thereon.

Figure 11:
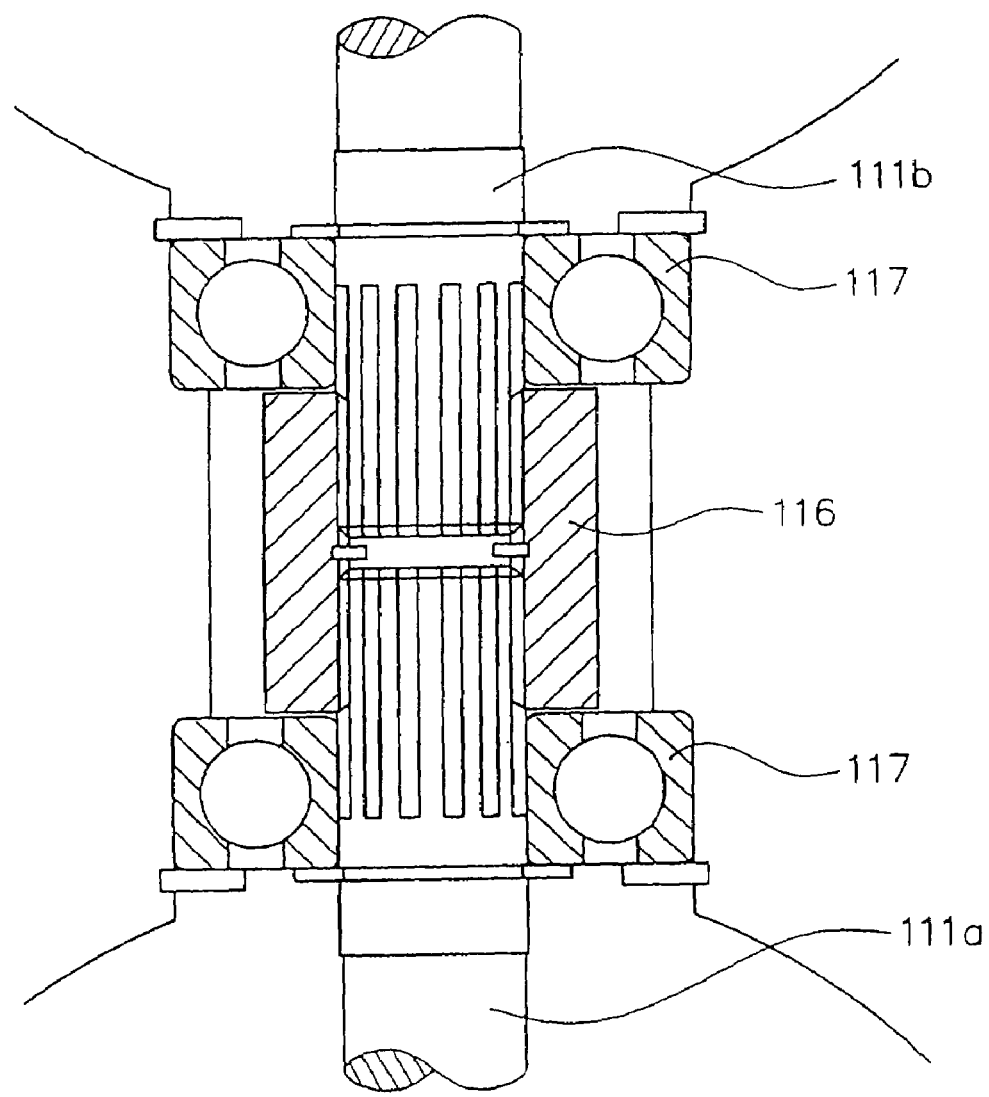
FIG. 11 is a cross section illustrating a modified example of a connecting portion between first and second hydraulic pump shafts.

As described above, in this embodiment, the bearing members 117 are interposed between the outer circumferential surface of the coupler 116 with the connection portions of the first and second pump shafts 111a and 111b non-rotatably inserted thereinto, and the inner circumferential surface of the bearing hole 120d formed in the bearing wall 120c, so that the adjacent ends of the first and second pump shafts 111a and 111b are supported on the bearing wall 120c and are connected non-rotatably relative to one another. Alternative to this arrangement, as illustrated in FIG. 11, it is possible that the bearing members 117 are interposed between the outer circumferential surface of the pump shaft 111a and the inner circumferential surface of the bearing hole 120d, and between the outer circumferential surface of the pump shaft 111b and the inner circumferential surface of the bearing hole 120d.

In this embodiment, the bearing wall 120c is formed integrally with the pump case 120. Instead of this arrangement, it is also possible to employ a bearing wall separately arranged from the pump case to be mounted thereto.

Second Embodiment

The preferred embodiment of the pump unit according to the second aspect of the present invention will be hereinafter described with reference to the accompanying drawings.

A pump unit 200 according to the second aspect of the present invention is designed to be operated in association with an actuator that is connected thereto via first and second pairs of hydraulic lines 284a and 284b and driven through an effect of pressurized hydraulic fluid in the pairs of hydraulic lines. This embodiment will be described by taking for example the case that hydraulic motors 282a and 282b each are used as the actuator.

FIG. 1 is an expansion plan view of a vehicle to which the pump unit 200 of this embodiment is applied. The reference codes 285, 297a and 297b, 299, 298a and 298b, and 292a and 292b in FIG. 1 respectively represent a reservoir tank, caster wheels, a driver seat, steering wheels, and a linkage mechanism connecting between the steering wheels and the hydraulic motors.

Figure 12:
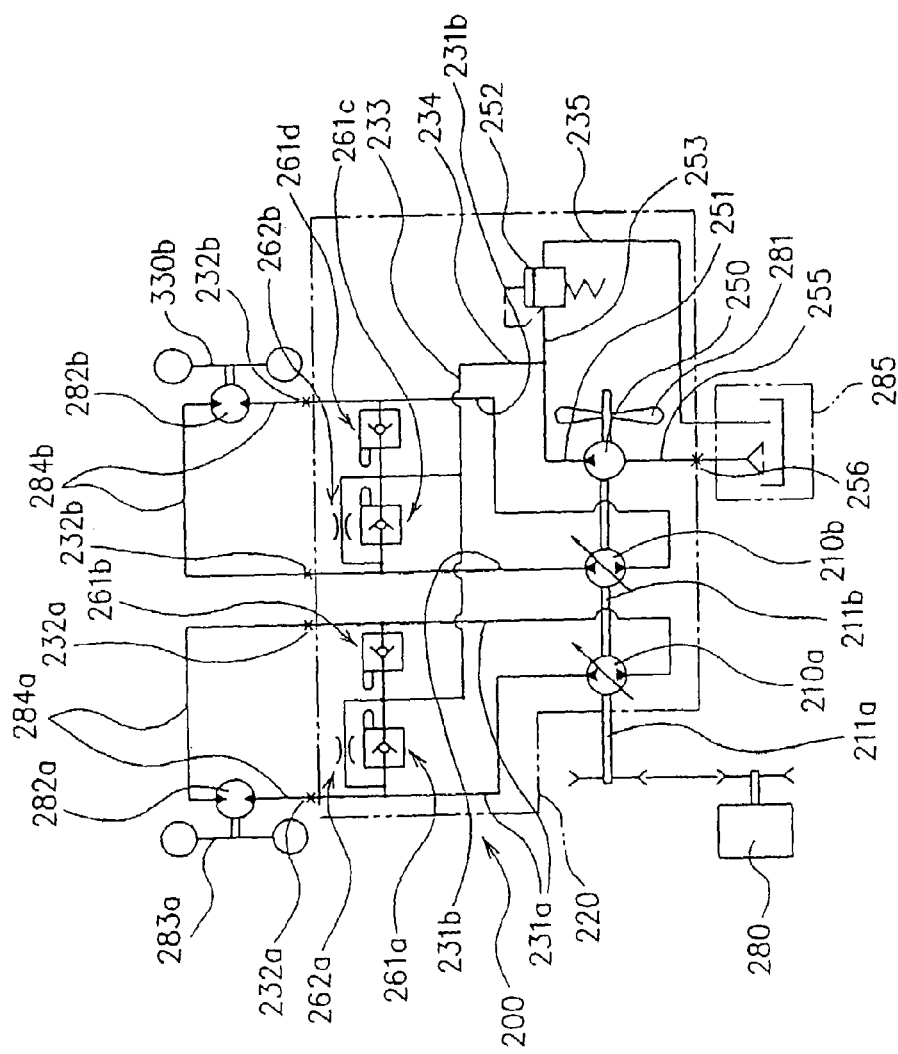
FIG. 12 is a hydraulic circuit diagram of the vehicle to which one embodiment of a tandem pump unit according to the second aspect of the present invention is applied.
Figure 13:
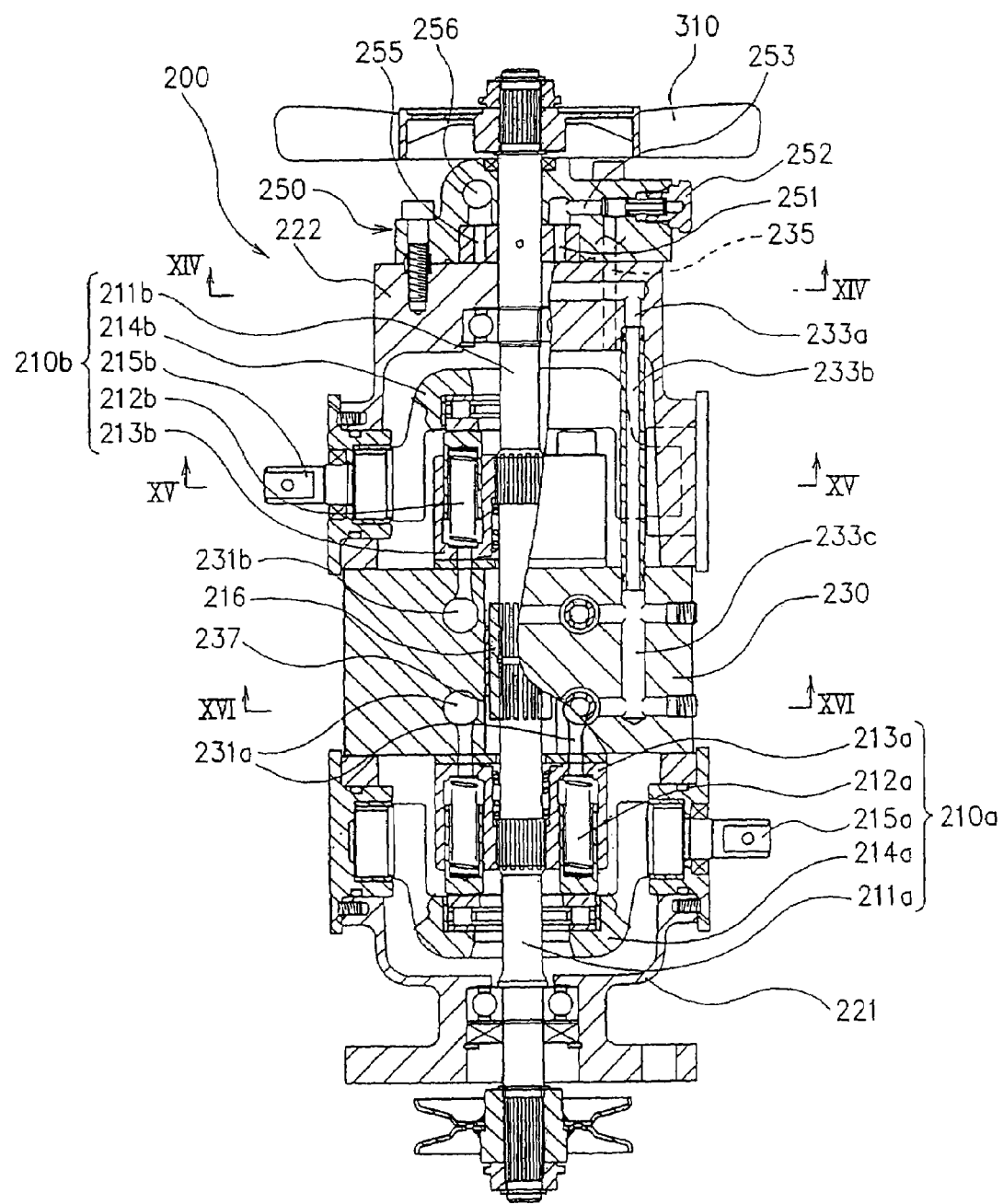
FIG. 13 is a longitudinal cross-sectional front view of the tandem pump unit according to the first embodiment of the second aspect of the present invention.
Figure 15:
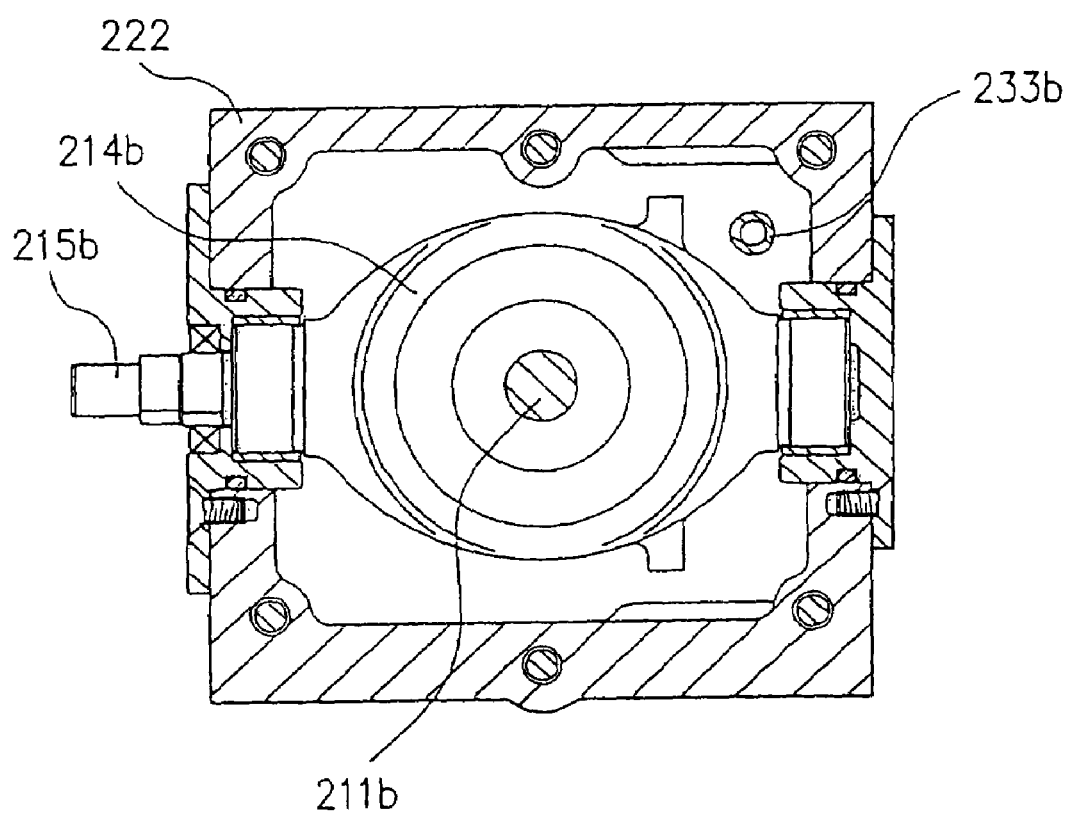
FIG. 15 is a cross section taken along lines XV-XV in FIG. 13.
Figure 16:
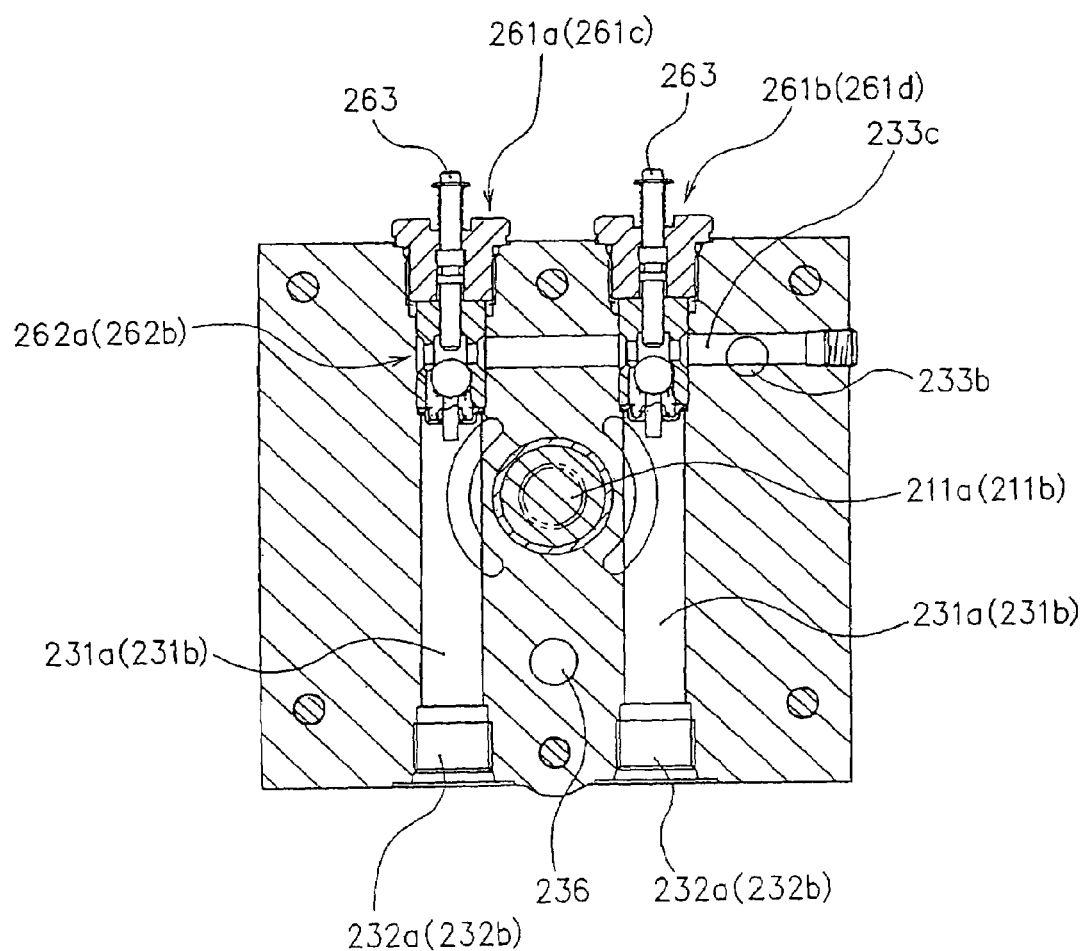
FIG. 16 is a cross section taken along lines XVI-XVI in FIG. 13.

FIG. 12 is a hydraulic circuit diagram of the vehicle to which the tandem pump unit 200 of this embodiment is applied. FIG. 13 is a longitudinal cross-sectional side view of the tandem pump unit 100. FIGS. 14 to 16 are respectively cross sections taken along lines XIV-XIV, XV-XV, and XVI-XVI in FIG. 13.

As illustrated in FIGS. 12 and 13, the pump unit 200 is adapted to be used in a vehicle having right and left drive wheels 283a and 283b to which first and second hydraulic motors 282a and 282b are respectively connected. The pump unit 200 is of a tandem type which includes a first hydraulic pump 2 10a and a second hydraulic pump 210b respectively connected to the first and second hydraulic motors 282a and 282b via the first pair of hydraulic lines 284a and the second pair of hydraulic lines 284b, which first hydraulic pump 210a and second hydraulic pump 210b respectively have a first pump shaft 211a and a second pump shaft 211b disposed in a tandem arrangement, that is, coaxially aligned as connected together in a non-rotatable manner relative to one another.

The connection form between the right and left drive wheels 283a and 283b, and the first and second hydraulic motors 282a and 282b meant in this embodiment includes the direct connection of the drive wheels respectively to those hydraulic motors, and also the operative connection of the drive wheels respectively to those drive wheels via a suitable power transmission mechanism.

In this embodiment, the pump unit 200 is of a vertical type that has the vertically extending first and second hydraulic pump shafts 211a and 211b. However, the second aspect of the present invention is not necessarily limited to this arrangement. Rather, it is a matter of course to employ the pump unit of a horizontal type that has the horizontally extending first and second hydraulic pump shafts 211a and 211b. The reference codes 280, 281 and 285 in FIG. 12 respectively represent a power source, a cooling fun and a reservoir tank.

As illustrated in FIG. 13, the pump unit 200 also includes a common center section 230 which has a first surface facing one side along the pump shaft (or the lower surface in this embodiment) to support the first hydraulic pump 210a and a second surface facing the other side of the pump shaft (or the upper surface in this embodiment) to support the second hydraulic pump 210b, and a first pump case 221 and a second pump case 222 which respectively accommodate the first and second hydraulic pumps 210a and 210b.

As illustrated in FIG. 13, in this embodiment, the first and second hydraulic pumps 210a and 210b are axial piston pumps of a variable displacement type. The pumps 210a and 210b respectively include the first hydraulic pump shaft 211a and the second hydraulic pump shaft 211b, both of which are coaxially disposed and non-rotatably connected to one another at the adjacent ends thereof, a first piston unit 212a and a second piston unit 212b that are reciprocatingly movable according to the rotation of the pump shafts, a first cylinder block 213a and a second cylinder block 213b that respectively and reciprocatingly support the piston units, a first angularly adjustable swash plate 214a and a second angularly adjustable swash plate 214b that regulate the stroke length of the piston units by varying their tilting angle to vary their input/output flow rates, and a first control shaft 215a and a second control shaft 215b that control their tilting angles of these swash plates.

In the above pump units, by operating the swash plates to respectively vary the input/output flow rate of the first and second pump units 210a and 210b, there occurs a pressure difference of hydraulic fluid between the first pair of hydraulic lines 284a, and/or between the second pair of hydraulic lines 284b. The pressure difference causes a motor shaft of the first hydraulic motor 282a and/or a motor shaft of the second hydraulic motor 282b to rotate at a speed proportional to the amount of the pressure difference, thereby driving the drive wheels 283a and 283b operatively connected to the motor shafts.

As described above, the first and second hydraulic pumps 210a and 210b according to this embodiment are of the variable displacement type, and the first and second hydraulic motors in association with the first and second hydraulic pumps 210a and 210b are of the fixed displacement type. However, the second aspect of the present invention is not necessarily limited to this arrangement. That is, it is possible to employ the hydraulic pumps of the fixed displacement type, and the hydraulic motors of the variable displacement type driven by the hydraulic pumps, or the hydraulic pumps and the hydraulic motors, both of which are of the variable displacement type.

In this embodiment, the first and second hydraulic pumps 210a and 210b are of the axial piston type. Alternatively, the pump unit may employ the hydraulic pumps of a radial piston type.

The first and second control shafts 115a and 115b respectively have inner ends that extend into the first and second pump cases 221 and 222 to be connected to the first and second swash plates 214a and 214b, and outer ends that protrude outwards from the first and second pump cases 221 and 222 in the vehicle width direction orthogonal to the pump shafts 211a and 211b to allow these shafts 215a and 215b to extend away from one another. This arrangement is advantageous when the pump unit 200 is installed on the vehicle having push-pull control levers 198a and 198b as illustrated in FIG. 1, since the first and second control shafts 215a and 215b can have the rotational axes parallel to the pivotal axes of the control levers, thereby achieving the simplification of a link mechanism between these control shafts and the control levers.

As illustrated in FIGS. 13 and 16, the center section 230 forms a first pair of hydraulic passages 231a for the first hydraulic pump 210a, having first ends opening at the surface facing the first piston unit 212a (or at the lower surface in this embodiment) for respectively communicating with the inlet/outlet ports of the first piston unit 212a, and second ends opening to the outside of the center section 230 for forming a first pair of inlet/outlet ports 232a which respectively serve as connection ports with the first pair of hydraulic lines 284a between the first hydraulic pump 210a and the first hydraulic motor 282a (see FIGS. 12 and 16).

Similarly, the center section 230 also forms a second pair of hydraulic passages 231b for the second hydraulic pump 210b, having first ends opening at the surface facing the second piston unit 212b (or at the upper surface in this embodiment) so as to communicate with the inlet/outlet ports of the second piston unit 212b, and second ends opening to the outside of the center section 230 so as to form a second pair of inlet/outlet ports 232b which respectively serve as connection ports with the second pair of hydraulic lines 284b between the second hydraulic pump 210b and the second hydraulic motor 282b (see FIG. 12).

As described above, in this embodiment, the common center section 230 forms all the first and second pairs of inlet/outlet ports 232a and 232b that respectively serve as the connection ports for connection with the first and second pairs of hydraulic lines 284a and 284b. Whereby, the piping work between the hydraulic pumps 210a and 210b, and the hydraulic motors 282a and 282b can be facilitated. Preferably, all the inlet/outlet ports 232a and 232b are formed in the same side of the center section 230, resulting in a further improved efficiency in the piping work.

Furthermore, as illustrated in FIG. 13, the center section 230 forms a bearing portion 237 which support the downstream end portion (or the upper end portion in this embodiment) of the first pump shaft 211a and the upstream end portion (or the lower end portion in this embodiment) of the second pump shaft 211b with respect to the power transmitting direction. This arrangement provides stable support of the first and second pump shafts 211a and 211b.

In this embodiment, the pump unit 200 is provided with a coupler 216 for non-rotatably receiving the upper end portion of the first pump shaft 211a and the lower end portion of the second pump shaft 211b. The coupler 216 is rotatably supported in the bearing potion 237.

The first pump shaft 211 a has the upstream end portion with respect to the power transmitting direction (or the lower end portion in this embodiment) which extends outwardly (or downwardly in this embodiment) through the first pump case 221 to form a lower extension for receiving the power from the power source. The second pump shaft 211b has the downstream end portion with respect to the power transmitting direction (or the upper end portion in this embodiment) which extends outwardly (or upwardly in this embodiment) through the second pump case 222 to form an upper extension for driving a charge pump 250 described below and the cooling fun 281.

The first pump case 221 of a box shape has an opening at a first side (or the upper side in this embodiment) along the pump shaft direction, which opening allows the first hydraulic pump 210a to pass therethrough into the first pump case 221. The first pump case 221 is connected to the center section 230 in such a manner as to have the opening sealed in a liquid tight manner by the lower surface of the center section 230.

The second pump case 222 of a box shape has an opening at a second side (or the lower side in this embodiment) along the pump shaft direction, which opening allows the second hydraulic pump 210b to pass there through into the second pump case 222. The second pump case 222 is connected to the center section 230 in such a manner as to have the opening sealed in a liquid tight manner by the upper surface of the center section 230.

In this embodiment, a first hydraulic pump accommodation chamber and a second hydraulic pump accommodation chamber are respectively defined between the lower surface of the center section 230 and the first pump case 221, and the upper surface of the center section 230 and the second pump case 222. As illustrated in FIG. 16, the center section 230 preferably forms a hydraulic fluid communication hole 236, through which the first hydraulic pump accommodation chamber communicates with the second hydraulic pump accommodation chamber. The hydraulic fluid communication hole 236 allows both first and second hydraulic pump accommodation chambers to be used as the reservoir tank.

The pump unit 200 also forms a common charge line 233 which has a first end forming a inlet port for charging 234 for communication with a suitable pressurized hydraulic fluid feeding mechanism such as a reservoir or the charge pump, and a second end communicating with the first pair of hydraulic passages and the second pair of hydraulic passages.

Those formed as the reservoir include the reservoir tank separately formed from the pump cases, and the pump cases used also as the hydraulic fluid tank.

In this embodiment, the first end portion of the charge line 233 is open to the outside of the pump unit so as to communicate with the charge pump disposed outside of the pump cases.

In this embodiment, the charge line 233 includes a first bore 233a formed in the circumferential wall of the second pump case 222, a conduit 233b disposed within the second hydraulic pump accommodation chamber and a second bore 233c formed in the center section 230. The first bore 233a has a first end at the upper surface to form the inlet port for charging 234 and a second end opening to the second hydraulic pump accommodation chamber. The conduit 233b has a first end communicating with the second end of the first bore 233a and a second end reaching the center section 230. The second bore 233c has a first end communicating with the second end of the conduit 233b and a second end communicating with the first pair of hydraulic fluid passages 231a and the second pair of hydraulic fluid passages 231b.

The charge line 233 of this embodiment thus disposed within the pump unit 200 is advantageous in the fact that the pressurized hydraulic fluid can be replenished to the first and second pairs of hydraulic lines 284a and 284b via the first and second pair of inlet/outlet ports 232a and 232b only by feeding pressurized hydraulic fluid from a suitable hydraulic fluid feeding mechanism to the inlet port for charging 234. Whereby, the piping structure for charging can be simplified, and the manufacturing cost can be lowered through the reduction of the number of parts and the improved efficiency in assembling operation can be obtained.

As an additional advantage, the above arrangement where the charge line 233 is disposed within the pump unit 200 can make the charge line 233 unlikely to be damaged by the contact against external parts. Whereby, the leakage of the hydraulic fluid to the outsides from the charge line 233 can be effectively prevented. The hydraulic fluid leakage preventive arrangement is advantageous particularly, when the pump unit 200 is used in vehicles such as a lawnmower.

In this embodiment, the second pump shaft 211b of the second hydraulic pump 210b has the upper end portion which extends upwardly through the second pump case 222 to form the upper extension that supports the charge pump 250 to drive the same. The charge pump 250 has the outlet port communicating with the inlet port for charging 234, and also an outlet port 251 communicating with a first end of a pressure relief line 253 that is provided with a relief valve 252 for regulating the hydraulic pressure of the charge line 233 (see FIG. 12). The pressure relief line 253 has a downstream end or a second end that communicates with the inside of the pump cases, also serving as a reservoir tank 150, via a drain port 235 formed in the circumferential wall of the second pump case 222 (see FIGS. 2 and 6). The reference codes 255 and 256 in FIG. 13 respectively represent an inlet port of the charge pump, and an inlet port which communicates with the inlet port 255 of the charge pump 285, and also acts as a connection port for connection with the reservoir tank 285.

The second end of the charge line 233 is, as illustrated in FIGS. 12 and 16, connected with each of the first pair of hydraulic passages 231a and each of the second pair of hydraulic passages 231b via check valves 261a, 261b, 261c and 261d respectively, which valves allow the flow of the pressurized hydraulic fluid from the charge line 233 to a lower pressure line of the first pair of hydraulic lines 284a and a lower pressure line of the second pair of hydraulic lines 284b, while preventing the pressurized hydraulic fluid from flowing in the reverse direction.

Bypass lines 262a and 262b each having a throttle valve are preferably formed between the charge line 233 and at least one of the first pair of hydraulic passages 231a, and between the charge line 233 and at least one of the second pair of hydraulic passages 231b (see FIGS. 12 and 16) The bypass lines 262a and 262b are designed to assure the neutralization of the hydraulic pumps 210a and 210b. Specifically, even if the swash plates 214a and 214b of the hydraulic pumps 210a and 210b tilt from the neutral positions by a small angle, there occurs the pressure difference between the first pair of hydraulic lines 284a, and/or between the second pair of hydraulic lines 284b. This pressure difference causes the rotation of the hydraulic motors 282a and 282b. That is, even a slight amount of the displacement between the actual neutral positions and the predetermined design positions of the swash plates 214a and 214b due to assembling error or the like causes an unintentional rotation of the hydraulic motors 282a and 282b. On the contrary, the bypass lines 262a and 262b, as described above, allow the pressurized hydraulic fluid of the small amount to leak therethrough from the first pair of hydraulic lines 284a or the second pair of hydraulic lines 284b. Thus, the swash plates can have the neutral positions of a broadened effective area by effectively Limiting the pressure difference between the pair of first hydraulic lines 284a, and/or between the second pair of hydraulic lines 284b, thereby effectively avoiding the unintentional rotation of the hydraulic motors 282a and 282b, even for the swash plates 214a and 214b having the actual neutral position displaced from the design neutral position due to the assembling errors or the like.

In view of transmission efficiency between the hydraulic pumps 210a, 210b and the hydraulic motors 282a, 282b, the leakage of the pressurized hydraulic fluid from the first and second pairs of hydraulic lines 284a, 284b through the bypass lines 262a, 262b is not preferable. Therefore, the bypass lines 262a, 262b are preferably provided in portions from the charge line 133 to one of the first pair of hydraulic passages 231a, and to one of the second pair of hydraulic passages 231b, and more preferably to one of the first pair of hydraulic passages 231a which has a higher pressure during rearward movement of the vehicle. This is because the forward movement of the vehicle frequently occurs as compared with the rearward movement.

The check valves 261a, 261b, 261c and 261d are more preferably provided with release means 263 to forcibly bring the first pair of hydraulic passages 231a into communication with one another, and the second pair of hydraulic passages 231b into communication with one another, if an emergency arises, as illustrated in FIG. 16. The release means 263 are designed to easily move the vehicle, when the vehicle must forcibly be moved or the vehicle wheels must forcibly be rotated by man power or the like due to the disorder of the power source 280, the hydraulic pumps 210a, 210b or the like. Specifically, when the vehicle wheels connected to the hydraulic motors 282a and 282b are forcibly rotated with the first pair of hydraulic lines 284a and/or the second pair of hydraulic lines 284b lying in the closing state, there occurs the pressure difference between the first pair of hydraulic lines 284a, and/or between the second pair of hydraulic lines 284b. As a result, the vehicle is hardly moved, or the vehicle wheels are hardly rotated. On the contrary, the release means can easily achieve the communications between the first pair of hydraulic passages 231a, and between the second pair of hydraulic passages 231b by mechanically releasing all the check valves 261a to 261d. Whereby, the vehicle can easily be moved by man power or the like.

As illustrated in FIG. 16, all the release means 263 are preferably disposed in the same side of the center section 230, so that the link mechanism linking these release means 263 for operation of the same can have a simplified structure.

The pump unit 200 of this embodiment includes the charge pump 250, as a hydraulic fluid feeding mechanism for the first and second pair of hydraulic lines 284a and 284b, to forcibly feed the pressurized hydraulic fluid into the inlet port for charging 234. As an alternative to the arrangement using the charge pump, the pump unit 200 may have an arrangement where the inlet port 234 is connected to the hydraulic fluid tank, thereby allowing the hydraulic fluid to spontaneously flow into the inlet port 234 when the pressure in a lower pressure line of the first pair of hydraulic lines 284a and/or the pressure in a lower pressure line of the second pair of hydraulic lines 284b drops from a predetermined value.

Figure 17:
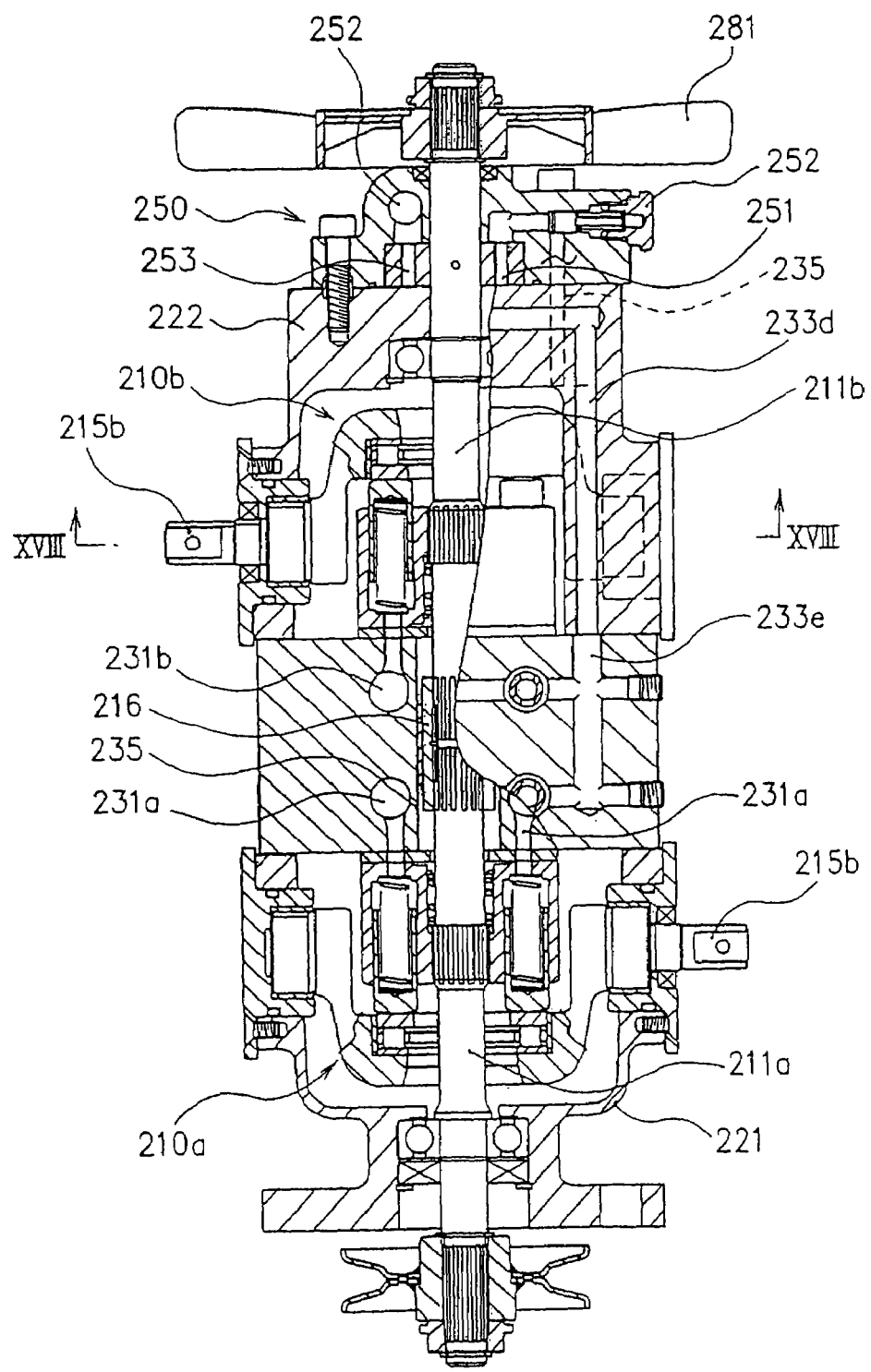
FIG. 17 is a longitudinal cross-sectional front view illustrating a modified example of the tandem pump unit of FIG. 13.
Figure 18:
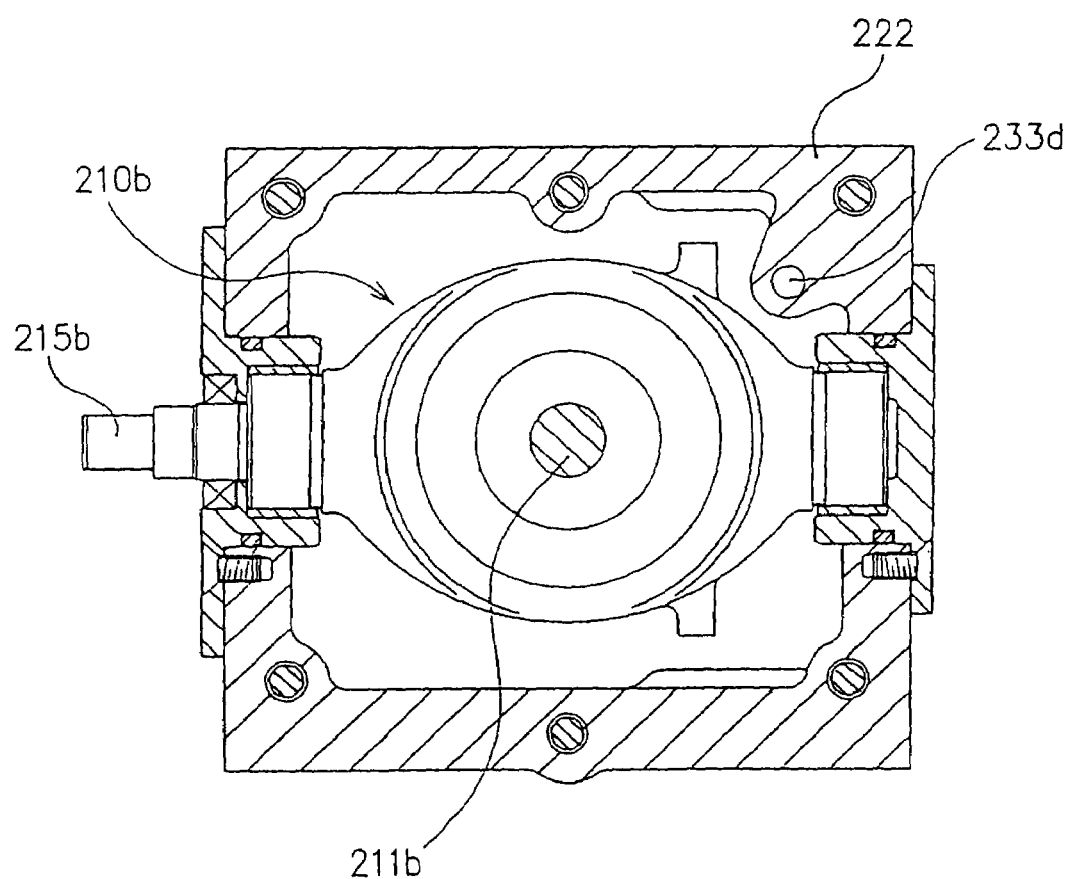
FIG. 18 is a cross section taken along lines XVIII-XVIII in FIG. 17.

As illustrated in FIG. 13, the charge line 233, in this embodiment, includes the first bore 233a formed in the circumferential wall of the second pump case 222, the conduit 233b disposed within the second hydraulic pump accommodation chamber and the second bore 233c formed in the center section 230. It is a matter of course that the second aspect of this invention is not limited to this arrangement. For example, as illustrated in FIGS. 17 and 18, the charge line can omit the conduit 233b, and therefore include a third bore 233d formed in the second pump case 222 and a fourth bore 233e formed in the center section instead of the conduit 233b.

Third Embodiment

Figure 19:
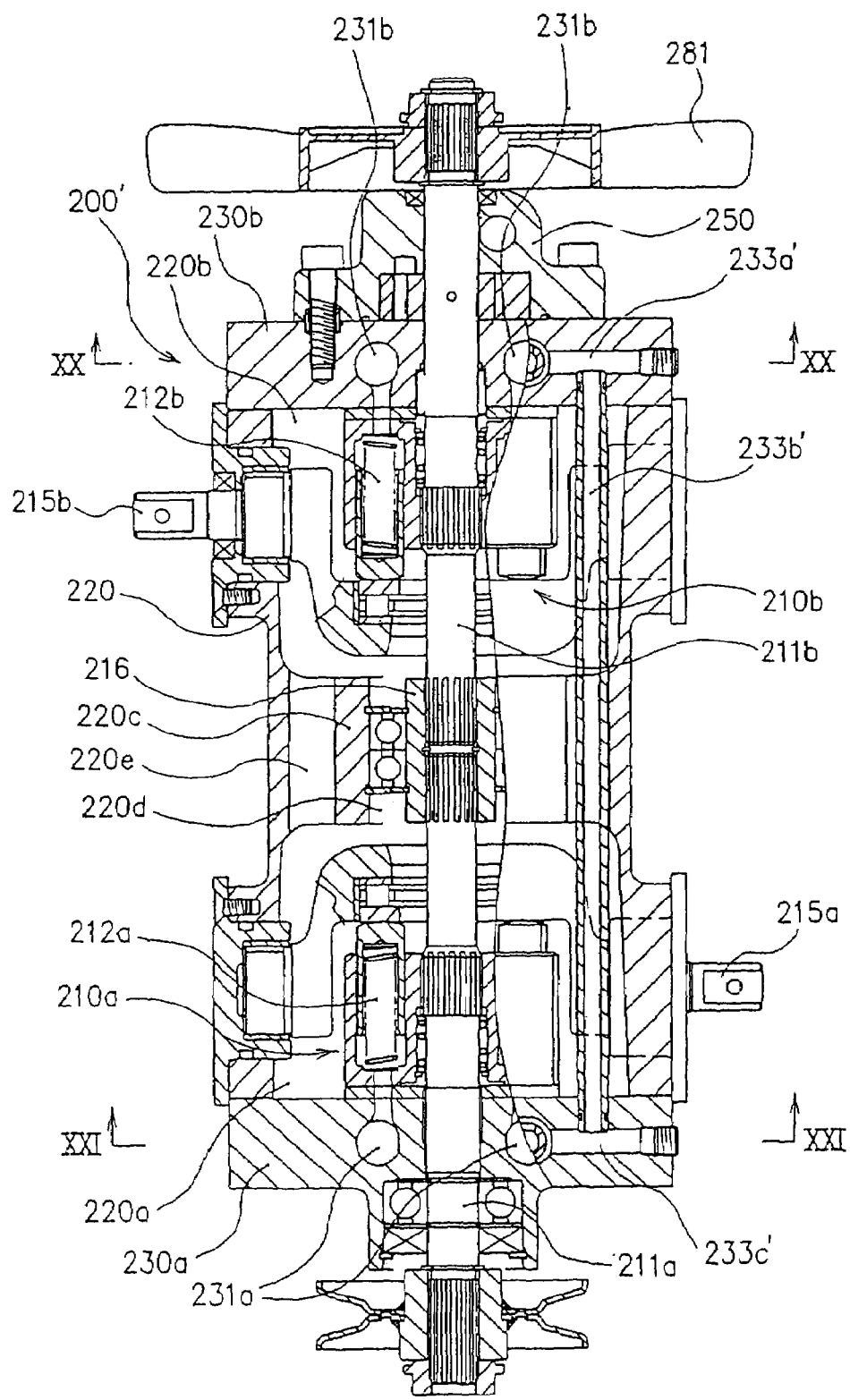
FIG. 19 is a longitudinal cross-sectional front view of the tandem pump unit according to another embodiment of the second aspect of the present invention.
Figure 20:
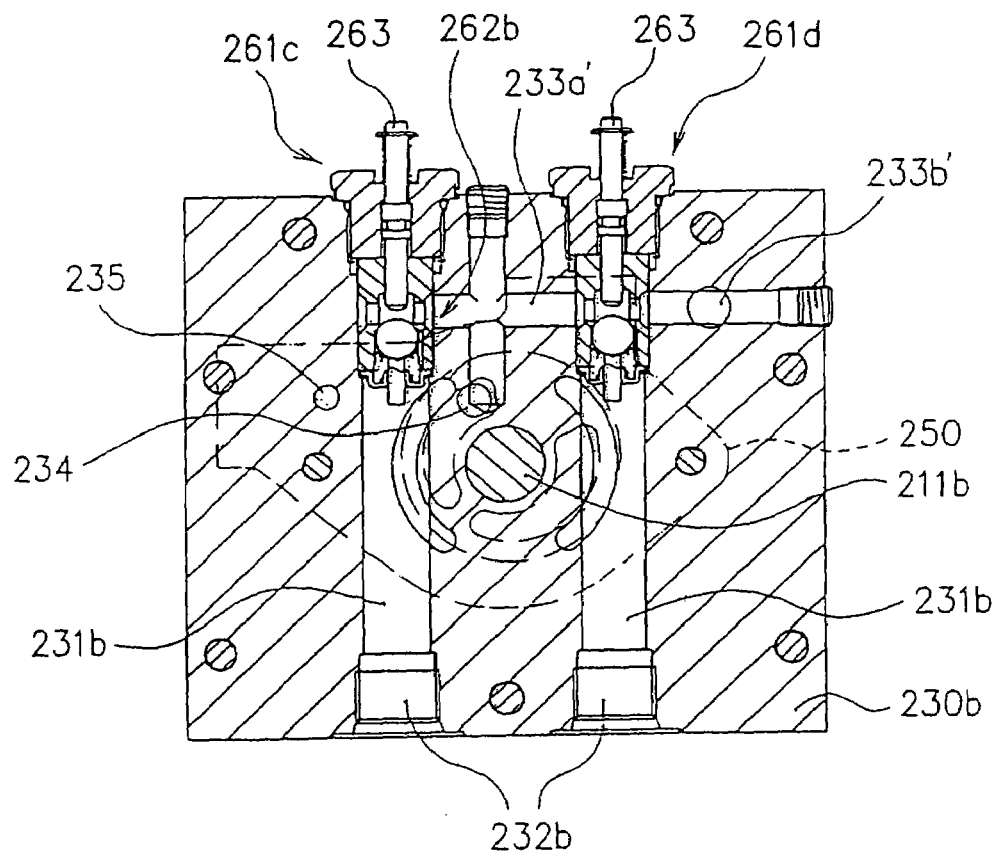
FIG. 20 is a cross section taken along lines XX-XX in FIG. 19.

Another embodiment of the pump unit according to the second aspect of the present invention will be hereinafter described with reference to the accompanying drawings. FIG. 19 is a longitudinal cross-sectional side view on the tandem pump unit 200' according to this embodiment. FIGS. 20 and 21 are respectively cross sections taken along lines XX-XX and XXI-XXI in FIG. 19. In the following description, same or identical parts to those of the second embodiment have been given the same reference characters or those with primes (') to omit a detailed description thereof.

As illustrated in FIG. 19, the pump unit 200' includes a common pump case 220 which accommodates the first and second hydraulic pumps 210a and 210b, and the first and second center sections 230a and 230b which respectively support the first and second hydraulic pumps 210a and 210b.

The common pump case 220 has, along the axis of the pump shafts 211a and 211b, a first end portion (or the lower end portion in this embodiment) formed with a first opening 220a for receiving the first hydraulic pump 210a, and a second end portion (or the upper end portion in this embodiment) formed with a second opening 220b for receiving the second hydraulic pump 210b.

The common pump case 220 also has a partition wall 220c disposed midway thereof along the pump shaft direction, which divides the common pump case into the first and second hydraulic pump accommodation chambers. The partition wall 220c includes a bearing portion which supports coupled ends of the first and second pump shafts 211a and 211b. Specifically, similarly to the second embodiment, the pump unit 200' includes the coupler 216 non-rotatably mounted on the downstream end (or the upper end) of the first pump shaft 211a and the upstream end (or the lower end) of the second pump shaft 211b with respect to the power transmitting direction, and rotatably supported in a bearing hole 220d formed in the partition wall 220c. The partition wall 220c may form a plurality of hydraulic fluid communication passages 220e for communication between the first and second hydraulic pump accommodation chambers. These communication passages enable the entire pump case to be used as the reservoir tank.

The first center section 230a supports on the upper surface thereof the first hydraulic pump 210a, and is connected to the pump case 220 in such a manner as to seal the first opening 220a of the pump case. The first pump shaft 211a of the first hydraulic pump 210a has the upstream end with respect to the power transmitting direction or the lower end extending downwardly through the first center section 230a to form a lower extension which receives the power from the power source via a suitable power transmitting mechanism.

On the other hand, the second center section 230b supports on the lower surface thereof the second hydraulic pump 210b, and is connected to the pump case 220 in such a manner as to seal the second opening 220b of the pump case. The second pump shaft 211b of the second hydraulic pump 210b has the downstream end in the power transmitting direction or the upper end extending upwardly through the second center section 230b to form an upper extension through which the charge pump 250 and the cooling fun 281 are driven.

As illustrated in FIGS. 12 and 21, the first center section 230a forms a first pair of hydraulic passages 231a for the first hydraulic pump 210a having first ends opening at the surface facing the first piston unit 212a (or at the upper surface in this embodiment) for respectively communicating with the inlet/outlet ports of the first piston unit 212a, and second ends opening to the outside of the pump case 220 for forming a first pair of inlet/outlet ports 232a which respectively serve as connection ports for connection with the first pair of hydraulic lines 284a between the first hydraulic pump 210a and the first hydraulic motor 282a.

Similarly, as illustrated in FIGS. 12 and 20, the second center section 230b forms a second pair of hydraulic passages 231b for the second hydraulic pump 210b having first ends opening at the surface facing the second piston unit 212b of the second center section 230b (or at the lower side in this embodiment) for respectively communicating with the inlet/outlet ports of the second piston unit 212b, and second ends opening to the outside of the pump case 220 for forming a second pair of inlet/outlet ports 232b which respectively serve as connection ports for connection with the second pair of hydraulic lines 284b between the second hydraulic pump 210b and the second hydraulic motor 282b.

Similarly to the second embodiment, the pump unit 200' of this embodiment is provided therein with the common charging passage 233' with a first end opening to the outside of the pump unit for forming the inlet port for charging 234, and a second end communicating with the first and second hydraulic passages.

The common charging passage 233', as illustrated in FIGS. 19 to 21, includes a first bore portion 233a', a conduit 233b' and a second bore portion 233c'. The first bore portion 233a' is formed in the second center section 230b to have a first end opening to the outside of the second center section through the upper surface thereof to form the inlet port for charging 234, and a second end communicating with the second pair of hydraulic passages 231b via the check valves 261c and 261d and opening to the second pump accommodation chamber. The conduit 233b' is disposed to have a first end connected to the second end of the first bore portion 233a' and a second end extending through the second pump accommodation chamber, the partition wall 220c and the first pump accommodation chamber to the first center section 230a. The second bore portion 233c' is formed in the first center section 230a to have a first end connected to the second end of the conduit 233b' and a second end communicating with the first pair of hydraulic passages 231a via the check valves 261a and 261b.

The thus arranged pump unit 200' of this embodiment also produces the same effects as those of the second embodiment.

Alternative to the conduit 233b', it is possible to form in the peripheral wall of the common pump case 220 a communication hole having a first end connected to the second end of the first bore portion 233a' and a second end connected to the first end of the second bore portion 233c'.

Fourth Embodiment

Figure 22:
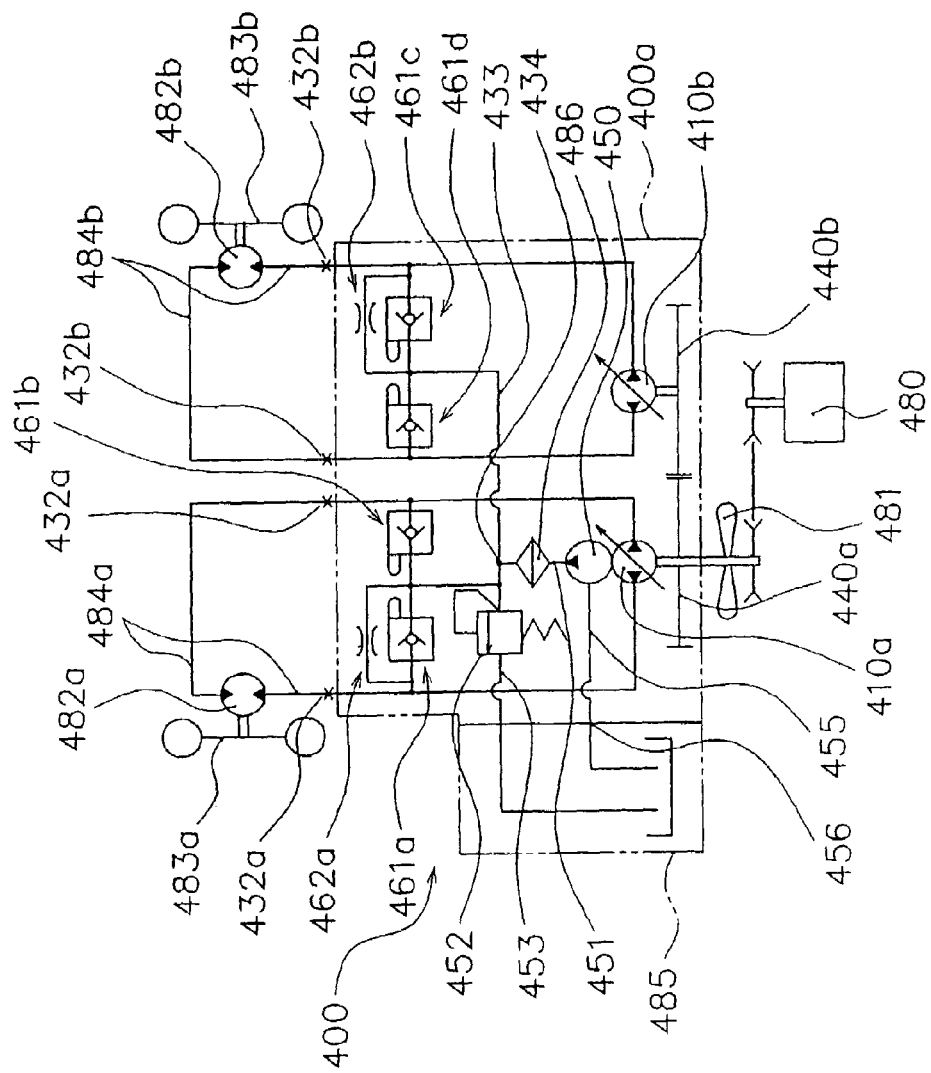
FIG. 22 is a hydraulic circuit diagram of the vehicle to which one embodiment of a pump unit according to the third aspect of the present invention is applied.
Figure 23:
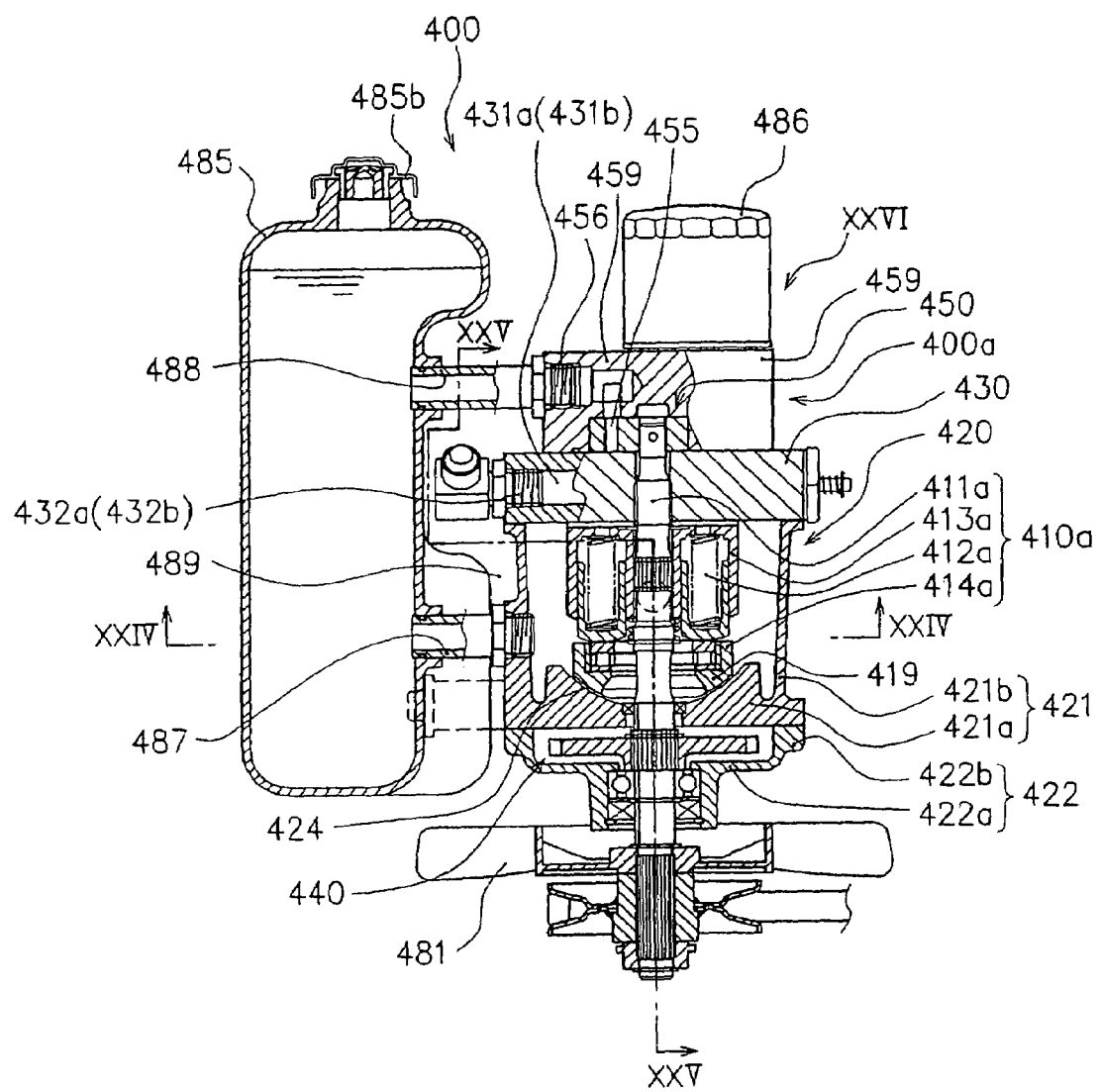
FIG. 23 is a longitudinal cross-sectional side view of the pump unit illustrated in FIG. 22.
Figure 24:
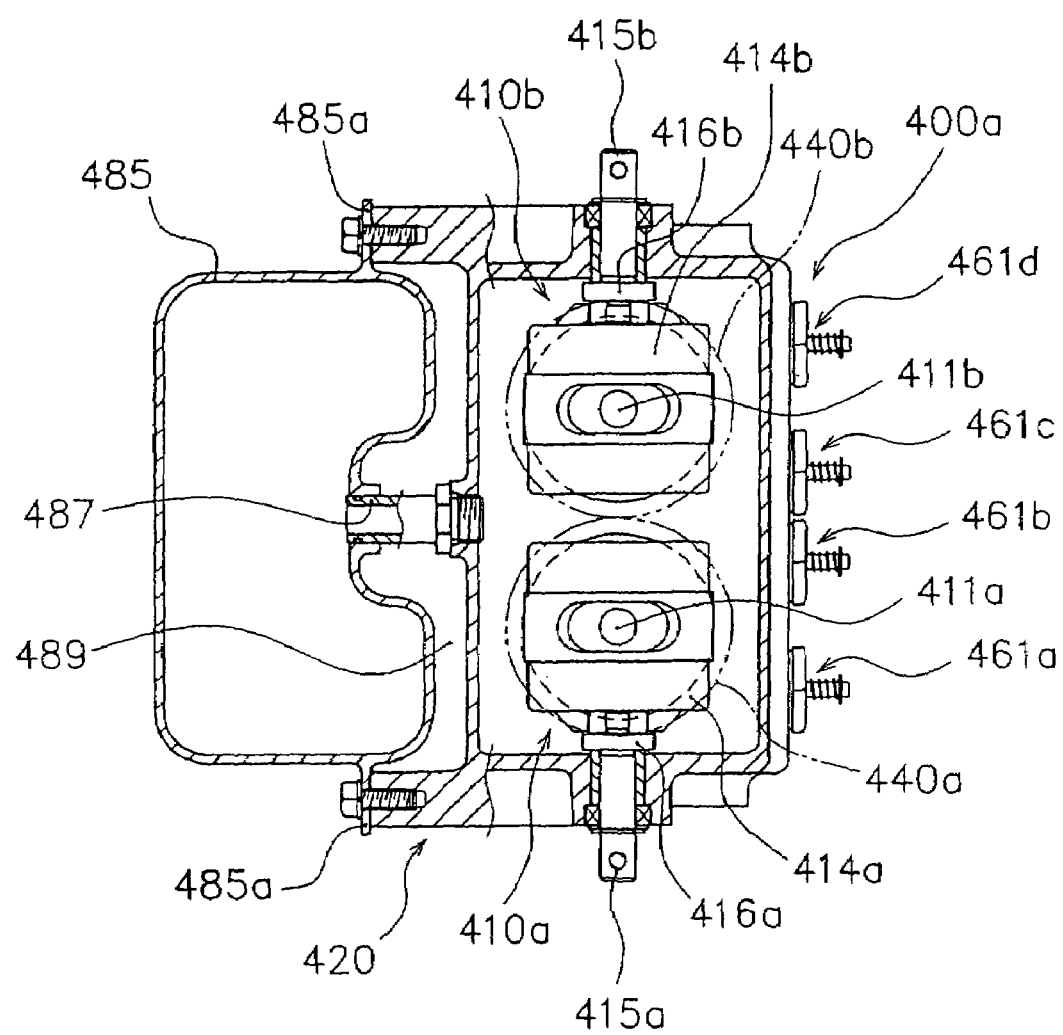
FIG. 24 is a cross section taken along lines XXIV-XXIV in FIG. 23.
Figure 25:
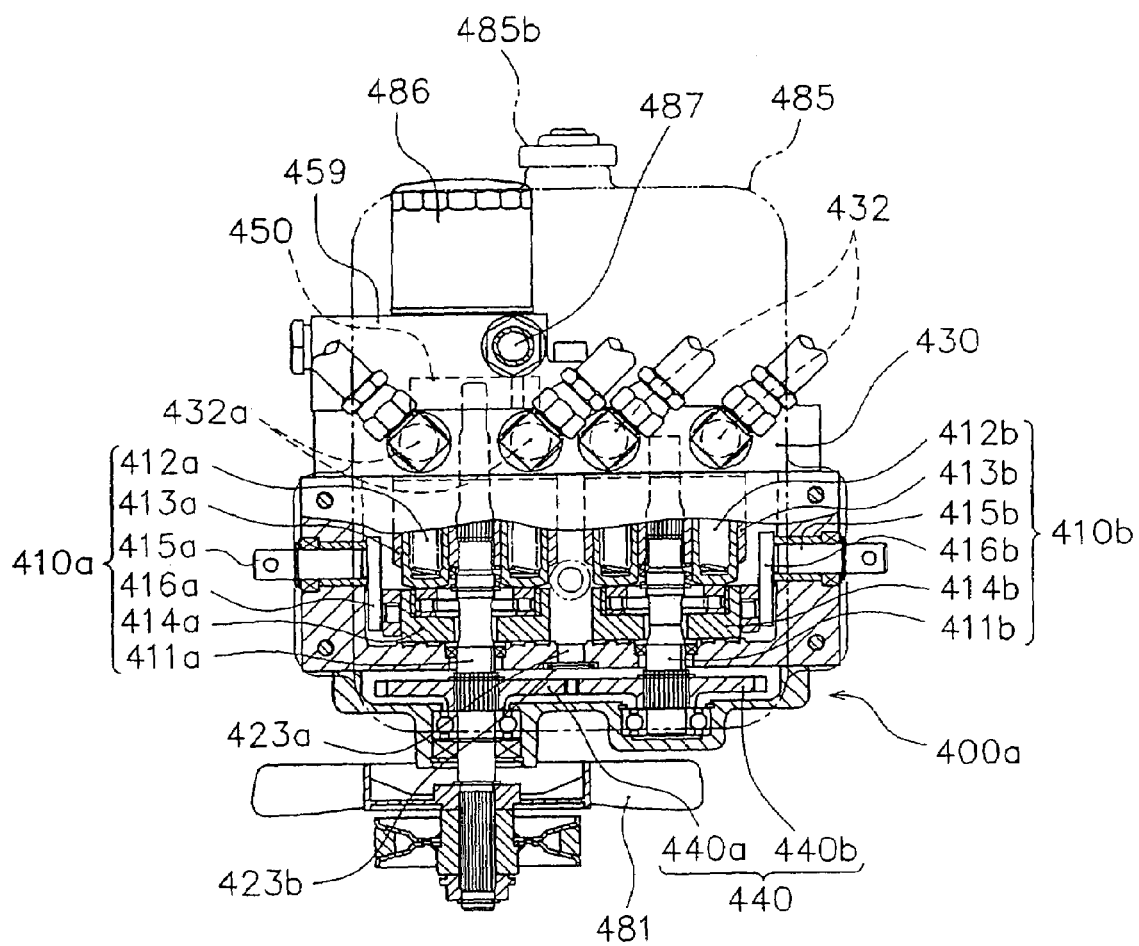
FIG. 25 is a cross section taken along lines XXV-XXV in FIG. 23.

One embodiment of the pump unit according to the third aspect of the present invention will be hereinafter described with reference to the accompanying drawings. FIG. 22 is a hydraulic circuit diagram of the vehicle to which a pump unit 400 of this embodiment is applied. FIG. 23 is a longitudinal cross-sectional side view of the pump unit and its periphery. FIGS. 24 and 25 are respectively cross sections taken along lines XXIV-XXIV, and XXV-XXV.

As illustrated in FIGS. 22 to 24, the pump unit 400 is adapted to be used in a vehicle having right and left drive wheels 483a and 483b to which first and second hydraulic motors 482a and 482b are respectively connected, and includes a first hydraulic pump 410a and a second hydraulic pump 410b respectively connected to the first and second hydraulic motors 482a and 482b via a first pair of hydraulic lines 484a and a second pair of hydraulic lines 484b, and a common housing 420 for accommodating these hydraulic pumps 410a and 410b.

The connection form between the right and left drive wheels 483a and 483b, and the first and second hydraulic motors 482a and 482b meant in this embodiment includes the direct connection of the drive wheels respectively to those hydraulic motors, and also an operative connection of the drive wheels respectively to the hydraulic motors via suitable power transmission mechanism. In FIG. 22, the reference codes 480, 481 and 486 respectively represent a power source, a cooling fan and a filter.

As illustrated in FIGS. 23 to 25, the first hydraulic pump 410a and the second hydraulic pump 410b are axial piston pumps of a variable displacement type, and respectively include a first pump shaft 411a and a second pump shaft 411b that have vertical axes and are disposed parallel to one another in the vehicle width direction within the housing 420, a first piston unit 412a and a second piston unit 412b that are reciprocatingly movable according to the rotation of the pump shafts, a first cylinder block 413a and a second cylinder block 413b that reciprocably support the piston units, a first angularly adjustable swash plate 414a and a second angularly adjustable swash plate 414b that regulate the stroke length of the piston units by varying their tilting angles to vary the input/output flow rates of the piston units, and a first control shaft 415a and a second control shaft 415b that control the tilting angles of these swash plates.

The pump unit of this embodiment is of a vertical type with the first and second pump shafts 411a and 411b having the vertical axes. However, the third aspect of the present invention is not necessarily limited to this arrangement. It is a matter of course that the pump unit 400 can be of a horizontal type with the first and second pump shafts 411a and 411b having the horizontal axes.

As best illustrated in FIG. 23, the first and second angularly adjustable swash plates 414a and 414b of this embodiment are of a cradle type.

As illustrated in FIGS. 24 and 25, the first control shaft 415a and the second control shaft 415b extend away from one another in the vehicle width direction to respectively have oppositely positioned outer ends, and inner ends extending into the housing 420 to be respectively connected to arms 416a and 416b and hence the first and second swash plates 414a and 414b. The pump unit 400 with the thus arranged first and second control shafts 415a and 415b is advantageous when installed on the vehicle having push-pull control levers 198a and 198b as illustrated in FIG. 1, since the first and second control shafts 415a and 415b can have the rotating shaft centers disposed parallel to the longitudinal axis of the control levers, thereby achieving the simplification of a link mechanism between these control shafts and the control levers.

The first control shaft 415a and the second control shaft 415b are more preferably located at substantially the same position with respect to the vehicle longitudinal direction, as illustrated in FIG. 23. The thus arranged first and second control shafts 415a and 415b can be aligned with the control levers in the vehicle width direction, thereby achieving a more simplified structure of the link mechanism.

The pump unit 400 further includes a common center section 430 that supports the first and second hydraulic pumps 410a and 410b, and a power transmission mechanism 440 that is accommodated within the housing 420 to operatively connect the first and second hydraulic pump shafts 411a and 411b together.

The pump unit 400 with the power transmission mechanism 440 permits the simultaneous rotation of both pump shafts 411a and 411b only by connecting the power source to either one of the first and second pump shafts 411a and 411b, or to the first pump shaft 411a in this embodiment, thereby achieving the simplified structure for the power transmission from the power source to the pump unit 400. In this embodiment, the power transmission mechanism 440 is in the form of a gear transmission device that includes a first gear 440a non-rotatably supported on the lower side of the first pump shaft 411a, and a second gear 440b non-rotatably supported on the lower side of the second pump shaft 411b in meshed engagement with the first gear 440a. Instead of the gear transmission device, any conventional power transmission mechanisms such as chain and belt may be used.

The housing 420, as illustrated in FIGS. 23 and 24, includes a first housing 421 for accommodating the first and second hydraulic pumps 410a and 410b, and a second housing 422 for accommodating the power transmission mechanism 440.

The first housing 421 has a box shape with a first sidewall 421*a* disposed in the upper or lower side of the pump shafts 411*a* and 411*b* along the longitudinal direction thereof; or in this embodiment in the lower side of the pump shafts 411*a* and 411*b*, which will be hereinafter referred to simply as the lower side, and a peripheral wall 421*b* extending from a peripheral edge of the first sidewall 421*a* to the opposite side of the pump shafts 411*a* and 411*b* along the longitudinal direction thereof (i.e., the upper side of the pump shafts 411*a* and 411*b* in this embodiment, which will be referred to simply as the upper side). The first sidewall 421*a* forms bearing holes through which the first and second pump shafts 411*a* and 411*b* respectively extend. The upper side of the first housing 421 has an end surface forming an opening through which the first and second hydraulic pumps 410*a* and 410*b* can be placed into the first housing 421. The opening of the first housing 421 is sealed by the center section 430 in a liquid tight manner. That is, the center section 430 of this embodiment constitutes a part of the first housing 421. The first and second control shafts 415*a* and 415*b* extend away from one another in the vehicle width direction to respectively have outer ends protruding from the peripheral wall 421*b* of the first housing 421.

The second housing 422 is disposed in the lower side, and has a box shape with a lower sidewall 422*a* forming a bearing hole through which the lower end of the first pump shaft 411*a* extends and a bearing portion for receiving the lower end of the second pump shaft 411*b*, and a peripheral wall 422*b* extending upwardly from a peripheral edge of the lower sidewall 422*a*. The upper side of the second housing 422 forms an opening through which the power transmission mechanism 440 can be placed into the second housing 422.

The second housing 422 is connected to the first housing 421 in such a manner as to have the opening sealed in a liquid tight manner by the first sidewall 421*a* of the first housing 421, and form an accommodation space of the power transmission mechanism 440 in cooperation with the first sidewall 421*a* of the first housing 421.

In the thus arranged housing 420, the first sidewall 421*a* of the first housing 421 serves as a partition wall dividing the accommodation space of the housing into a hydraulic pump accommodation chamber and a power transmission mechanism accommodation chamber. The partition wall thus defining the hydraulic pump accommodation chamber and the power transmission mechanism accommodation chamber can effectively prevent any foreign matters such as iron powder generated in the power transmission mechanism 440 from intruding into the hydraulic pump accommodation chamber, and hence damaging piston units 412*a*, 412*b*, cylinder blocks 413*a*, 413*b*, and (or other parts. In addition to this foreign matters prevention measure, the first and second pump shafts 411*a* and 411*b*, which extend through the partition wall 421*a*, may have circumferential peripheries with seal rings thereon to more securely prevent the intrusion of the foreign matters.

Portions of the housing 420, through which the respective shafts 411*a*, 415*a* and 415*b* extend, are sealed by any suitable sealing means in a liquid tight manner, thereby allowing the housing 420 to serve as the hydraulic fluid tank.

The first sidewall 421*a* serving as the partition wall preferably forms a hydraulic fluid communication hole 423*a* for communication between the hydraulic pump accommodation chamber and the power transmission mechanism accommodation chamber with a filter 423*b* provided in the hole for preventing the intrusion of the foreign matters into the hydraulic pump accommodation chamber. The thus formed hydraulic fluid communication hole 423*a* can omit the necessity of separately feeding the lubricant to the power transmission mechanism 440, with the result that the power transmission mechanism 440 can be lubricated with the hydraulic fluid stored within the housing. This permits low manufacturing cost and ease of maintenance.

In this embodiment, the first and second angularly adjustable swash plates 414*a* and 414*b* are of a cradle type, as illustrated in FIG. 23. Therefore, when the partition wall 421*a* forms, on its side facing the hydraulic pumps 410*a*, 410*b*, spherical concave surfaces 424 respectively adapted to spherical convex surfaces 419 formed in the rear sides of the swash plates 414*a* and 414*b*, which rear sides being opposite to the surfaces facing the piston units 412*a* and 412*b*, the spherical concave surfaces 424 can slidingly guide the spherical convex surfaces 419 of the swash plates 414*a* and 414*b*. The swash plates thus can securely rest on the spherical concave surfaces 424. Although FIG. 23 illustrates only the portion of the partition wall 421*a* corresponding to the first angularly adjustable swash plate 414*a*, it is a matter of course that the portion of the partition wall 421*a* corresponding to the second angularly adjustable swash plate 414*b* forms the spherical concave surface 424.

In this embodiment, the first sidewall 421*a* of the first housing 421 serves as the partition wall. Alternatively, a partitioning means may take various forms, as long as it can produce the same effect as described above. For example, a separately prepared partition wall may be mounted in a housing having a simple cylindrical box shape.

Figure 26:
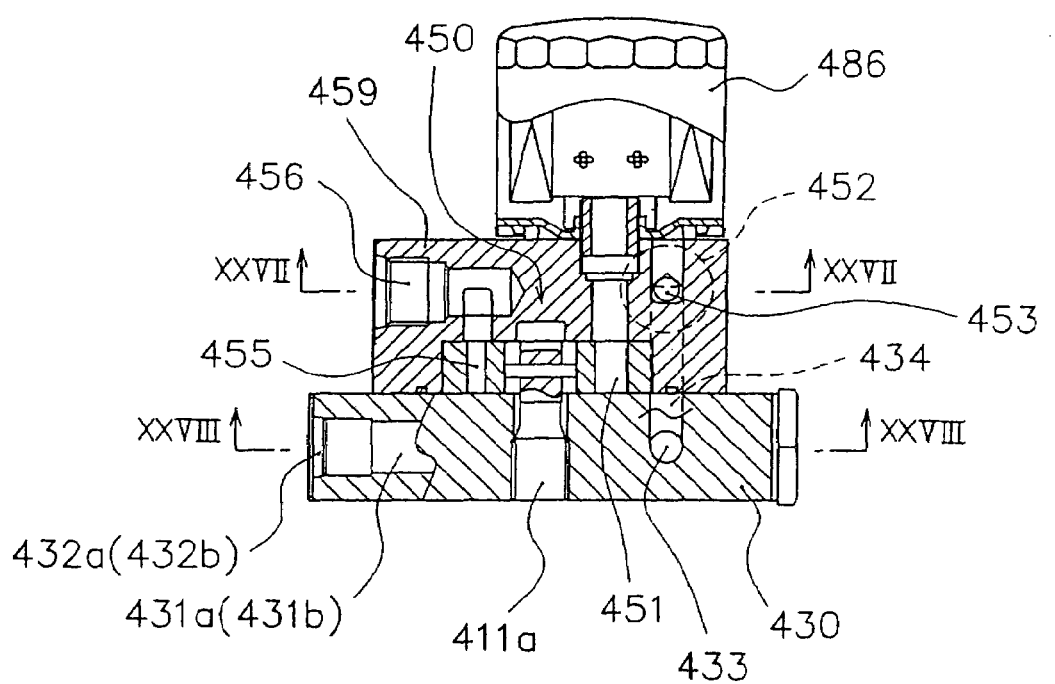
FIG. 26 is an enlarged view of a portion XXVI in FIG. 23.
Figure 27:
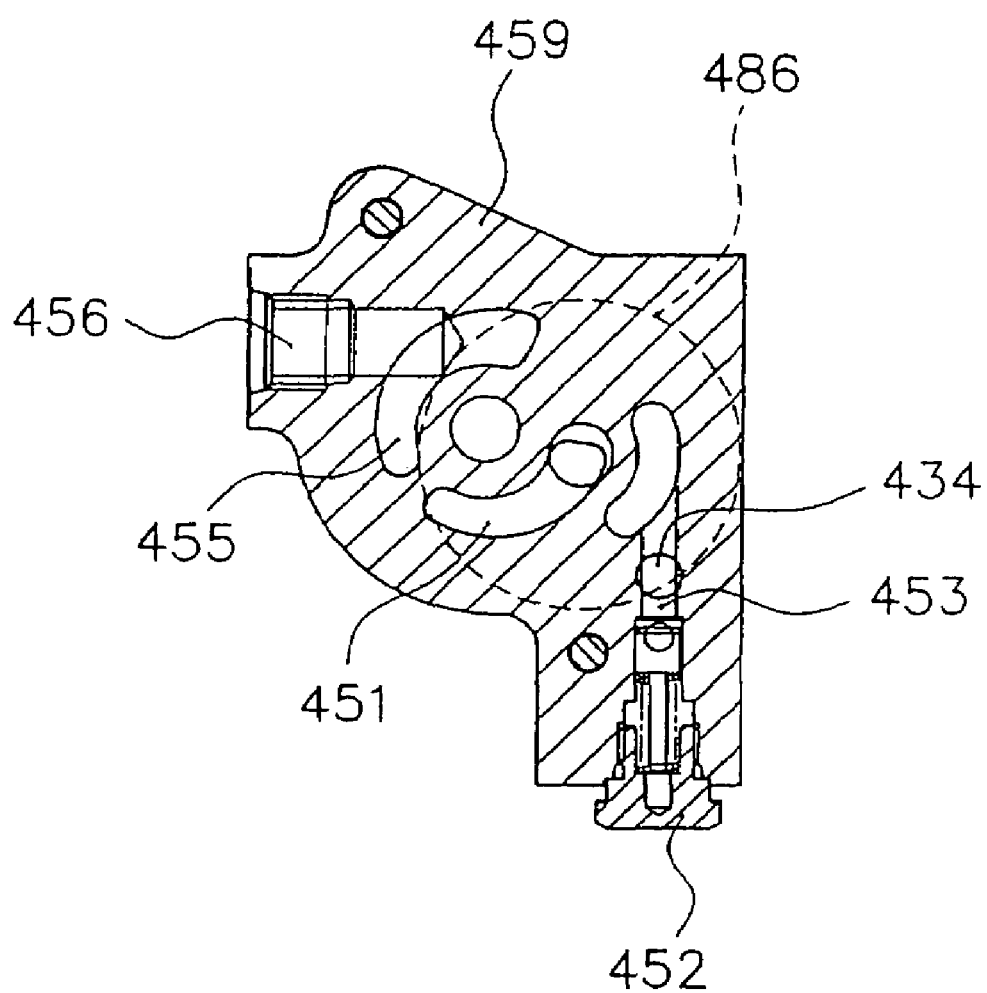
FIG. 27 is a cross section taken along lines XXVII-XXVII in FIG. 26.
Figure 28:
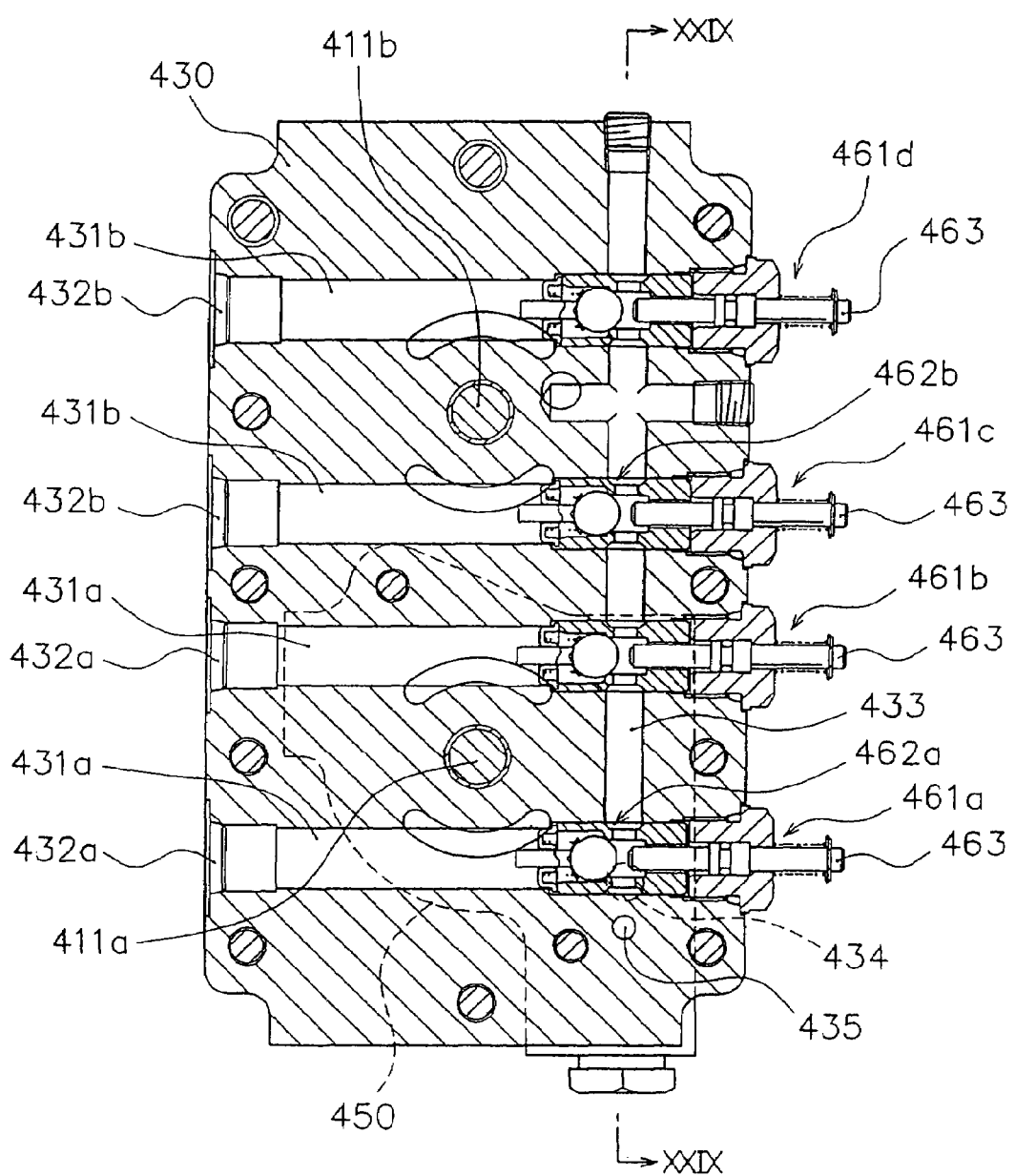
FIG. 28 is a cross section taken along lines XXVIII-XXVIII in FIG. 26.
Figure 29:
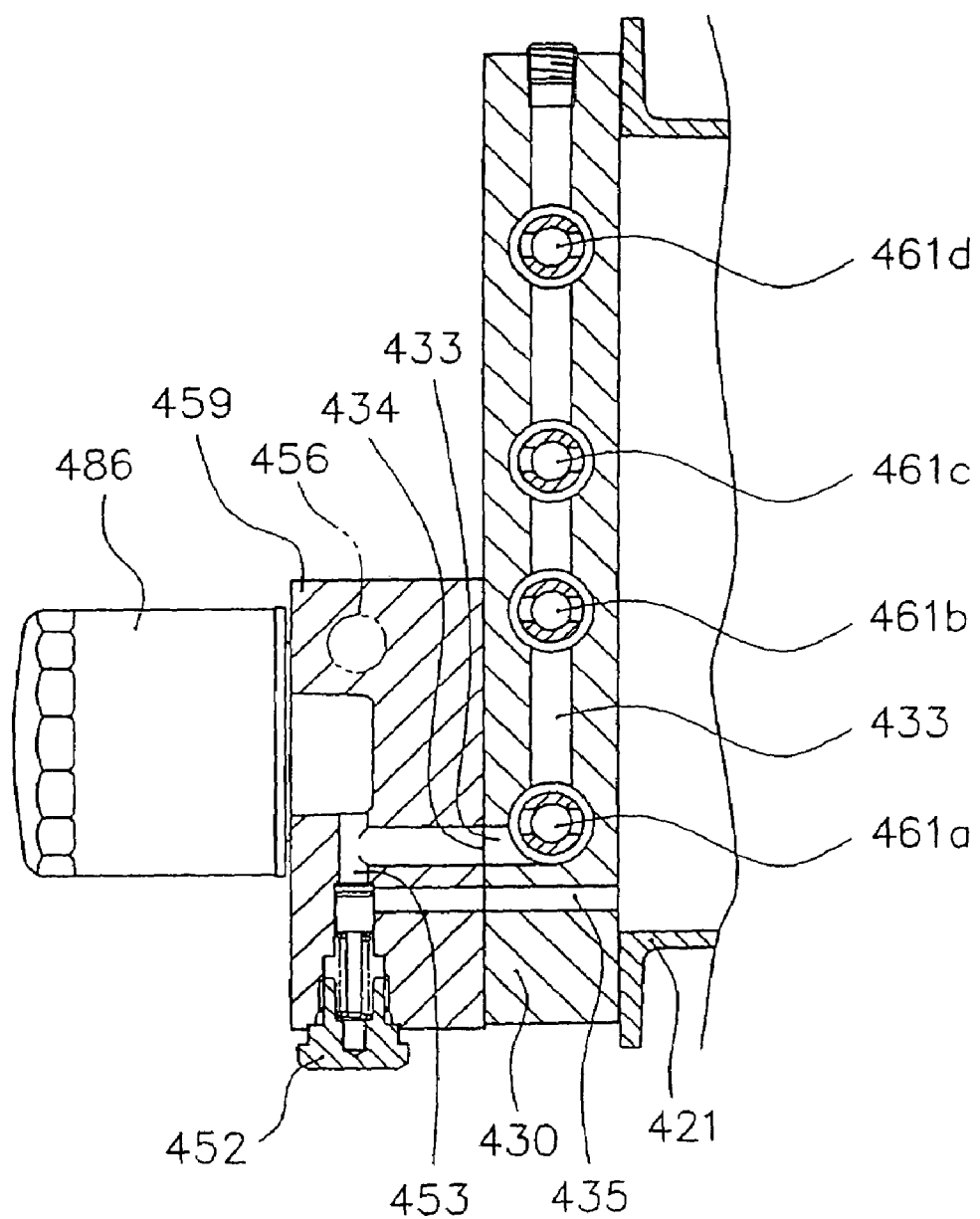
FIG. 29 is a cross section taken along lines XXIX-XXIX in FIG. 28.

Now, the description will be made for the center section 430. FIG. 26 is an enlarged view of a portion XXVI in FIG. 23. FIGS. 27 and 28 are respectively cross sections taken along lines XXVII-XXVII, and XXVIII-XXVIII in FIG. 26. FIG. 29 is a cross section taken along lines XXIX-XXIX in FIG. 28.

As best illustrated in FIG. 28, the center section 430 forms a first pair of hydraulic passages 431*a* respectively having first ends communicating with the first piston unit and second ends opening to the outside of the center section 430 to form a first pair of inlet/outlet ports 432*a* serving as connection ports for connection with the first pair of hydraulic lines 484*a* (see FIG. 22).

The center section 430 also forms a second pair of hydraulic passages 431*b* having first ends communicating with the second piston unit and second ends opening to the outside of the center section 430 to form a second pair of inlet/outlet ports 432*b* serving as connection ports for connection with the second pair of hydraulic lines 484*b* (see FIG. 22).

As described above, the common center section 430 thus forms all the first and second pairs of inlet/outlet ports 432*a* and 432*b* serving as the connection ports for connection with the first and second pairs of hydraulic lines 484*a* and 484*b*. Whereby, the piping work between the hydraulic pumps 410*a* and 410*b*, and the hydraulic motors 482*a* and 482*b* can be facilitated. The first and second pairs of inlet/outlet ports 432*a* and 432*b* are more preferably formed in the same side of the center section 430, as illustrated in FIGS. 28 and 29, thereby further facilitating the piping work.

The center section 430, as illustrated in FIGS. 26 to 29, also forms a common charging passage 433 having a first end opening to the outside of the center section 430 to form an inlet port for charging 434 serving as an inlet for the hydraulic fluid to be replenished, and a second end communicating with the first pair of hydraulic passages 431*a* and the second pair of hydraulic passages 431*b* via check valves 461*a*, 461*b*, 461*c* and 461*d*.

In this embodiment, the first pump shaft 411a, as best illustrated in FIGS. 23 and 26, has an extension extending upwards from the upper end thereof to be located above the center section 430, thereby supporting a charge pump 450 via the extension. The charge pump 450 has an upper surface with a cartridge filter 486 detachably mounted thereto, through which the pressurized hydraulic fluid is fed from an outlet port 451 of the charge pump 450 to the inlet port for charging 434.

The cartridge filter 486 can be provided at the suction side of the charge pump 450.

The charging passage 433 is connected via a relief valve 452 to a pressure relief line 453 communicating with the housing. The relief valve 452 regulates the hydraulic pressure of the charging passage 433 (see FIGS. 22 and 29).

In this embodiment, the pressure relief line 453 is formed in a charge pump casing 459 mounted on the upper surface of the center section 430 to be communicated with the first housing 421 via a drain port 435 formed in the center section 430. However, the present invention is not necessarily limited to this arrangement. That is, the pressure relief line 453 can be formed in the center section 430.

Reference codes 455, and 456 in FIGS. 23, 24 and 27 respectively represent an inlet port of the charge pump, and an inlet port communicating with the inlet port 455 of the charge pump.

As described above, the charging passage 433 has the second end communicating with the first pair of hydraulic passages 431a and the second pair of hydraulic passages 431b via the check valves 461a, 461b, 461c and 461d so as to allow the pressurized hydraulic fluid to be fed from the common charging passage 433 into a lower pressure line of the first pair of hydraulic lines 484a and a lower pressure line of the second pairs of hydraulic lines 484b, while preventing the pressurized hydraulic fluid from flowing in the reverse direction.

Further, bypass lines 462a and 462b having throttle valves are formed between at least one of the first pair of hydraulic passages 431a and the charging passage 433, and between at least one of the second pair of hydraulic passages 431b and the charging passage 433 (see FIGS. 22 and 28).

The bypass lines 462a and 462b are designed to assure the neutralization of the hydraulic pumps 410a and 410b. Specifically, even if the swash plates 414a and 414b of the hydraulic pumps 410a and 410b tilt from the neutral positions by a small angle, there occurs the pressure difference between the first pair of hydraulic lines 484a, and/or between the second pair of hydraulic lines 484b. This pressure difference causes the rotation of the hydraulic motors 482a and 482b. That is, even a slight amount of the displacement between the actual neutral positions and the predetermined design positions of the swash plates 414a and 414b due to assembling errors or the like causes an unintentional rotation of the hydraulic motors 482a and 482b. On the contrary, the bypass lines 462a and 462b, as described above, allow the pressurized hydraulic fluid to leak therethrough from the first pair of hydraulic lines 484a and the second pair of hydraulic lines 484b. Thus, the pressure difference between the pair of first hydraulic lines 484a and/or between the second pair of hydraulic lines 484b can effectively be limited, thereby effectively avoiding the unintentional rotation of the hydraulic motors 482a and 482b, even for the swash plates 414a and 414b having the actual neutral position displaced from the design neutral position due to the assembling errors or the like.

In view of transmission efficiency between the hydraulic pumps 410a, 410b and the hydraulic motors 482a, 482b, the leakage of the pressurized hydraulic fluid from the first and second pairs of hydraulic lines 484a, 484b through the bypass lines 462a, 462b is not preferable. Therefore, the bypass lines 462a, 462b are preferably provided in portions from the charging passage 433 to one of the first pair of hydraulic passages 431a, and to one of the second pair of hydraulic passages 431b.

The check valves 461a, 461b, 461c and 461d are more preferably provided with release means 462 to forcibly bring the first pair of hydraulic passages 431a into communication with one another, and the second pair of hydraulic passages 431b into communication with one another, if an emergency arises, as illustrated in FIG. 25. The release means 462 are designed to easily move the vehicle, when the vehicle must forcibly be moved or the vehicle wheels must forcibly be rotated by man power or the like due to the disorder of the power source 480, the hydraulic pumps 410a, 410b or the like. Specifically, when the vehicle wheels connected to the hydraulic motors 482a and 482b are forcibly rotated with the first pair of hydraulic lines 484a and/or the second pair of hydraulic lines 484b lying in the closing state, there occurs the pressure difference between the first pair of hydraulic lines 484a, and between the second pair of hydraulic lines 484b. As a result, the vehicle is hardly moved, or the vehicle wheels are hardly rotated. On the contrary, the release means can easily achieve the communications between the first pair of hydraulic passages 431a, and between the second pair of hydraulic passages 431b without the necessity of mechanically releasing all the check valves 461a to 461d. Whereby, the vehicle can easily be moved by man power or the like.

As illustrated in FIG. 28, all the release means 463 are preferably disposed in the same side of the center section 430, so that the link mechanism linking these release means 463 for operation of the same can have a simplified structure.

As described above, the pump unit 400 of this embodiment includes the first and second hydraulic pumps 410a and 410b, the center section 430 and the housing 420, all of which are integrally connected together to constitute a single unit 400a. Accordingly, both first and second hydraulic pumps 410a and 410b can be installed on the vehicle only by mounting the single unit 400a on the vehicle, thereby achieving an improved efficiency in assembling the vehicle.

The pump unit 400 of this embodiment also includes a reservoir tank 485 supportingly connected to the single unit 400a, as illustrated in FIGS. 23 to 25. The reservoir tank 485 is designed to reserve the hydraulic fluid to be replenished to the first pair of hydraulic passages 431a and the second pair of hydraulic passages 431b. In this embodiment, the reservoir tank 485 has right and left sides respectively forming mounting ribs 485a, through which the reservoir tank 485 is connected to the single unit 400a.

The above arrangement where the reservoir tank 485 is supportingly connected to the single unit 400a can omit external piping for feeding the hydraulic fluid from the reservoir tank 485 to the charge pump 450, and external piping for returning the hydraulic fluid from the single unit 400a to the reservoir tank 485, thereby achieving ease of assembly, lower manufacturing cost, improved efficiency in replenishing the hydraulic fluid through the decrease of the resistance force between the hydraulic fluid and the pipe wall, and producing other desirable effects.

The reservoir tank 485 preferably communicates with the housing 420 via a hydraulic fluid communication passage 487 such as a pipe, as illustrated in FIGS. 23 and 24. This hydraulic communication allows both reservoir tank 485 and housing 420 to be used as a hydraulic fluid tank, and hence the reservoir tank itself to have a reduced size. In this arrangement, the reservoir tank is preferably located so that the upper level of the hydraulic fluid within the reservoir tank can be higher than the upper end of the housing. This arrangement produces an additional desirable effect, and more specifically allows the complete filling of the hydraulic fluid within the housing 420, thereby effectively avoiding the air entrained in the hydraulic fluid. In addition, variation in volume of the hydraulic fluid within the housing 420 due to variation in temperature of this hydraulic fluid can be properly compensated by the reservoir tank 485 communicating with the housing.

The reservoir tank 485 can be connected to the inlet port for charging 434 via a hydraulic fluid replenishing passage 488 or other suitable piping means. According to the pump unit of this embodiment, which includes the charge pump 450 serving as the hydraulic fluid feeding means, as described above, the reservoir tank 485 communicates, via the hydraulic fluid replenishing passage 488, with the inlet port 456 communicating with the inlet port 455 of the charge pump 450, and the outlet port 451 of the charge pump 450 communicates with the inlet port for charging 434 via the cartridge filter 486 (see FIGS. 23 and 26).

The communications between the reservoir tank 485 and the inlet port 434 via the hydraulic fluid replenishing passage 488, and between the reservoir tank 485 and the housing 420 via the hydraulic fluid communication passage 487 can reduce the number of the pipes required respectively between the first and second hydraulic pumps, and the first and second hydraulic motors to substantially four pipes only, specifically the first pair of hydraulic lines 484a and the second pair of hydraulic lines 484b. Thus, as compared with the conventional arrangements as disclosed in the above cited U.S. Pat. No. 4,920,733, the pump unit of this embodiment can achieve a lower manufacturing cost, an improved assembling efficiency and an excellent workability in maintenance.

The pump unit 400 more preferably includes a cooling fan 481 disposed near the single unit 400a and the reservoir tank 485 and operatively driven by the power source 480. According to this arrangement with the cooling fan 481, the reservoir tank 485 is connected to the single unit 400a in such a manner as to form between the reservoir tank 485 and the single unit 400a a clearance 489 into which a cooling air stream is drawn from the cooling fan 481. The hydraulic fluid replenishing passage 488 and/or the hydraulic fluid communication passage 487 traverses the clearance 489. In this arrangement, the hydraulic fluid replenishing passage 488 and the hydraulic fluid communication passage 487 each may have the right and left sides surrounded by a cooling air duct or shroud to effectively guide the cooling air stream from the cooling fan to the clearance 489.

The thus arranged pump unit 400 can limit the increase in temperature of the hydraulic fluid stored in the reservoir tank 485 and the housing 420, and also effectively limit the increase in temperature of the hydraulic fluid flowing through the hydraulic fluid replenishing passage 488 and the hydraulic fluid communication passage 487. Thus, the transmission efficiency between the hydraulic pumps and the hydraulic motors can be improved.

The hydraulic fluid replenishing passage and the hydraulic fluid communication passage each more preferably has an outer circumference provided with fins (not shown) to obtain an enlarged heat radiating area, and hence an improved cooling efficiency. The fins can also be provided on the reservoir tank 485 itself.

Preferably, the reservoir tank 485 is made of a semitransparent resin material to afford a visual observation of the level of the hydraulic fluid from the outside of the tank. The reservoir tank 485 can also include a tank cap 485b with an air release mechanism on the top of the tank.

In this embodiment, the charge pump 450 is provided to forcibly feed the pressurized hydraulic fluid to the inlet port for charging 434. Alternative to this arrangement with the charge pump 450, the inlet port for charging 434 may be directly connected to the reservoir tank 485 via the hydraulic fluid replenishing passage 488, thereby allowing the hydraulic fluid to spontaneously flow into the inlet port 434 when the pressure in a lower pressure line of the first pair of hydraulic lines 484a and/or the pressure in a lower pressure line of the second pair of hydraulic lines 484b drops from a predetermined value.

Fifth Embodiment

Figure 30:
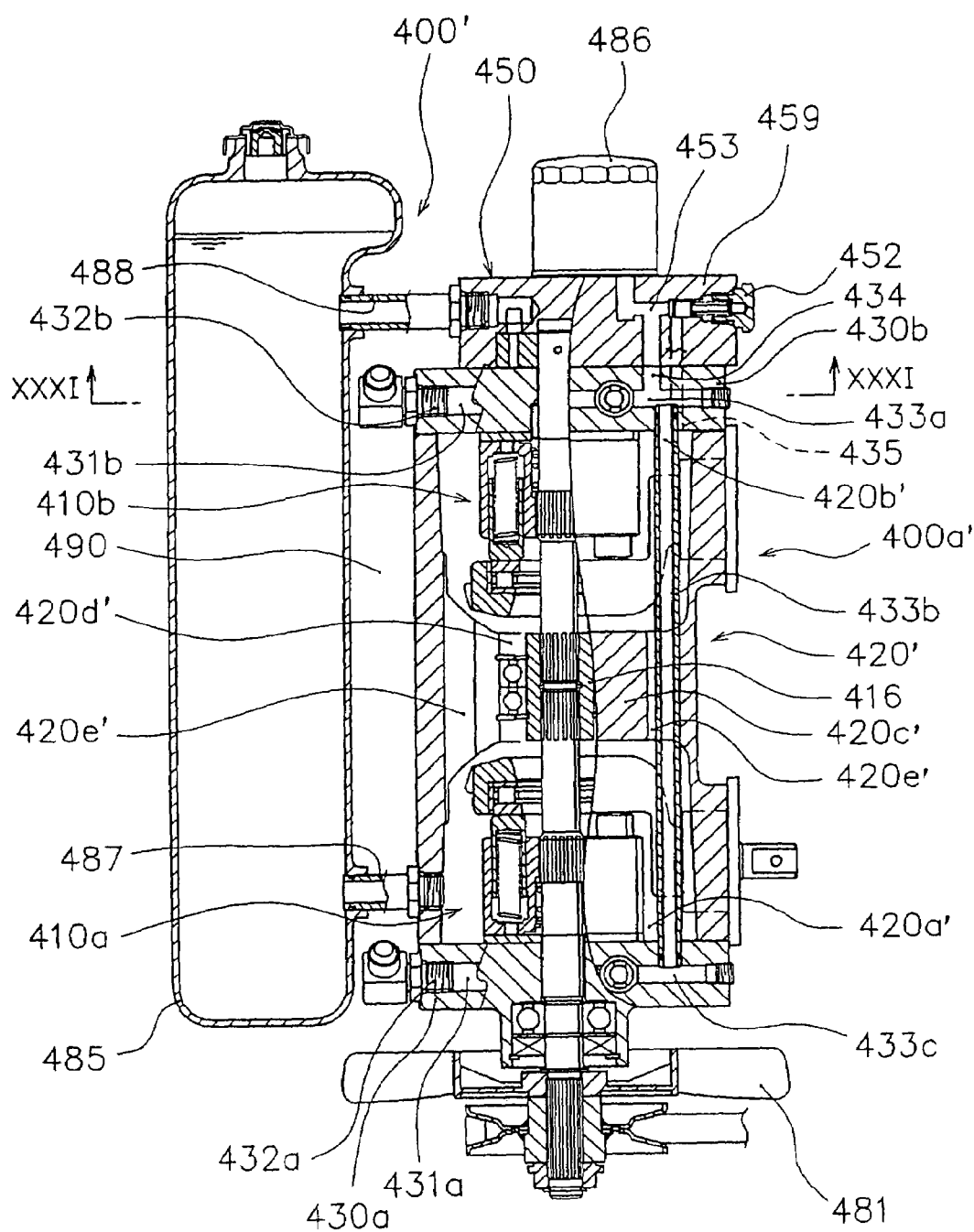
FIG. 30 is a longitudinal cross-sectional side view of the pump unit according to another embodiment of the third aspect of the present invention.
Figure 31:
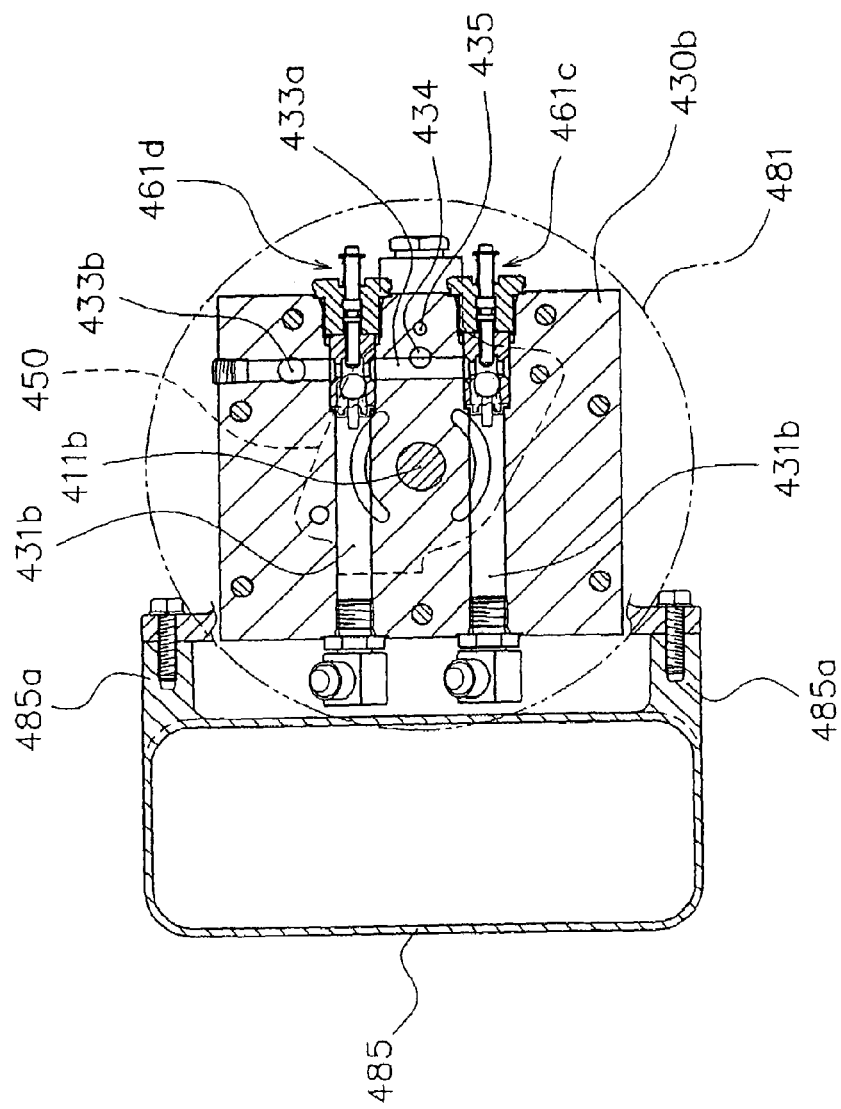
FIG. 31 is a cross section taken along lines XXXI-XXXI in FIG. 30.

Another embodiment of the pump unit according to the third aspect of the present invention will be hereinafter described with reference to FIGS. 30 and 31. FIG. 30 is a longitudinal cross-sectional side view of the pump unit 400', and FIG. 31 is a cross section taken along lines XXXI-XXXI in FIG. 30.

As illustrated in FIG. 30, the pump unit 400' of this embodiment is a tandem pump unit with the first hydraulic pump 410a connected in series with the second hydraulic pump 410b. In the following description, corresponding or identical parts to those of the seventh embodiment have been given the same reference characters or those with primes (') to omit a detailed description thereof.

As illustrated in FIG. 30, the pump unit 400' includes the common housing 420' for accommodating the first hydraulic pump 410a and the second hydraulic pump 410b, and the first center section 430a and the second center section 430b respectively supporting the first hydraulic pump 410a and the second hydraulic pump 410b.

The common housing 420' has the first end (the lower end in this embodiment), and the second end (the upper end in this embodiment) along the axial direction thereof respectively defining the first opening 420a' for receiving the first hydraulic pump 410a and the second opening 420b' for receiving the second hydraulic pump 410b.

The common housing 420' also forms the partition wall 420c' at substantially the center in the direction of the pump shaft to divide the common housing into the first pump accommodation chamber and the second pump accommodation chamber. The partition wall 420c' includes a bearing portion for supporting the connection portion between the first pump shaft 411a and the second pump shaft 411b. Specifically, the partition wall 420c' includes a connection member 416 non-rotatably fixed around the downstream end or the upper end of the first pump shaft 411a and the upstream end or the lower end of the second pump shaft 411b, and rotatably supported in the bearing hole 420d' formed in the partition wall. The partition wall 420c' may form a plurality of hydraulic fluid communication passages 420e' for communication between the first pump accommodation chamber and the second pump accommodation chamber. These communication passages enable the entire housing to be used as the hydraulic fluid tank.

The first center section 430a supports on the upper surface thereof the first hydraulic pump 410a, and is connected to the housing 420' in such a manner as to seal the first opening 420a' of the housing. The first pump shaft 411a of the first hydraulic pump 410a has the upstream end or the lower end extending downwardly through the first center section 430*a* to form a lower extension through which the power is inputted to drive the hydraulic pump units and the cooling fan 481.

On the other hand, the second center section 430*b* supports on the lower surface thereof the second hydraulic pump 410*b*, and is connected to the housing 420' in such a manner as to seal the second opening 420*b*' of the housing 420'. The second pump shaft 411*b* of the second hydraulic pump 410*b* has the downstream end or the upper end extending upwardly through the second center section 430*b* to form an upper extension through which the charge pump 450 is driven.

The first center section 430*a*, as illustrated in FIGS. 22 and 30, forms a first pair of hydraulic passages 431*a* for the first hydraulic pump, respectively having first ends opening to the outside of the first center section through the surface facing the first piston unit 412*a* (the upper surface) to respectively communicate with the inlet/outlet ports of the first piston unit, and second ends opening to the outside of the first center section. The second ends of the first pair of hydraulic passages 431*a* opening to the outside forms a first pair of inlet/outlet ports 432*a* respectively serving as connection ports for connection with the first pair of hydraulic lines 484*a* extending to the first hydraulic motor 482*a*.

Similarly, the second center section 430*b*, as illustrated in FIGS. 22, 30 and 31, forms a second pair of hydraulic passages 431*b* for the second hydraulic pump, respectively having first ends opening to the outside of the second center section through the surface facing the second piston unit 412*b* to respectively communicate with the inlet/outlet ports of the second piston unit, and second ends opening to the outside of the second center section. The second ends of the second pair of hydraulic passages 431*b* opening to the outside forms a second pair of inlet/outlet ports 432*b* respectively serving as connection ports for connection with the second pair of hydraulic lines 484*b* extending to the second hydraulic motor 482*b*.

Similarly to the fourth embodiment, the pump unit 400' of this embodiment includes the common charging passage 433 disposed therein, having a first end opening to the outside of the pump unit to form the inlet port for charging 434, and the second end communicating with the first and second pairs of hydraulic passages.

The common charging passage 433, as illustrated in FIGS. 30 and 31, includes a first bore portion 433*a*, a pipe portion 433*b* and a second bore portion 433*c*. The first bore portion 433*a* is formed in the second center section 430*b* to have a first end opening to the outside of the second center section through the upper surface thereof to form the inlet port for charging 434 and a second end communicating with the second pair of hydraulic passages 431*b* via the check valves 461*c* and 461*d* and opening to the second pump accommodation chamber. The pipe portion 433*b* is disposed to have a first end connected to the second end of the first bore portion 433*a* and a second end extending through the second pump accommodation chamber, the partition wall 420*c* and the first pump accommodation chamber to the first center section 430*a*. The second bore portion 433*c* is formed in the first center section 430*a* to have a first end connected to the second end of the pipe portion 433*b* and a second end communicating with the first pair of hydraulic passages 431*a* via the check valves 461*a* and 461*b*. The pipe portion 433*b* can be extended through the partition wall 420*c*' by disposing the pipe portion 433*b* within one of the plurality of hydraulic fluid communication passages 420*e*'.

Connected to the common charging passage 433 is a pressure relief line 453 communicating with the housing via a relief valve 452. The pressure relief line 453, similarly to the seventh embodiment, is formed in the charge pump casing 459 to communicate with the housing 420' via the drain port 435 formed in the second center section 430*b*.

The thus arranged pump unit 400' of this embodiment also produces the same effects as those of the fourth embodiment.

Alternative to the pipe portion 433*b*', it is possible to form in the peripheral wall of the common housing 420 a communication hole having a first end connected to the second end of the first bore portion 433*a*' and a second end connected to the first end of the second bore portion 433*c*'.

In this embodiment, the first and second hydraulic pumps respectively supported by the first and second center sections are accommodated within the common pump case. Alternative to this arrangement, similarly to the second embodiment, it is possible that the first and second hydraulic pumps supported by the common center section are respectively accommodated within the first and second pump cases (see FIG. 13).

Sixth Embodiment

Figure 32:
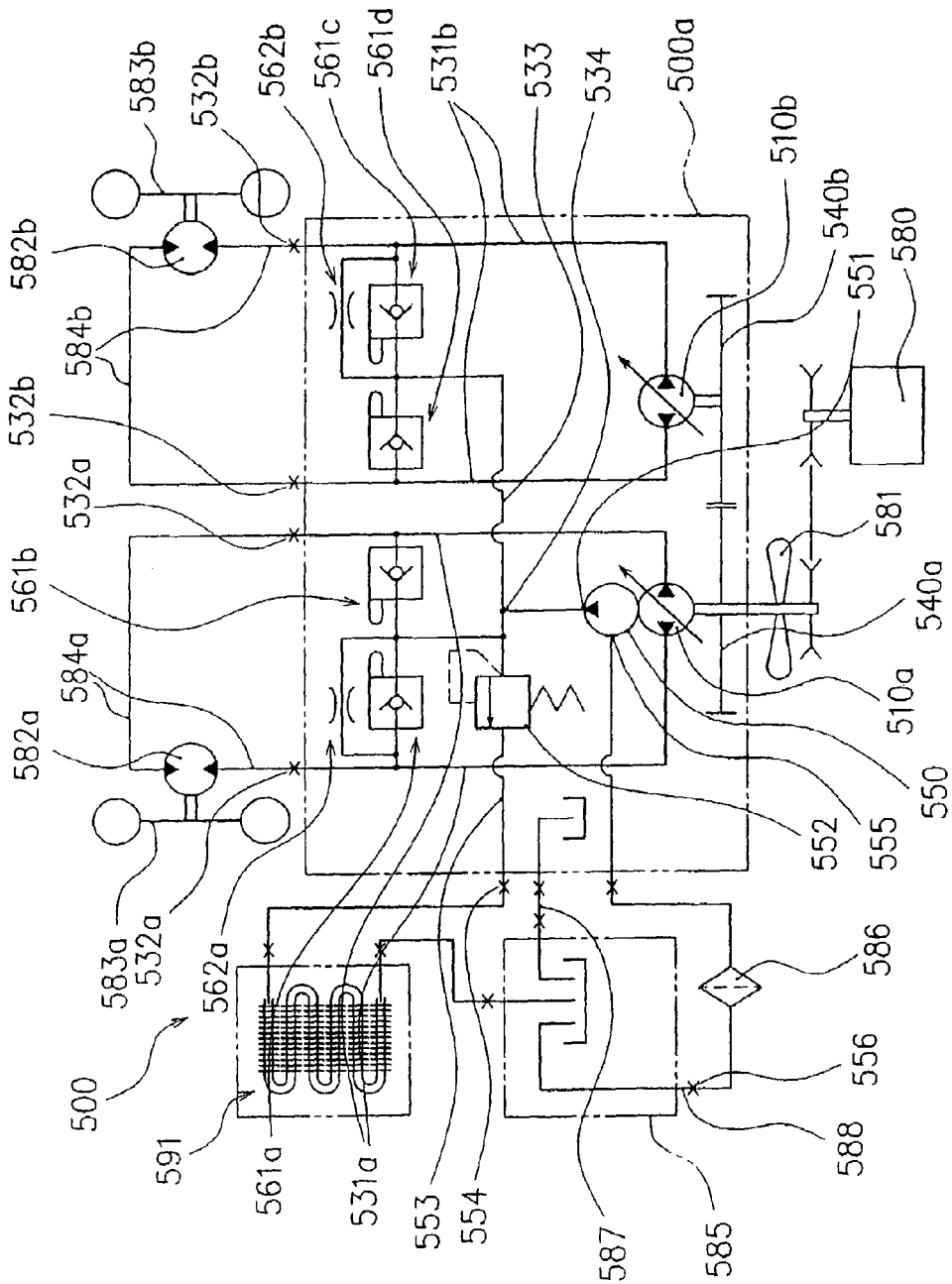
FIG. 32 is a hydraulic circuit diagram of the vehicle to which one embodiment of a pump unit according to the fourth aspect of the present invention is applied.
Figure 33:
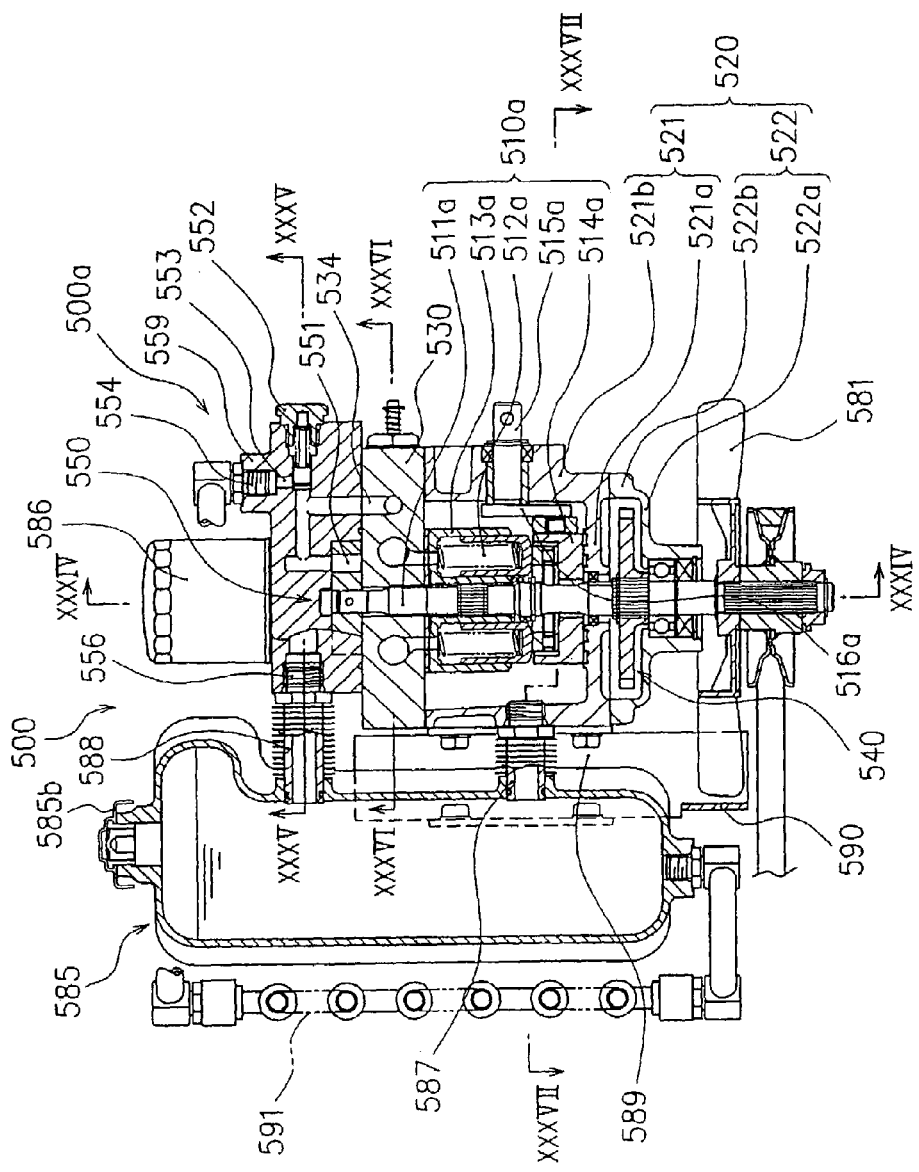
FIG. 33 is a longitudinal cross-sectional side view of the pump unit illustrated in FIG. 32.

One embodiment of the pump unit according to the fourth aspect of the present invention will be hereinafter described with reference to the accompanying drawings. FIG. 32 is a hydraulic circuit diagram of the vehicle to which a pump unit 500 of this embodiment is applied. FIG. 33 is a longitudinal cross-sectional side view of the pump unit and its periphery. FIGS. 34 to 37 are respectively cross sections taken along lines XXXIV-XXXIV, XXXV-XXXXV, XXXVI-XXXVI, and XXXVII-XXXVII.

As illustrated in FIGS. 32 to 34, the pump unit 500 is adapted to be used in a vehicle having right and left drive wheels 583*a* and 583*b* to which first and second hydraulic motors 582*a* and 582*b* are respectively connected, and includes a first hydraulic pump 510*a* and a second hydraulic pump 510*b* respectively connected to the first and second hydraulic motors 582*a* and 582*b* via a first pair of hydraulic lines 584*a* and a second pair of hydraulic lines 584*b*, and a common housing 520 for accommodating these hydraulic pumps 510*a* and 510*b*.

The connection form between the right and left drive wheels 583*a* and 583*b*, and the first and second hydraulic motors 582*a* and 582*b* meant in this embodiment includes the direct connection of the drive wheels respectively to those hydraulic motors, and also an operative connection of the drive wheels respectively to the hydraulic motors via a suitable power transmission mechanism. In FIG. 32, the reference codes 580, 581 and 586 respectively represent a power source, a cooling fan and a filter.

As illustrated in FIGS. 33 to 34, the first hydraulic pump 510*a* and the second hydraulic pump 510*b* are axial piston pumps of a variable displacement type, and respectively include a first pump shaft 511*a* and a second pump shaft 511*b* that have vertical axes and are disposed parallel to one another in the vehicle width direction within the housing 520, a first piston unit 512*a* and a second piston unit 512*b* that are reciprocatingly movable according to the rotation of the pump shafts, a first cylinder block 513*a* and a second cylinder block 513*b* that reciprocably support the piston units, a first angularly adjustable swash plate 514*a* and a second angularly adjustable swash plate 514*b* that regulate the stroke length of the piston units by varying their tilting angles to vary the input/output flow rates of the piston units, and a first control shaft 515a and a second control shaft 515b that control the tilting angles of these swash plates.

The pump unit of this embodiment is of a vertical type with the first and second pump shafts 511a and 511b having the vertical axes. However, the fourth aspect of the present invention is not necessarily limited to this arrangement. It is a matter of course that the pump unit 500 can be of a horizontal type with the first and second pump shafts 511a and 511b having the horizontal axes.

As best illustrated in FIG. 34, the first and second angularly adjustable swash plates 514a and 514b of this embodiment are of a cradle type.

Figure 37:
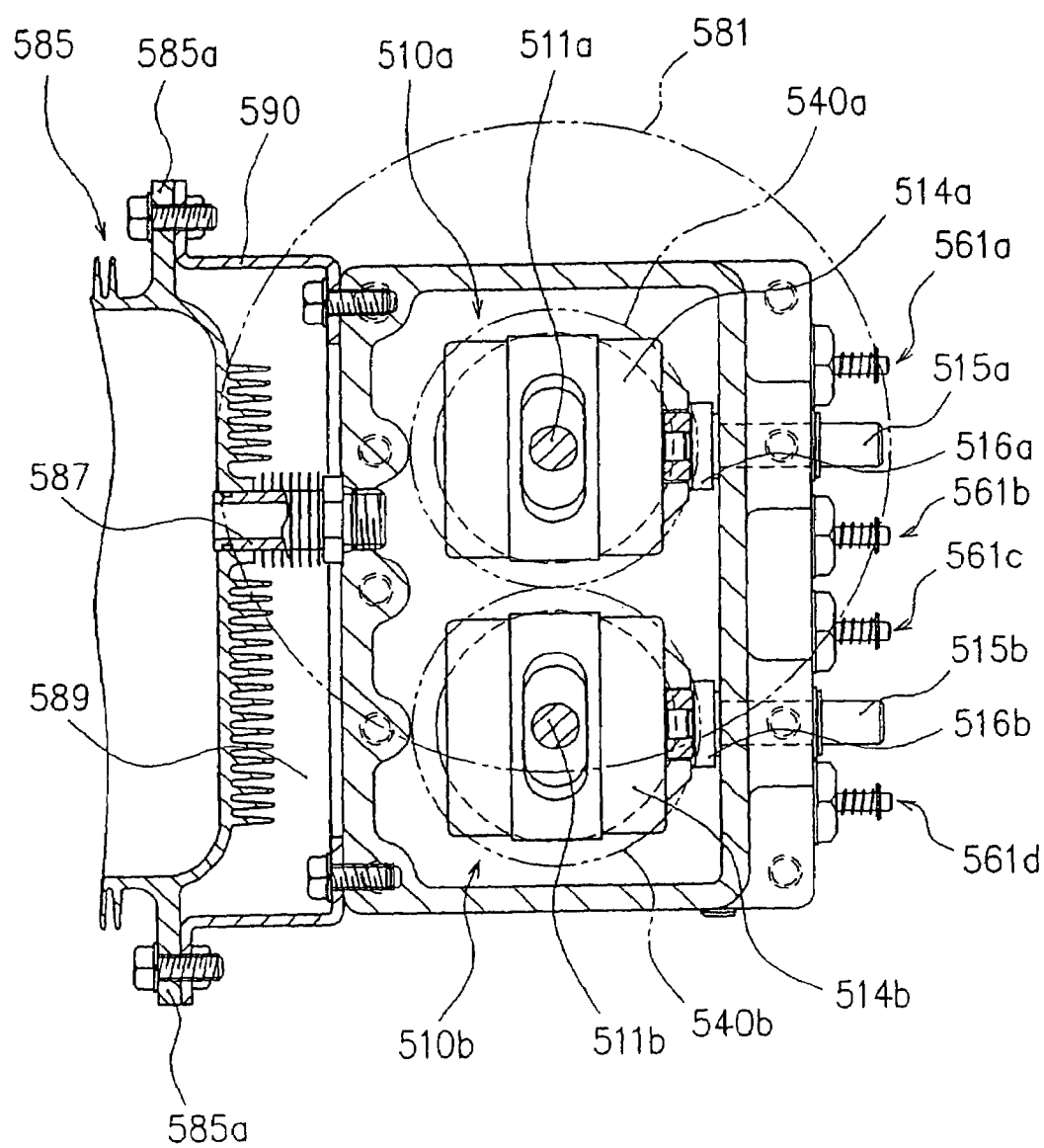
FIG. 37 is a cross section taken along lines XXXVII-XXXVII in FIG. 33.

As illustrated in FIGS. 33 and 37, the first control shaft 515a and the second control shaft 515b respectively have inner ends extending into the housing 520 to be respectively connected to arms 516a and 516b and hence the first and second swash plates 514a and 514b, and outer ends extending rearwards in the vehicle longitudinal direction.

Alternative to the above arrangement, the first and second control shafts 515a and 515b may extend away from one another in the vehicle width direction to respectively have oppositely positioned outer ends. This arrangement is advantageous when installed on the vehicle having push-pull control levers 198a and 198b as illustrated in FIG. 1, since the first and second control shafts 515a and 515b can have the rotating shaft centers disposed parallel to the longitudinal axis of the control levers, thereby achieving the simplification of a link mechanism between these control shafts and the control levers.

In the above arrangement, the first control shaft 515a and the second control shaft 515b are more preferably located at substantially the same position with respect to the vehicle longitudinal direction. The thus arranged first and second control shafts 515a and 515b can be aligned with the control levers in the vehicle width direction, thereby achieving a more simplified structure of the link mechanism.

The pump unit 500 further includes a common center section 530 that supports the first and second hydraulic pumps 510a and 510b, and a power transmission mechanism 540 that is accommodated within the housing 520 to operatively connect the first and second hydraulic pump shafts 511a and 511b together.

The pump unit 500 with the power transmission mechanism 540 permits the simultaneous rotation of both pump shafts 511a and 511b only by connecting the power source to either one of the first and second pump shafts 511a and 511b, or to the first pump shaft 511a in this embodiment, thereby achieving the simplified structure for the power transmission from the power source to the pump unit 500. In this embodiment, the power transmission mechanism 540 is in the form of a gear transmission device that includes a first gear 540a non-rotatably supported on the lower side of the first pump shaft 511a, and a second gear 540b non-rotatably supported on the lower side of the second pump shaft 511b in meshed engagement with the first gear 540a (see FIGS. 34 and 35). Instead of the gear transmission device, any conventional power transmission mechanisms such as chain and belt may be used.

The housing 520, as illustrated in FIGS. 33 and 34, includes a first housing 521 for accommodating the first and second hydraulic pumps 510a and 510b, and a second housing 522 for accommodating the power transmission mechanism 540.

The first housing 521 has a box shape with a first sidewall 521a disposed in the upper or lower side of the pump shafts 511a and 511b along the longitudinal direction thereof, or in this embodiment in the lower side of the pump shafts 511a and 511b, which will be hereinafter referred to simply as the lower side, and a peripheral wall 521b extending from a peripheral edge of the first sidewall 521a to the opposite side of the pump shafts 511a and 511b along the longitudinal direction thereof (i.e., the upper side of the pump shafts 511a and 511b in this embodiment, which will be referred to simply as the upper side). The first sidewall 521a forms bearing holes through which the first and second pump shafts 511a and 511b respectively extend. The upper side of the first housing 521 has an end surface forming an opening through which the first and second hydraulic pumps 510a and 510b can be placed into the first housing 521. The opening of the first housing 521 is sealed by the center section 530 in a liquid tight manner. That is, the center section 530 of this embodiment constitutes a part of the first housing 521.

The second housing 522 is disposed in the lower side, and has a box shape with a lower sidewall 522a forming a bearing hole through which the lower end of the first pump shaft 511a extends and a bearing portion for receiving the lower end of the second pump shaft 511b, and a peripheral wall 522b extending upwardly from a peripheral edge of the lower sidewall 522a. The upper side of the second housing 522 forms an opening through which the power transmission mechanism 540 can be placed into the second housing 522.

The second housing 522 is connected to the first housing 521 in such a manner as to have the opening sealed in a liquid tight manner by the first sidewall 521a of the first housing 521, and form an accommodation space of the power transmission mechanism 540 in cooperation with the first sidewall 521a of the first housing 521.

In the thus arranged housing 520, the first sidewall 521a of the first housing 521 serves as a partition wall dividing the accommodation space of the housing into a hydraulic pump accommodation chamber and a power transmission mechanism accommodation chamber. The partition wall thus defining the hydraulic pump accommodation chamber and the power transmission mechanism accommodation chamber can effectively prevent any foreign matters such as iron powder generated in the power transmission mechanism 540 from intruding into the hydraulic pump accommodation chamber, and hence damaging piston units 512a, 512b, cylinder blocks 513a, 513b, and/or other parts. In addition to this foreign matter prevention measure, the first and second pump shafts 511a and 511b, which extend through the partition wall 521a, may have circumferential peripheries with seal rings thereon to more securely prevent the intrusion of the foreign matters.

Portions of the housing 520, through which the respective shafts 511a, 515a and 515b extend, are sealed by any suitable sealing means in a liquid tight manner, thereby allowing the housing 520 to serve as the hydraulic fluid tank.

The first sidewall 521a serving as the partition wall preferably forms a hydraulic fluid communication hole (not shown) for communication between the hydraulic pump accommodation chamber and the power transmission mechanism accommodation chamber, with a filter provided in the hole for preventing the intrusion of the foreign matters into the hydraulic pump accommodation chamber. The thus formed hydraulic fluid communication hole can omit the necessity of separately feeding the lubricant to the power transmission mechanism 540, with the result that the power transmission mechanism 540 can be lubricated with the hydraulic fluid stored within the housing. This permits low manufacturing cost and ease of maintenance.

In this embodiment, the first and second angularly adjustable swash plates 514a and 514b are of a cradle type, as illustrated in FIG. 34. Therefore, when the partition wall 521a forms, on its side facing the hydraulic pumps 510a, 510b, spherical concave surfaces 524 respectively adapted to spherical convex surfaces 519 formed in the rear sides of the swash plates 514a and 514b, which rear sides being opposite to the surfaces facing the piston units 512a and 512b, the spherical concave surfaces 524 can slidingly guide the spherical convex surfaces 519 of the swash plates 514a and 514b. The swash plates thus can securely rest on the spherical concave surfaces 524.

In this embodiment, the first sidewall 521a of the first housing 521 serves as the partition wall. Alternatively, a partitioning means may take various forms, as long as it can produce the same effect as described above. For example, a separately prepared partition wall may be mounted in a housing having a simple cylindrical box shape (see FIG. 14).

Figure 38:
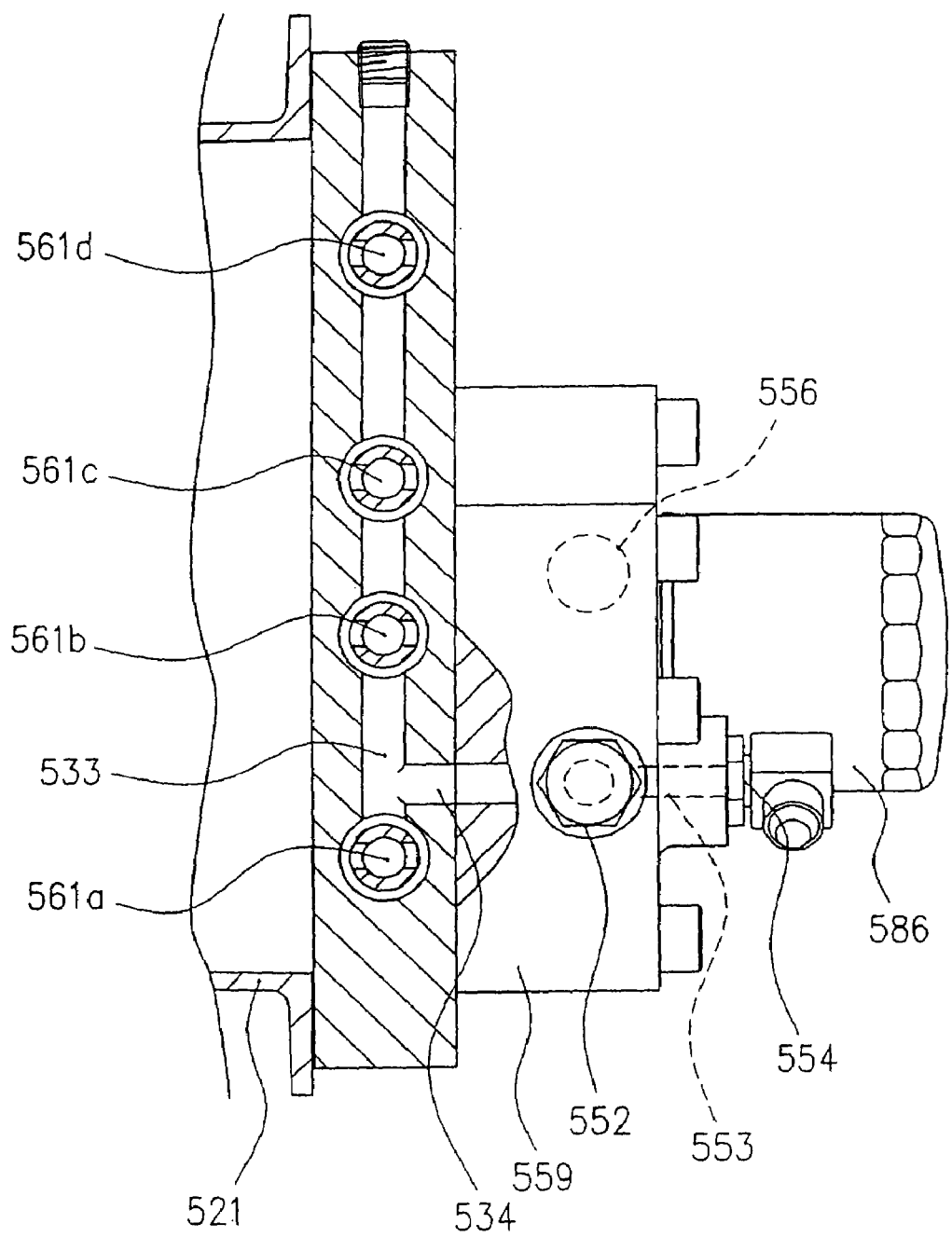
FIG. 38 is a cross section taken along lines XXXVIII-XXXVIII in FIG. 36.

Now, the description will be made for the center section 530. FIG. 38 is a cross section taken along lines XXXVIII-XXXVIII in FIG. 36. As best illustrated in FIGS. 36 and 38, the center section 530 forms a first pair of hydraulic passages 531a respectively having first ends communicating with the first piston unit and second ends opening to the outside of the center section 530 to form a first pair of inlet/outlet ports 532a serving as connection ports for connection with the first pair of hydraulic lines 584a (see FIG. 32).

Figure 36:
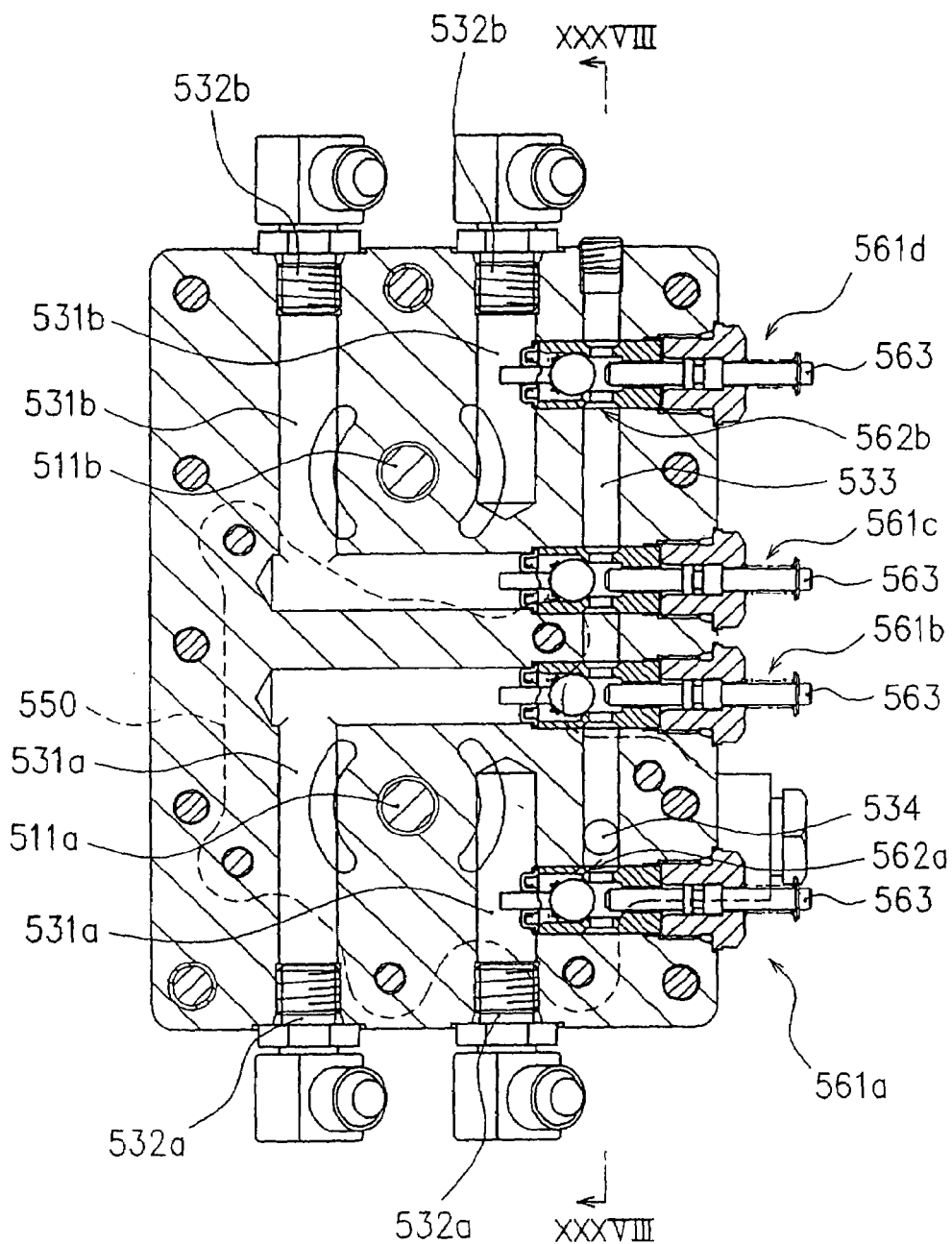
FIG. 36 is a cross section taken along lines XXXV-XXXVI in FIG. 33.

The center section 530, as best illustrated in FIG. 36, also forms a second pair of hydraulic passages 531b having first ends communicating with the second piston unit and second ends opening to the outside of the center section 530 to form a second pair of inlet/outlet ports 532b serving as connection ports for connection with the second pair of hydraulic lines 584b (see FIG. 32).

The common center section 530 thus forms all the first and second pairs of inlet/outlet ports 532a and 532b serving as the connection ports for connection with the first and second pairs of hydraulic lines 584a and 584b. Whereby, the piping work between the hydraulic pumps 510a and 510b, and the hydraulic motors 582a and 582b can be facilitated. In this embodiment, the common center section 530 has side surfaces facing one another that respectively form the first pair of inlet/outlet ports 532a and the second pair of inlet/outlet ports 532b. Alternatively, the first and second pairs of inlet/outlet ports 532a and 532b can be formed in the same side of the center section, thereby further facilitating the piping work.

Figure 35:
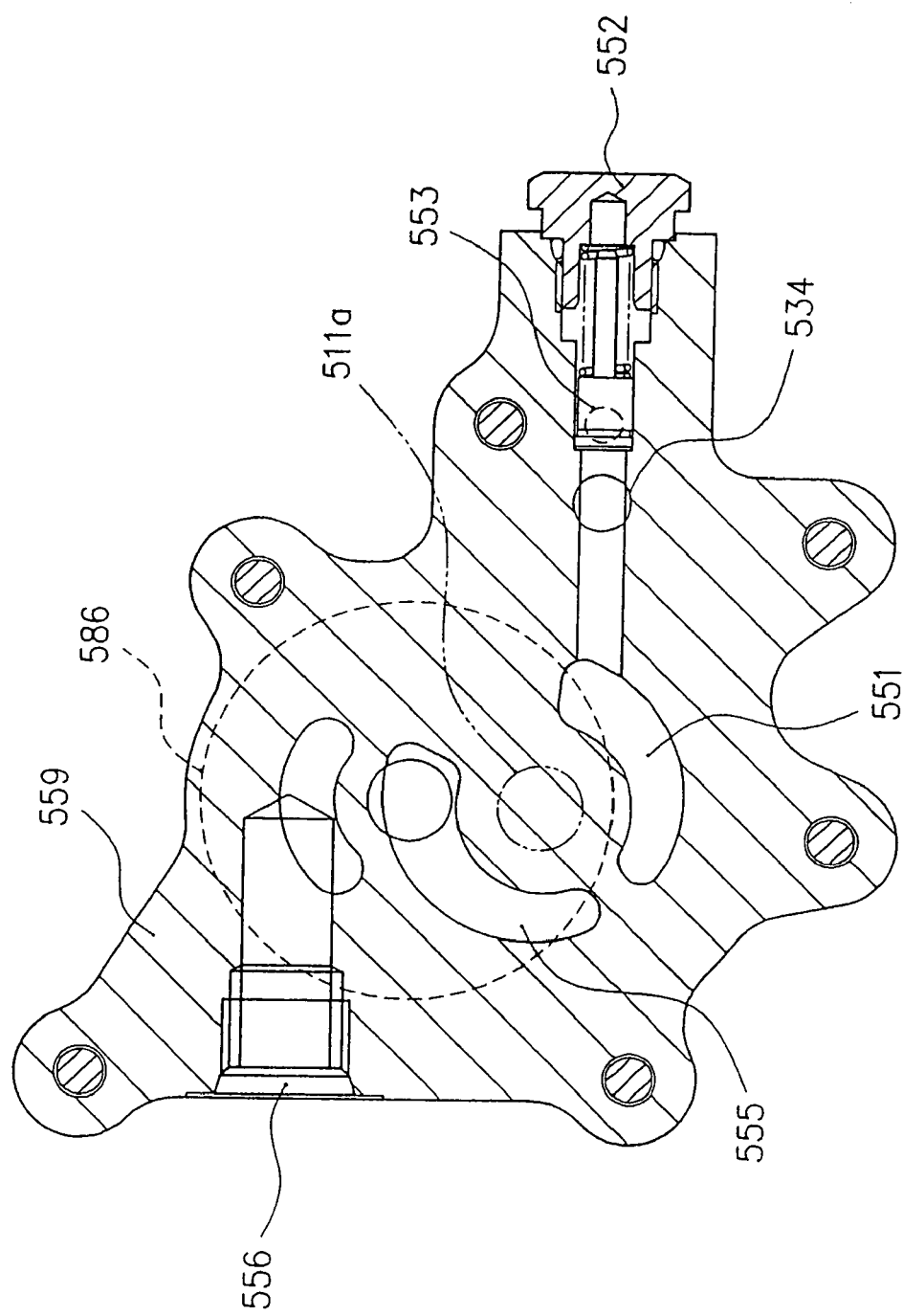
FIG. 35 is a cross section taken along lines XXXV-XXXV in FIG. 33.

The center section 530, as illustrated in FIGS. 33, 35 and 36, also forms a common charging passage 533 having a first end opening to the outside of the center section 530 to form an inlet port for charging 534 serving as an inlet for the hydraulic fluid to be replenished, and a second end communicating with the first pair of hydraulic passages 531a and the second pair of hydraulic passages 531b via check valves 561a, 561b, 561c and 561d.

In this embodiment, the first pump shaft 511a, as best illustrated in FIGS. 33 and 34, has an extension extending upwards from the upper end thereof to be located above the center section 530, thereby supporting a charge pump 550 via the extension. The charge pump 550 has an upper surface with a cartridge filter 586 detachably mounted thereto, through which the hydraulic fluid is sucked into the inlet port 555 of the charge pump 550. The cartridge filter 586 can be provided at the discharge side of the charge pump 550.

The charging passage 533 is connected to a first end of a pressure relief line 553 with a relief valve 552 therein. The relief valve 552 regulates the hydraulic pressure of the charging passage 533 (see FIGS. 32 and 33).

The pressure relief line 533 has a second end opening to the outside to form a drain port 554 through which the hydraulic fluid from the relief valve is claimed.

In this embodiment, the pressure relief line 553 is formed in a charge pump casing 559 mounted on the upper surface of the center section 530. However, the present invention is not necessarily limited to this arrangement. That is, the pressure relief line 553 can be formed in the center section 530.

Reference codes 551 and 556 in FIGS. 33 and 35 respectively represent an outlet port of the charge pump, and an inlet port communicating with the inlet port 555 of the charge pump 550 via the filter 586.

As described above, the charging passage 533 has the second end communicating with the first pair of hydraulic passages 531a and the second pair of hydraulic passages 531b via the check valves 561a, 561b, 561c and 561d so as to allow the pressurized hydraulic fluid to be fed from the common charging passage 533 into a lower pressure line of the first pair of hydraulic lines 584a and a lower pressure line of the second pairs of hydraulic lines 584b, while preventing the pressurized hydraulic fluid from flowing in the reverse direction.

Further, bypass lines 562a and 562b having throttle valves are formed between at least one of the first pair of hydraulic passages 531a and the charging passage 533, and between at least one of the second pair of hydraulic passages 531b and the charging passage 533 (see FIGS. 32 and 36).

The bypass lines 562a and 562b are designed to assure the neutralization of the hydraulic pumps 510a and 510b. Specifically, even if the swash plates 514a and/or 514b of the hydraulic pumps 510a and 510b tilts from the neutral positions by a small angle, there occurs the pressure difference between the first pair of hydraulic lines 484a, and/or between the second pair of hydraulic lines 454b. This pressure difference causes the rotation of the hydraulic motors 582a and 582b. That is, even a slight amount of the displacement between the actual neutral positions and the predetermined design positions of the swash plates 514a and 514b due to assembling errors or the like causes an unintentional rotation of the hydraulic motors 582a and 582b. On the contrary, the bypass lines 562a and 562b, as described above, allow the pressurized hydraulic fluid to leak therethrough from the first pair of hydraulic lines 584a and the second pair of hydraulic lines 584b. Thus, the pressure difference between the pair of first hydraulic lines 584a and/or between the second pair of hydraulic lines 584b can effectively be limited, thereby effectively avoiding the unintentional rotation of the hydraulic motors 582a and 582b, even for the swash plates 514a and 514b having the actual neutral position displaced from the design neutral position due to the assembling errors or the like.

In view of transmission efficiency between the hydraulic pumps 510a, 510b and the hydraulic motors 582a, 582b, the leakage of the pressurized hydraulic fluid from the first and second pairs of hydraulic lines 584a, 584b through the bypass lines 562a, 562b is not preferable. Therefore, the bypass lines 562a, 562b are preferably provided in portions from the charging passage 533 to one of the first pair of hydraulic passages 531a, and to one of the second pair of hydraulic passages 531b.

The check valves 561a, 561b, 561c and 561d are more preferably provided with release means 562 to forcibly bring the first pair of hydraulic passages 531a into communication with one another, and the second pair of hydraulic passages 531b into communication with one another, if an emergency arises, as illustrated in FIG. 36. The release means 562 are designed to easily move the vehicle, when the vehicle must forcibly be moved or the vehicle wheels must forcibly be rotated by man power or the like due to the disorder of the power source 580, the hydraulic pumps 510a, 510b or the like. Specifically, when the vehicle wheels connected to the hydraulic motors 582a and 582b are forcibly rotated with the first pair of hydraulic lines 584a and/or the second pair of hydraulic lines 584b lying in the closing state, there occurs the pressure difference between the first pair of hydraulic lines 584a, and between the second pair of hydraulic lines 584b. As a result, the vehicle is hardly moved, or the vehicle wheels are hardly rotated. On the contrary, the release means can easily achieve the communications between the first pair of hydraulic passages 531a, and between the second pair of hydraulic passages 531b without the necessity of mechanically releasing all the check valves 561a to 561d. Whereby, the vehicle can easily be moved by man power or the like.

As illustrated in FIG. 36, all the release means 563 are preferably disposed in the same side of the center section 530, so that the link mechanism linking these release means 563 for operation of the same can have a simplified structure.

As described above, the pump unit 500 of this embodiment includes the first and second hydraulic pumps 510a and 510b, the center section 530 and the housing 520, all of which are integrally connected together to constitute a single unit 500a. Accordingly, both first and second hydraulic pumps 510a and 510b can be installed on the vehicle only by mounting the single unit 500a on the vehicle, thereby achieving an improved efficiency in assembling the vehicle.

The pump unit 500 of this embodiment also includes a reservoir tank 585 supportingly connected to the single unit 500a, as illustrated in FIGS. 33 to 35. In this embodiment, the reservoir tank 585 has right and left sides respectively forming mounting ribs 585a, so that the reservoir tank 585 is supportingly connected to the single unit 500a via mounting members 590 fastened to the mounting ribs 585a.

The reservoir tank 585 communicates with the housing 520 for a free fluid communication therebetween via a hydraulic fluid replenishing passage 587 or other suitable piping means, as illustrated in FIGS. 33 and 37. This hydraulic communication allows the reservoir tank 585 to be used as a hydraulic fluid tank together with the housing 520.

Preferably, the reservoir tank 585 has the upper side positioned higher than the upper side of the housing 520, so that the housing can be completely filled with the hydraulic fluid, thereby effectively preventing the air from being entrained in the hydraulic fluid stored within the housing 520. Variation in volume of the hydraulic fluid within the housing 520 due to variation in temperature of this hydraulic fluid can be properly compensated by the reservoir tank 585 communicating with the housing.

The hydraulic fluid tank communicates with the inlet port for charging 534. According to this embodiment, the hydraulic fluid, which has been sucked via the hydraulic fluid replenishing passage 588 from the reservoir tank 585 constituting a part of the hydraulic tank, is fed into the inlet port for charging 534 via the pressure relief line 553 (see FIGS. 32 and 33).

On the other hand, the drain port adapted to drain the hydraulic fluid from the relief valve 552 installed within the pressure relief line 553 is connected to a cooling pipe 591 via a first end thereof. The cooling pipe 591 has a second end communicating with the reservoir tank 585 constituting a part of the hydraulic tank. The cooling pipe 591, as illustrated in FIG. 33, has at least a portion extending through the outside air with a spacing from the single unit 500a and the reservoir tank 585 to air-cool the hydraulic fluid flowing through the cooling pipe 591. The cooling pipe 591 preferably has an outer circumference provided with cooling fins to obtain an enlarged heat radiation area, and hence improved cooling efficiency.

The cooling pipe 591 may be connected to the reservoir tank 585 or the single unit 500a by a suitable bridging means.

The pump unit is thus designed so that the hydraulic fluid, which has been sucked into the inlet port 555 of the charge pump 550 via the hydraulic fluid replenishing passage 588, and discharged through the outlet port 551, partly returns to the hydraulic fluid tank via the cooling pipe 591 extending through the outside air.

Specifically, the hydraulic fluid replenishing passage 588, a part of the pressure relief line 553 and the cooling pipe 591 together constitutes a circulation, line having a first end communicating with the hydraulic fluid tank and a second end again communicating with the hydraulic fluid tank. The charge pump 550 is also designed to allow the hydraulic fluid to be sucked through the first end of the circulation line and to be returned to the hydraulic fluid tank through the second end of the circulation line. Whereby, the rise in temperature of the stored hydraulic fluid can effectively be prevented. As a result, deterioration in working efficiency of the hydraulic pumps and the hydraulic motors can effectively be prevented.

The pump unit of this embodiment has the arrangement to allow the hydraulic fluid drained from the relief valve 552 installed within the pressure relief line 553 to be returned to the hydraulic fluid tank via the cooling pipe 591 in consideration of the cooling efficiency of the hydraulic fluid. That is, the hydraulic fluid discharged from the charge pump 550 is highly pressurized, and therefore has a high temperature due to the pressure energy of the discharged hydraulic fluid. Therefore, when the drained hydraulic fluid is directly returned to the hydraulic fluid tank, the temperature of the hydraulic fluid stored in the hydraulic tank may increase. On the contrary, the pump unit of this embodiment includes the cooling pipe 591 to return the hydraulic fluid of a high temperature drained from the relief valve 552 to the hydraulic fluid tank to effectively limit the increase in temperature of the hydraulic fluid stored within the tank.

More preferably, the cooling fan 581 operatively driven by the power source 580 is disposed near the single unit 500a and the reservoir tank 585, and the reservoir tank 585 is connected to the single unit 500a in such a manner as to form between the reservoir tank 585 and the single unit 500a a clearance 589 into which a cooling air stream is drawn from the cooling fan 581. The hydraulic fluid replenishing passage 588 and/or the hydraulic fluid communication passage 587 traverses the clearance 589.

In the above arrangement, the hydraulic fluid replenishing passage 588 and the hydraulic fluid communication passage 587 each preferably have the right and left sides surrounded by a cooling air duct or shroud to effectively guide the cooling air stream from the cooling fan to the clearance 589.

Figure 39:
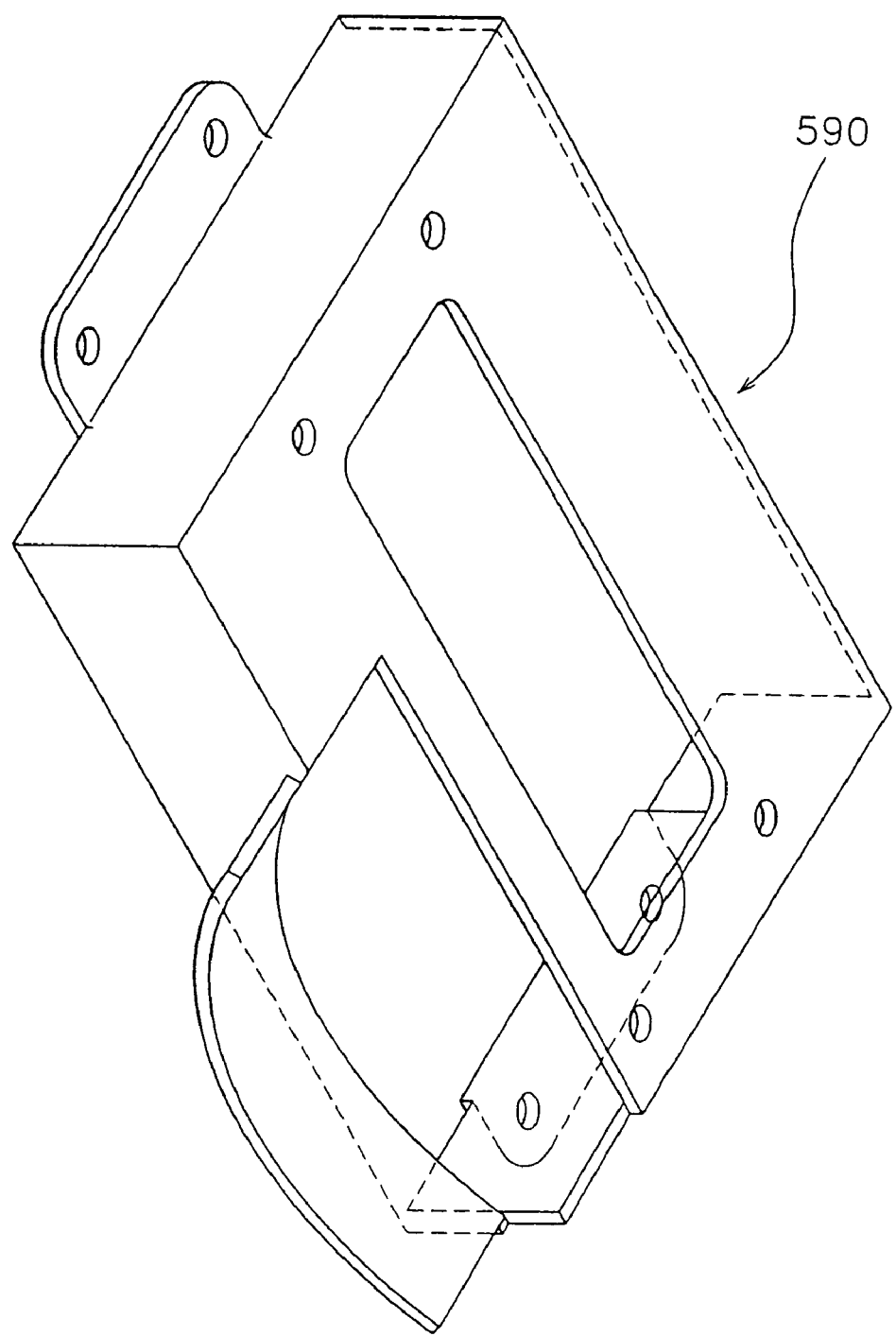
FIG. 39 is a perspective view of a mounting member.

In this embodiment, the mounting members 590 for mounting the reservoir tank 585 to the single unit 500a is formed into a casing (see FIG. 39) with sidewalls, so that the cooling air stream from the cooling fan 581 can efficiently drawn into the clearance along its sidewalls.

Such an additional fluid cooling arrangement can achieve cooling of the hydraulic fluid flowing through the hydraulic fluid replenishing passage 588 and the hydraulic fluid communication passage 587 in addition to the cooling of the hydraulic fluid flowing through the cooling pipe 591, thereby more effectively limiting the increase in temperature of the hydraulic fluid within the hydraulic tank.

The hydraulic fluid replenishing passage and the hydraulic fluid communication passage each more preferably has an outer circumference provided with cooling fins (not shown) to obtain an enlarged heat radiating area, and hence an improved cooling efficiency. The cooling fins can also be provided on the reservoir tank 585 itself.

Preferably, the reservoir tank 585 is made of a semitransparent resin material to afford a visual observation of the level of the hydraulic fluid from the outside of the tank. The reservoir tank 585 can also include a tank cap 585b with an air release mechanism on the top of the tank.

In this embodiment, the charge pump 550 is provided to forcibly feed the pressurized hydraulic fluid to the inlet port for charging 534, and to circulate the hydraulic fluid through the circulation line. The present invention is not necessarily limited to this arrangement. Alternative to this arrangement with the charge pump 550, the inlet port for charging 534 may be directly connected to the reservoir tank 585 via the hydraulic fluid replenishing passage 588 by omitting the charge pump 550. This allows the hydraulic fluid to spontaneously flow into the inlet port 534 when the pressure in a lower pressure line of the first pair of hydraulic lines 584a and/or the pressure in a lower pressure line of the second pair of hydraulic lines 584b drops from a predetermined value. In addition, a pump may be separately provided to circulate the hydraulic fluid through the circulation line.

Figure 40:
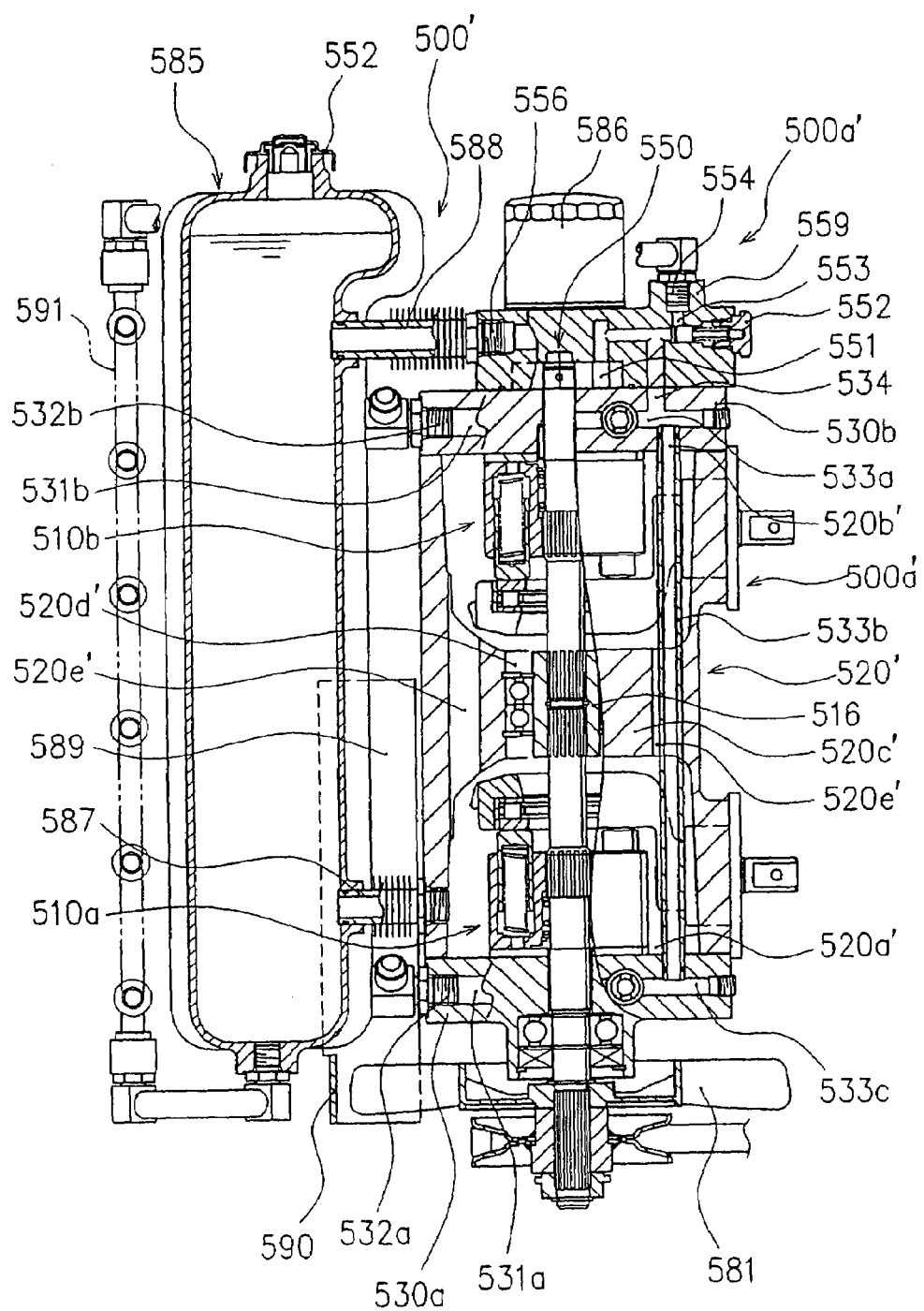
FIG. 40 is a longitudinal cross-sectional side view of the pump unit according to another embodiment of the fourth aspect of the present invention.

The pump unit of this embodiment may employ the arrangement, which allows a cooling air stream from a cooling fan (not shown) for the power source or a radiator (not shown) to be applied on the cooling pipe 591. This arrangement can more effectively cool the hydraulic fluid flowing through the cooling pipe 591. Seventh Embodiment Another embodiment of the pump unit according to the fourth aspect of the present invention will be hereinafter described with reference to FIG. 40. FIG. 40 is a longitudinal cross-sectional side view of the pump unit 500'.

As illustrated in FIG. 40, the pump unit 500' of this embodiment is a tandem pump unit with the first hydraulic pump 510a connected in series with the second hydraulic pump 510b. In the following description, corresponding or identical parts to those of the sixth embodiment have been given the same reference characters or those with primes (') to omit a detailed description thereof.

As illustrated in FIG. 40, the pump unit 500' includes the common housing 520' for accommodating the first hydraulic pump 510a and the second hydraulic pump 510b, and the first center section 530a and the second center section 530b respectively supporting the first hydraulic pump 510a and the second hydraulic pump 510b.

The common housing 520' has the first end (the lower end in this embodiment), and the second end (the upper end in this embodiment) along the axial direction thereof respectively defining the first opening 520a' for receiving the first hydraulic pump 510a and the second opening 520b' for receiving the second hydraulic pump 510b.

The common housing 520' also forms the partition wall 520c' at substantially the center in the direction of the pump shaft to divide the common housing into the first pump accommodation chamber and the second pump accommodation chamber. The partition wall 520c' includes a bearing portion for supporting the connection portion between the first pump shaft 511a and the second pump shaft 511b. Specifically, the partition wall 520c' includes a connection member 516 non-rotatably fixed around the downstream end or the upper end of the first pump shaft 511a and the upstream end or the lower end of the second pump shaft 511b, and rotatably supported in the bearing hole 520d' formed in the partition wall. The partition wall 520c' may form a plurality of hydraulic fluid communication passages 520e' for communication between the first pump accommodation chamber and the second pump accommodation chamber. These communication passages enable the entire housing to be used as the hydraulic fluid tank.

The first center section 530a supports on the upper surface thereof the first hydraulic pump 510a, and is connected to the housing 520' in such a manner as to seal the first opening 520a' of the housing. The first pump shaft 511a of the first hydraulic pump 510a has the upstream end or the lower end extending downwardly through the first center section 530a to form a lower extension through which the power is inputted to drive the hydraulic pump units and the cooling fan 581.

On the other hand, the second center section 530b supports on the lower surface thereof the second hydraulic pump 510b, and is connected to the housing 520' in such a manner as to seal the second opening 520b' of the housing 520'. The second pump shaft 511b of the second hydraulic pump 510b has the downstream end or the upper end extending upwardly through the second center section 530b to form an upper extension through which the charge pump 550 is driven.

The first center section 530a, as illustrated in FIGS. 32 and 40, forms a first pair of hydraulic passages 531a for the first hydraulic pump, respectively having first ends opening to the outside of the first center section through the surface facing the first piston unit 512a (the upper surface) to respectively communicate with the inlet/outlet ports of the first piston unit, and second ends opening to the outside of the first center section. The second ends of the first pair of hydraulic passages 531a opening to the outside forms a first pair of inlet/outlet ports 532a respectively serving as connection ports for connection with the first pair of hydraulic lines 584a extending to the first hydraulic motor 582a.

Similarly, the second center section 530b, as illustrated in FIGS. 32 and 40, forms a second pair of hydraulic passages 531b for the second hydraulic pump, respectively having first ends opening to the outside of the second center section through the surface facing the second piston unit 512b to respectively communicate with the inlet/outlet ports of the second piston unit, and second ends opening to the outside of the second center section. The second ends of the second pair of hydraulic passages 531b opening to the outside forms a second pair of inlet/outlet ports 532b respectively serving as connection ports for connection with the second pair of hydraulic lines 584b extending to the second hydraulic motor 582b.

Similarly to the ninth embodiment, the pump unit 500' of this embodiment includes the common charging passage 533 disposed therein, having a first end opening to the outside of the pump unit to form the inlet port for charging 534, and the second end communicating with the first and second pairs of hydraulic passages.

The common charging passage 533, as illustrated in FIG. 40, includes a first bore portion 533a, a pipe portion 533b and a second bore portion 533c. The first bore portion 533a is formed in the second center section 530b to have a first end opening to the outside of the second center section through the upper surface thereof to form the inlet port for charging 534 and a second end communicating with the second pair of hydraulic passages 531b via the check valves 561c and 561d and opening to the second pump accommodation chamber. The pipe portion 533b is disposed to have a first end connected to the second end of the first bore portion 533a and a second end extending through the second pump accommodation chamber, the partition wall 520c and the first pump accommodation chamber to the first center section 530a. The second bore portion 533c is formed in the first center section 530a to have a first end connected to the second end of the pipe portion 533b and a second end communicating with the first pair of hydraulic passages 531a via the check valves 561a and 561b. The pipe portion 533b can be extended through the partition wall 520c' by disposing the pipe portion 533b within one of the plurality of hydraulic fluid communication passages 520e'.

The charging passage 533 is also connected to the pressure relief line 553 via the first end thereof with the relief valve 552 installed therein in the same manner as the fourth embodiment. The relief valve 552 regulates the hydraulic pressure of the charging passage 533 (see FIGS. 32 and 33). The pressure relief line 533 has the second end opening to the outside to form the drain port 554 through which the hydraulic fluid from the relief valve 552 is drained.

Connected to the drain port 554 is the cooling pipe 591, through which the hydraulic fluid drained from the drain port 554 is returned to the hydraulic tank, in the same manner as the fourth embodiment.

The thus arranged pump unit 500' of this embodiment also produces the same effects as those of the fourth embodiment.

Alternative to the pipe portion 533b', it is possible to form in the peripheral wall of the common housing 520 a communication hole having a first end connected to the second end of the first bore portion 533a' and a second end connected to the first end of the second bore portion 533c'.

In this embodiment, the first and second hydraulic pumps respectively supported by the first and second center sections are accommodated within the common pump case. Alternative to this arrangement, similarly to the second embodiment, it is possible that the first and second hydraulic pumps supported by the common center section are respectively accommodated within the first and second pump cases (see FIG. 13).

This specification is by no means intended to restrict the present invention to the preferred embodiments set forth therein. Various modifications to the pump unit, as described herein, may be made by those skilled in the art without departing from the spirit and scope of the present invention as defined in the appended claims.

What is claimed is:

1. A pump unit for supplying oil to first and second hydraulic motors respectively connected to left and right drive wheels, comprising:

a first hydraulic pump which includes a first pump shaft with first and second ends and which is fluidly connected to the first hydraulic motor through a first closed circuit;

a second hydraulic pump which includes a second pump shaft with first and second ends and which is fluidly connected to the second hydraulic motor through a second closed circuit;

a charge pump for replenishing oil into the first and second closed circuits;

a first housing which has an opening for accommodating the first hydraulic pump and which supports the first end of the first pump shaft, the opening facing in a direction along an axis line of the first pump shaft and having a size for allowing the first hydraulic pump to be passed therethrough;

a second housing which has an opening for accommodating the second hydraulic pump and which supports the second end of the second pump shaft, the opening facing in a direction along an axis line of the second pump shaft and having a size for allowing the second hydraulic pump to be passed therethrough; a common center section which has a first side closing the opening of the first housing and supporting the second end of the first pump shaft, a second side closing the opening of the second housing and supporting the first end of the second pump shaft, the second side being opposite to the first side, a hole penetrating between the first and second sides, the common center section including a charge passage; and a coupler which is accommodated within the hole and which operatively connects the second end of the first pump shaft and the first end of the second pump shaft; wherein the first end of the first pump shaft extends outwards from the first housing to be operatively connected to a power source;

the charge pump is mounted to the second housing;

the second end of the second pump shaft extends outwards from the second housing to drive the charge pump; and the second housing is provided with a passage for introducing pressurized oil from the charge pump into the charge passage.

2. A pump unit according to claim 1, wherein the second end of the second pump shaft extends outwards through the charge pump to drive a cooling fan.

3. A pump unit according to claim 1, wherein:

the common center section is provided with first hydraulic passages forming a part of the first closed circuit and having first inlet/outlet ports which are opened to its outside and through which the first hydraulic pump supply oil to and suction the same from the first hydraulic motor, and second hydraulic passages forming a part of the second closed circuit and having second inlet/outlet ports which are opened to its outside and through which the second hydraulic pump supply oil to and suction the same from the second hydraulic motor, wherein the charge passage replenishes oil into the first and second closed circuits.

4. A pump unit according to claim 3, wherein the first and second inlet/outlet ports are opened at a same side of the common center section.

5. A pump unit according to claim 3, wherein the passage for introducing pressurized oil from the charge pump into the charge passage is formed in a wall of the second housing.

6. A pump unit according to claim 1, wherein:

the common center section is provided with a communication passage fluidly connecting between inner spaces of the first and second housings so that both the inner spaces form a single reservoir tank; and the charge pump suction oil from the single reservoir tank.

7. A pump unit according to claim 3, wherein the common center section is provided with a valve means for releasing oil from at least one of the first hydraulic passages communication passage and a valve means for releasing oil from at least one of the second hydraulic passages.

8. A pump unit according to claim 1, wherein:

the first and second hydraulic pumps are of a variable displacement type;

the pump unit further comprises first and second control shafts for respectively and independently controlling volumes of the first and second hydraulic pumps; and the first and second control shafts extend orthogonal to the axis of the first and second pump shafts.

9. A pump unit according to claim 8, wherein the first and second pump shafts are positioned coaxially with each other, and the first and second control shafts extend to opposite directions with each other with the axis line of the first and second pump shafts as a reference.

* * * * *